United States Patent
Cui et al.

(10) Patent No.: US 11,145,851 B2
(45) Date of Patent: Oct. 12, 2021

(54) COMPOSITE LITHIUM METAL ANODES FOR LITHIUM BATTERIES WITH REDUCED VOLUMETRIC FLUCTUATION DURING CYCLING AND DENDRITE SUPPRESSION

(71) Applicant: The Board of Trustees of the Leland Stanford Junior University, Stanford, CA (US)

(72) Inventors: Yi Cui, Stanford, CA (US); Zheng Liang, Stanford, CA (US); Yayuan Liu, Stanford, CA (US); Dingchang Lin, Stanford, CA (US)

(73) Assignee: THE BOARD OF TRUSTEES OF THE LELAND STANFORD JUNIOR UNIVERSITY, Stanford, CA (US)

(*) Notice: Subject to any disclaimer, the term of this patent is extended or adjusted under 35 U.S.C. 154(b) by 248 days.

(21) Appl. No.: 15/348,884

(22) Filed: Nov. 10, 2016

(65) Prior Publication Data
US 2017/0133662 A1  May 11, 2017

Related U.S. Application Data

(60) Provisional application No. 62/253,980, filed on Nov. 11, 2015.

(51) Int. Cl.
*H01M 4/134* (2010.01)
*H01M 4/62* (2006.01)
(Continued)

(52) U.S. Cl.
CPC ......... *H01M 4/134* (2013.01); *H01M 4/0483* (2013.01); *H01M 4/1395* (2013.01); *H01M 4/364* (2013.01); *H01M 4/366* (2013.01); *H01M 4/382* (2013.01); *H01M 4/62* (2013.01); *H01M 4/622* (2013.01); *H01M 4/625* (2013.01); *H01M 10/0525* (2013.01); *H01M 2004/021* (2013.01);
(Continued)

(58) Field of Classification Search
CPC ........ H01M 4/134; H01M 4/80; H01M 4/806; H01M 4/66; H01M 4/0428; H01M 4/663; H01M 4/625; H01M 4/62; H01M 4/364; H01M 4/366; H01M 4/0483; H01M 4/382; H01M 4/1395; H01M 4/662; H01M 4/405; H01M 2300/0068; H01M 2004/021; H01M 2220/30; H01M 10/0525; Y02T 10/7011
See application file for complete search history.

(56) References Cited

U.S. PATENT DOCUMENTS

| 5,824,434 A * | 10/1998 | Kawakami | H01M 4/0435 |
| | | | 429/209 |
| 2013/0213677 A1 * | 8/2013 | Zhamu | B25F 5/00 |
| | | | 173/1 |
| 2017/0098856 A1 * | 4/2017 | Zhamu | H01M 4/131 |

OTHER PUBLICATIONS

Liu et al., "Lithium-coated polymeric matrix as a minimum volume-change and dendrite-free lithium metal anode," Nature Communications, vol. 7, Article No. 10992 (2016).
(Continued)

*Primary Examiner* — Eugenia Wang
(74) *Attorney, Agent, or Firm* — Sheppard Mullin Richter & Hampton LLP

(57) ABSTRACT

A lithium battery includes a cathode, a composite lithium metal anode, and an electrolyte in contact with the cathode and the composite lithium metal anode. The composite lithium metal anode includes a porous matrix and lithium metal disposed within the porous matrix.

14 Claims, 49 Drawing Sheets

(51) Int. Cl.
*H01M 10/0525* (2010.01)
*H01M 4/1395* (2010.01)
*H01M 4/38* (2006.01)
*H01M 4/36* (2006.01)
*H01M 4/04* (2006.01)
*H01M 4/02* (2006.01)

(52) U.S. Cl.
CPC .............................. *H01M 2220/30* (2013.01); *H01M 2300/0068* (2013.01); *Y02T 10/70* (2013.01)

(56) References Cited

OTHER PUBLICATIONS

Lin et al., "Layered reduced graphene oxide with nanoscale interlayer gaps as a stable host for lithium metal anodes," Nature Nanotechnology, vol. 11, pp. 626-632 (2016).

Liang et al., "Composite lithium metal anode by melt infusion of lithium into a 3D conducting scaffold with lithiophilic coating," PNAS, vol. 113 (11), pp. 2862-2867 (2016).

Lin et al., "Three-dimensional stable lithium metal anode with nanoscale lithium islands embedded in ionically conductive solid matrix," PNAS, vol. 114 (18), pp. 4613-4618 (2017).

* cited by examiner

COMPOSITE LITHIUM METAL ANODES FOR LITHIUM BATTERIES WITH REDUCED VOLUMETRIC FLUCTUATION DURING CYCLING AND DENDRITE SUPPRESSION

CROSS-REFERENCE TO RELATED APPLICATION

This application claims the benefit of U.S. Provisional Application No. 62/253,980, filed Nov. 11, 2015, the content of which is incorporated herein by reference in its entirety.

STATEMENT REGARDING FEDERALLY SPONSORED RESEARCH OR DEVELOPMENT

This invention was made with Government support under contract DE-EE0006828 awarded by the Department of Energy. The Government has certain rights in the invention.

BACKGROUND

Lithium (Li) metal, due to its high theoretical capacity, low electrochemical potential, and light-weight nature, is widely recognized to be the most prominent candidate for the next-generation high-energy-density Li battery anodes. Nevertheless, the dendritic deposition nature as well as the virtually infinite relative dimension change during cycling severely impede its practical applications.

It is against this background that a need arose to develop the embodiments described in this disclosure.

SUMMARY

One aspect of this disclosure relates to a lithium battery. In some embodiments, the lithium battery includes a cathode, a composite lithium metal anode, and an electrolyte in contact with the cathode and the composite lithium metal anode. The composite lithium metal anode includes a porous matrix and lithium metal disposed within the porous matrix.

Another aspect of this disclosure relates to a method of manufacturing a composite lithium metal anode. In some embodiments, the method includes providing a porous matrix, providing liquefied lithium metal, and infusing the liquefied lithium metal into the porous matrix.

Other aspects and embodiments of this disclosure are also contemplated. The foregoing summary and the following detailed description are not meant to restrict this disclosure to any particular embodiment but are merely meant to describe some embodiments of this disclosure.

BRIEF DESCRIPTION OF THE DRAWINGS

For a better understanding of the nature and objects of some embodiments of this disclosure, reference should be made to the following detailed description taken in conjunction with the accompanying drawings.

FIG. 21. a, Galvanostatic cycling of Li foil and Li-rGO film symmetric cells in ether-based electrolyte (about 1 M LiTFSI in about 1:1, v/v DOL/DME with about 1% $LiNO_3$). Li-rGO electrode showed much lower overpotential as well as more stable cycling stability compared to the Li foil counterpart. The curves of 800,000-1,000,000 seconds (left dash rectangle) and 2,800,000-3,000,000 seconds (right dash rectangle) were enlarged and shown in b and c, respectively. The Li-rGO electrode exhibited extremely stable cycling performance in the DOL/DME electrolyte, with stable cycling of >450 cycles as shown in a.

(d) Voltage profile of Li foil symmetric cell and that of LCNE symmetric cell at different various rates from about 0.5 mA cm$^{-2}$ to about 5 mA cm$^{-2}$.

Figure 27:
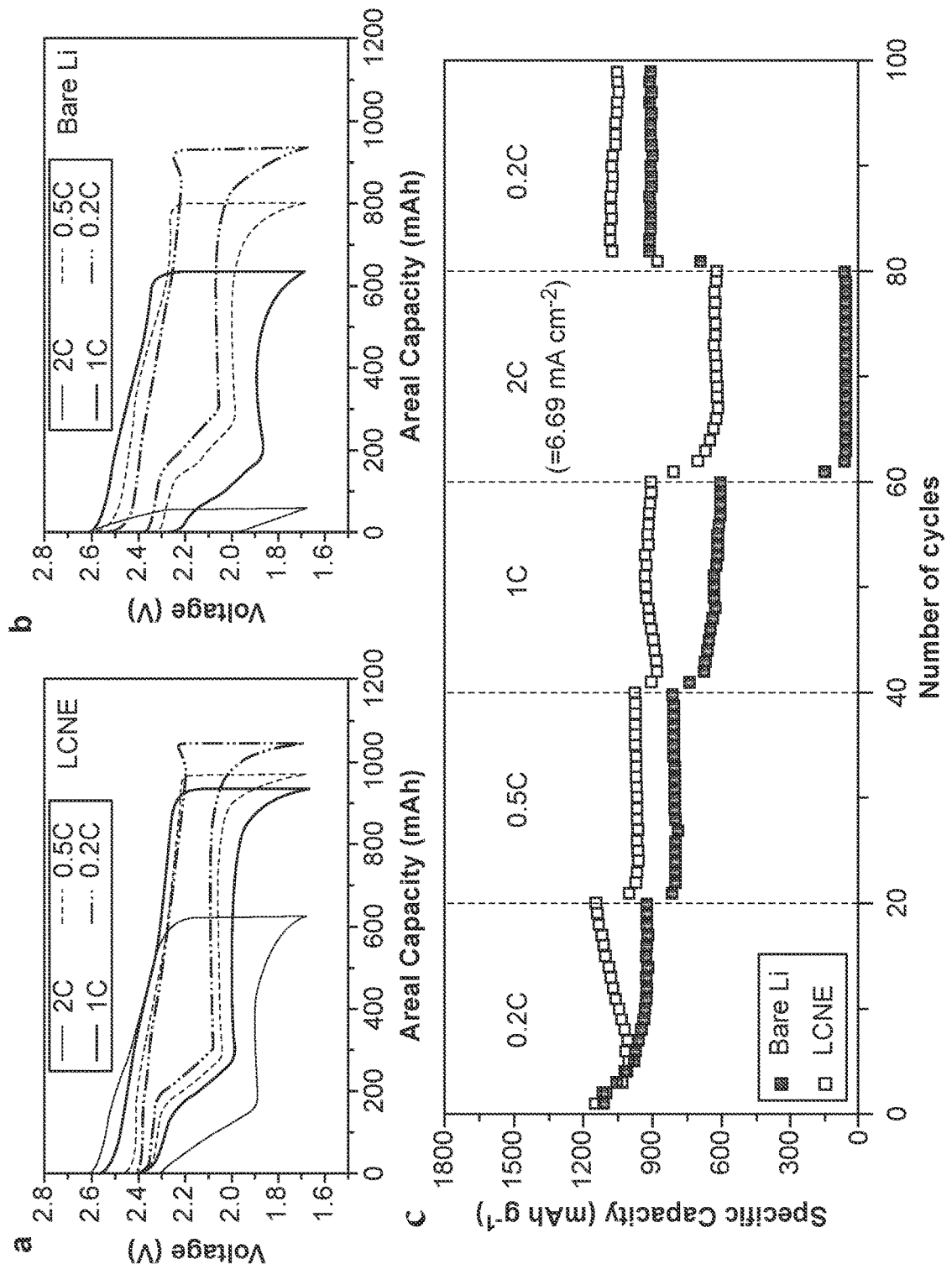
Figure 27:
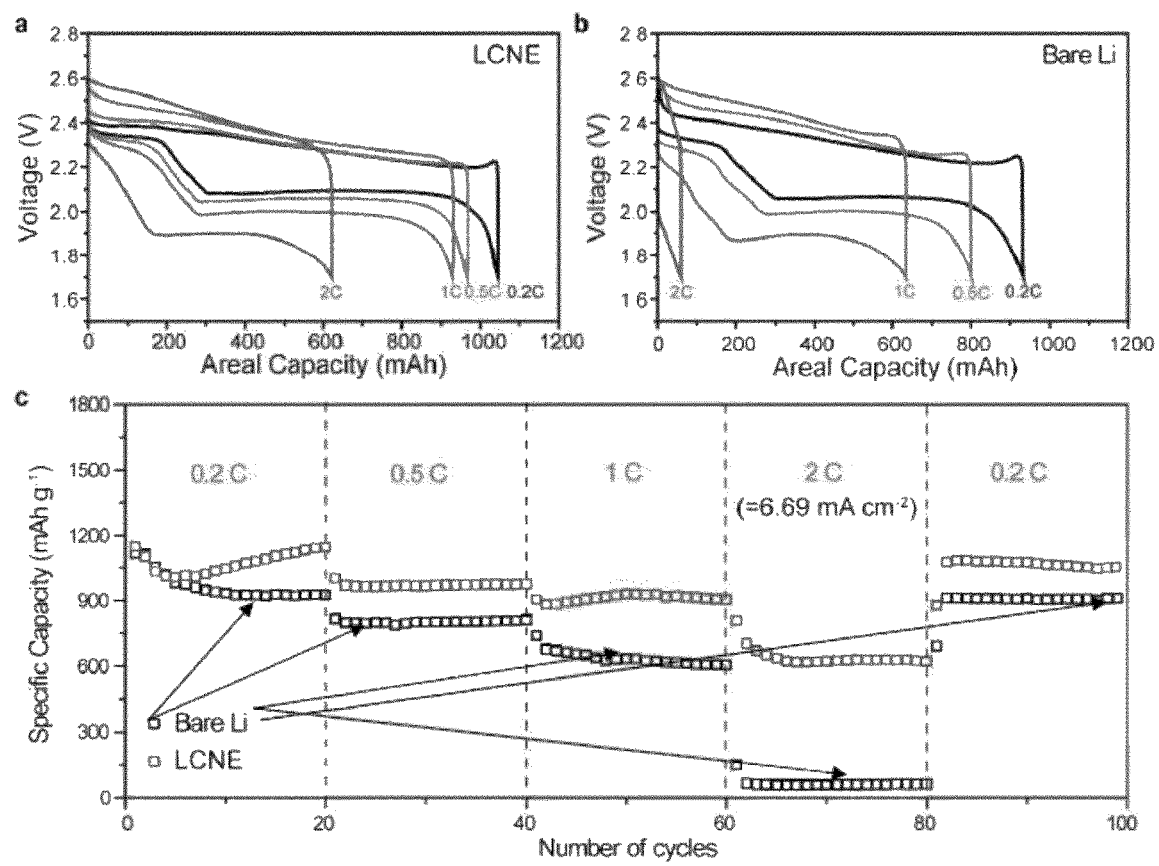

FIG. 27. Rate capability of Li—S batteries with different Li electrodes. Voltage profile of Li—S batteries with LCNE (a) and Li foil (b) as negative electrodes. Mass loading of S is fixed at about 2 mg cm$^{-2}$. C-rate is varied from about 0.2 C (about 0.669 mA cm$^{-2}$) to about 2 C (about 6.69 mA cm$^{-2}$). (c) Capacity retention of Li—S batteries at different C-rate with LCNE and Li foil as negative electrodes.

Figure 28:
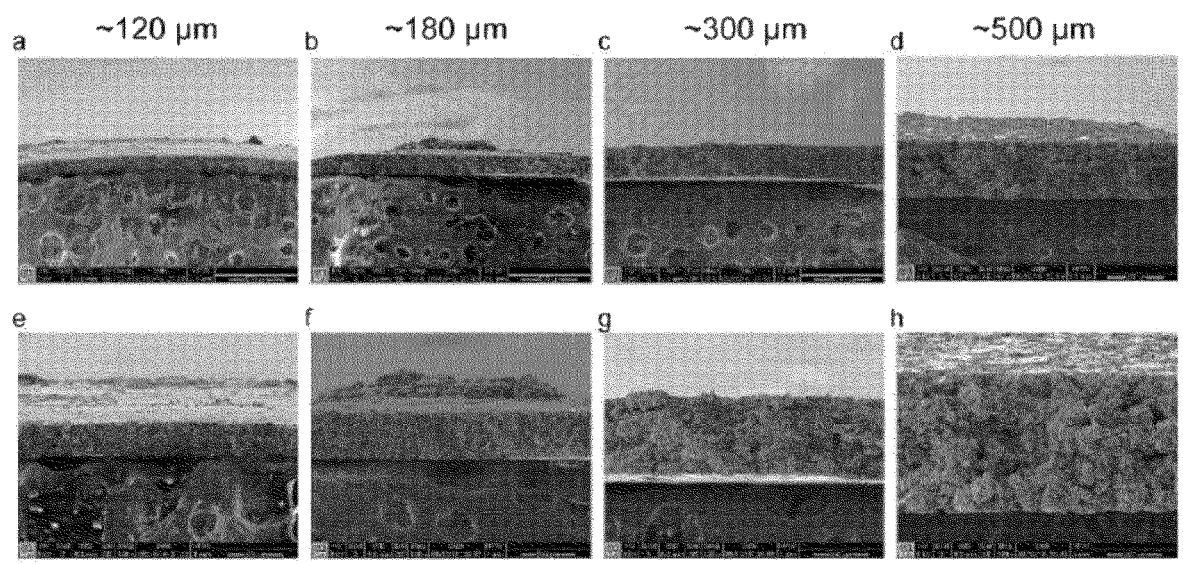

FIG. 28. Various thickness of LCNE produced by mechanical pressing. SEM images show the LCNE fabricated from overlithiated nanocomposite powders with various thickness of about 120 μm (a, e), about 180 μm (b, f), about 300 μm (c, g), and about 500 μm (d, h).

Figure 29:
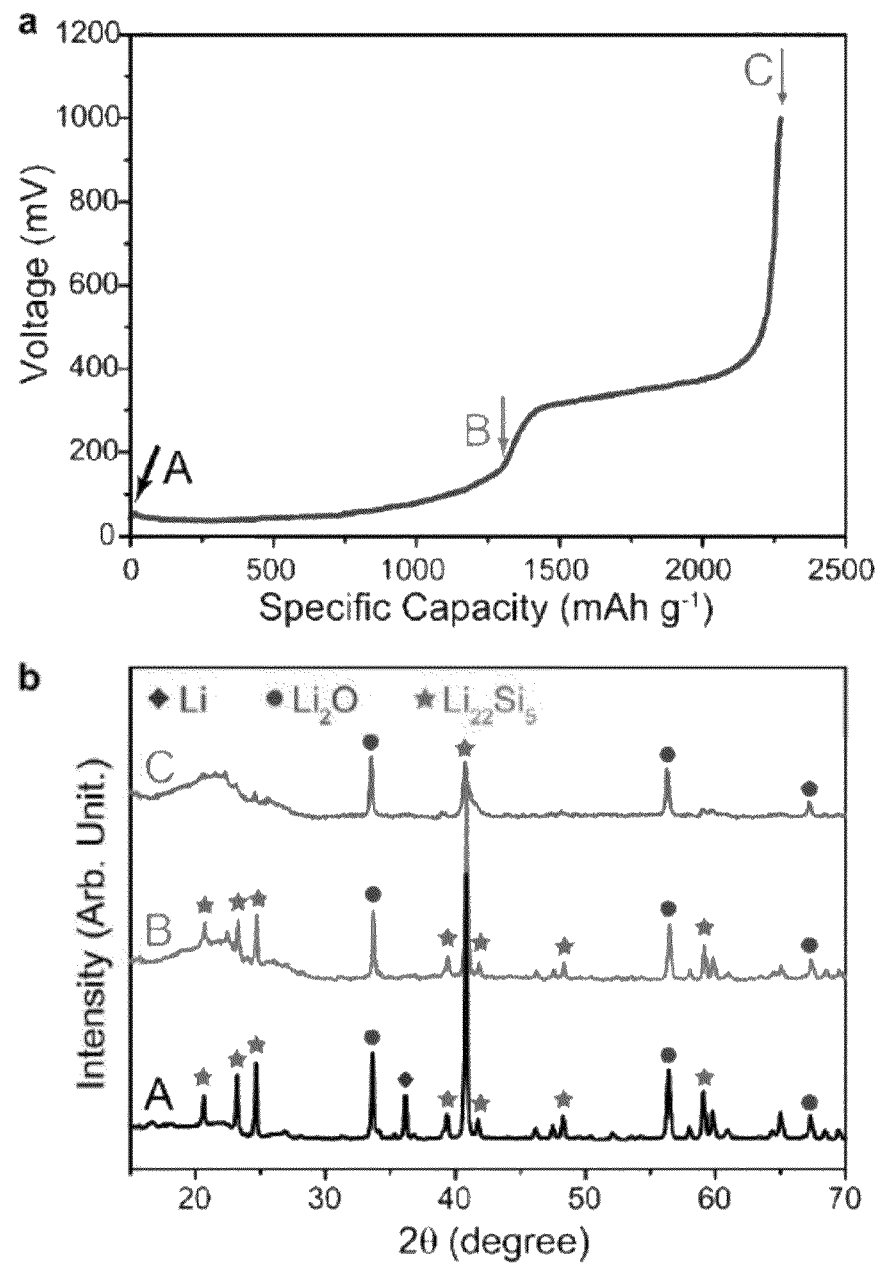

FIG. 29. Phase characterization of LCNE at different stages. (a) Charging voltage profile of LCNE after fully delithiated to about 1 V versus Li$^+$/Li. (b) XRD spectrums of different delithiated stages (A: pristine LCNE; B: LCNE charged to about 0.15 V; C: LCNE charged to about 1 V) as denoted by arrows in (a). At pristine stage A, evident XRD peaks of Li, Li$_2$O and Li$_{22}$Si$_5$ are shown. When the LCNE was charged to about 0.15 V (B), Li peak disappeared while the Li$_2$O and Li$_{22}$Si$_5$ peaks still maintained. After fully charging the LCNE to about 1 V, most of the peaks of Li$_{22}$Si$_5$ also disappeared, and just the major peak was still observable, which indicates that most of Li$_{22}$Si$_5$ was delithiated.

Figure 30:
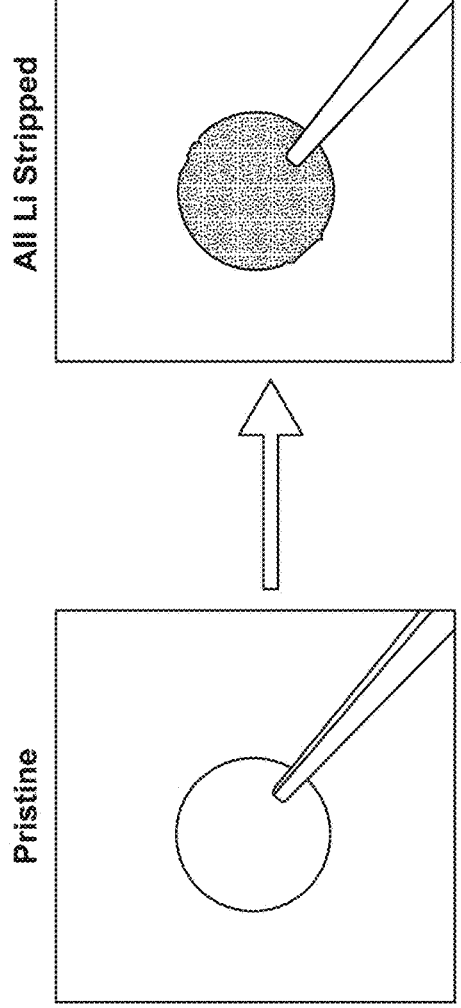

FIG. 30. Rigid matrix shown by substantially fully stripping all Li from the electrode. The figures show the pristine electrode (left) and the electrode after substantially fully stripping all Li (right). A freestanding rigid matrix is retained after substantially fully stripping all Li without structure collapse. This indicates that the matrix obtained by overlithiation affords an interconnected nature to support a stable dimension.

Figure 31:
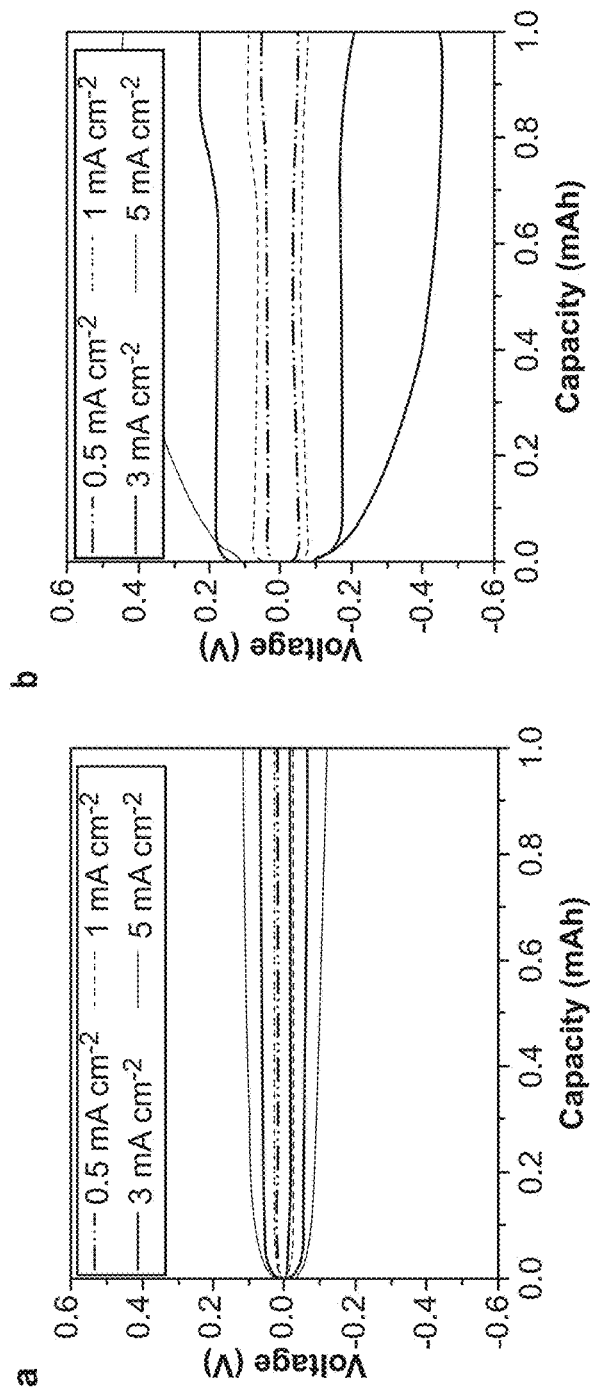

FIG. 31. Detailed comparison on voltage profiles at various current densities in carbonate electrolyte system. Single-cycle voltage profiles of LCNEs (a) and Li foil electrodes (b) as current density varied from about 0.5 mA cm$^{-2}$ to about 5 mA cm$^{-2}$. The capacity is fixed at about 1 mAh cm$^{-2}$.

Figure 32:
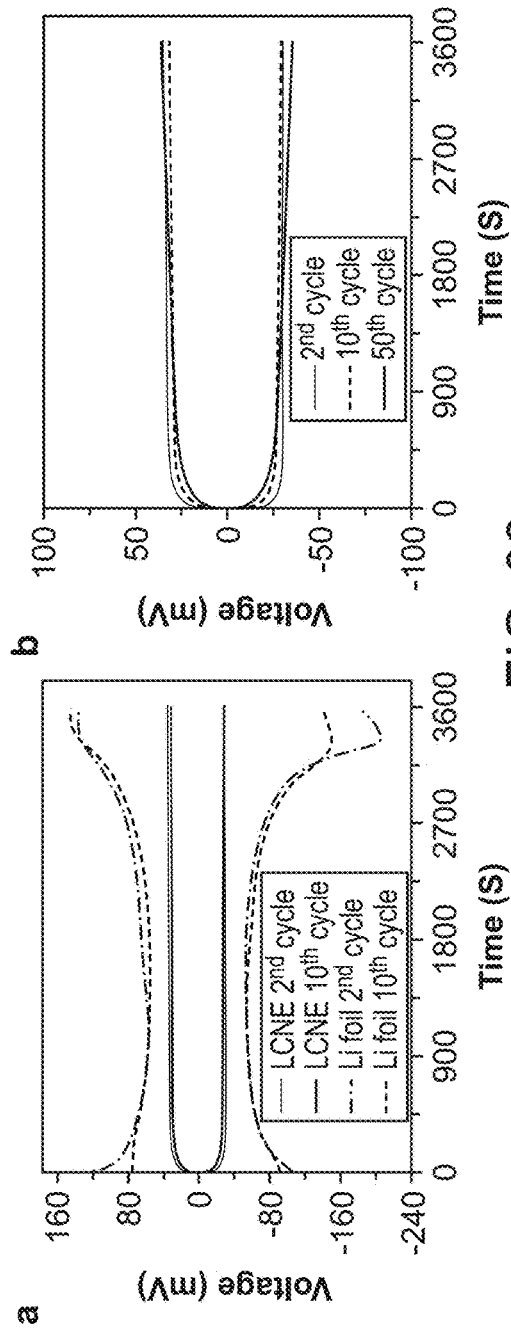

FIG. 32. Voltage profiles comparison and the stability after cycling in carbonate electrolyte system. (a) Voltage profiles of the 2nd cycle and the 10th cycle of LCNEs (solid lines) and Li metal foils (dash lines). (b) The evolution of voltage profiles after cycling. The 2nd, 10th, and 50th cycles are shown here. The current density is fixed at about 1 mA cm$^{-2}$.

Figure 33:
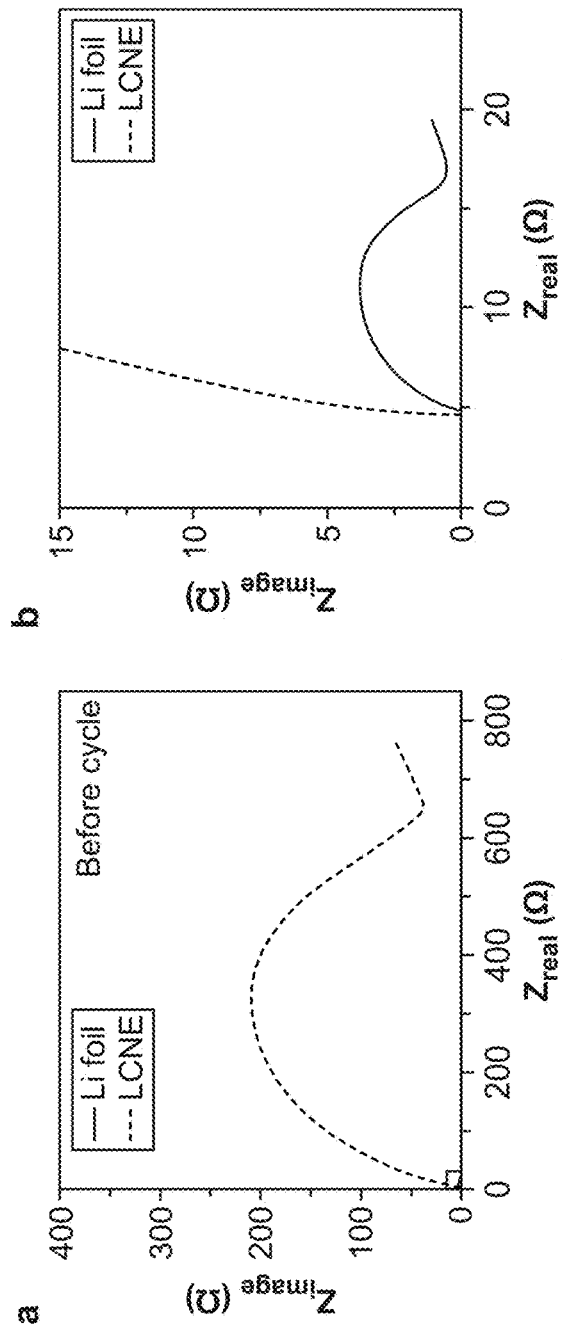

FIG. 33. Impedance spectroscopy study before cycling. Nyquist plot of impedance measurement before cycles (a) and the corresponding enlarged plot (b, rectangle in a). This shows significant different interfacial resistance between Li foils and LCNEs.

Figure 34:
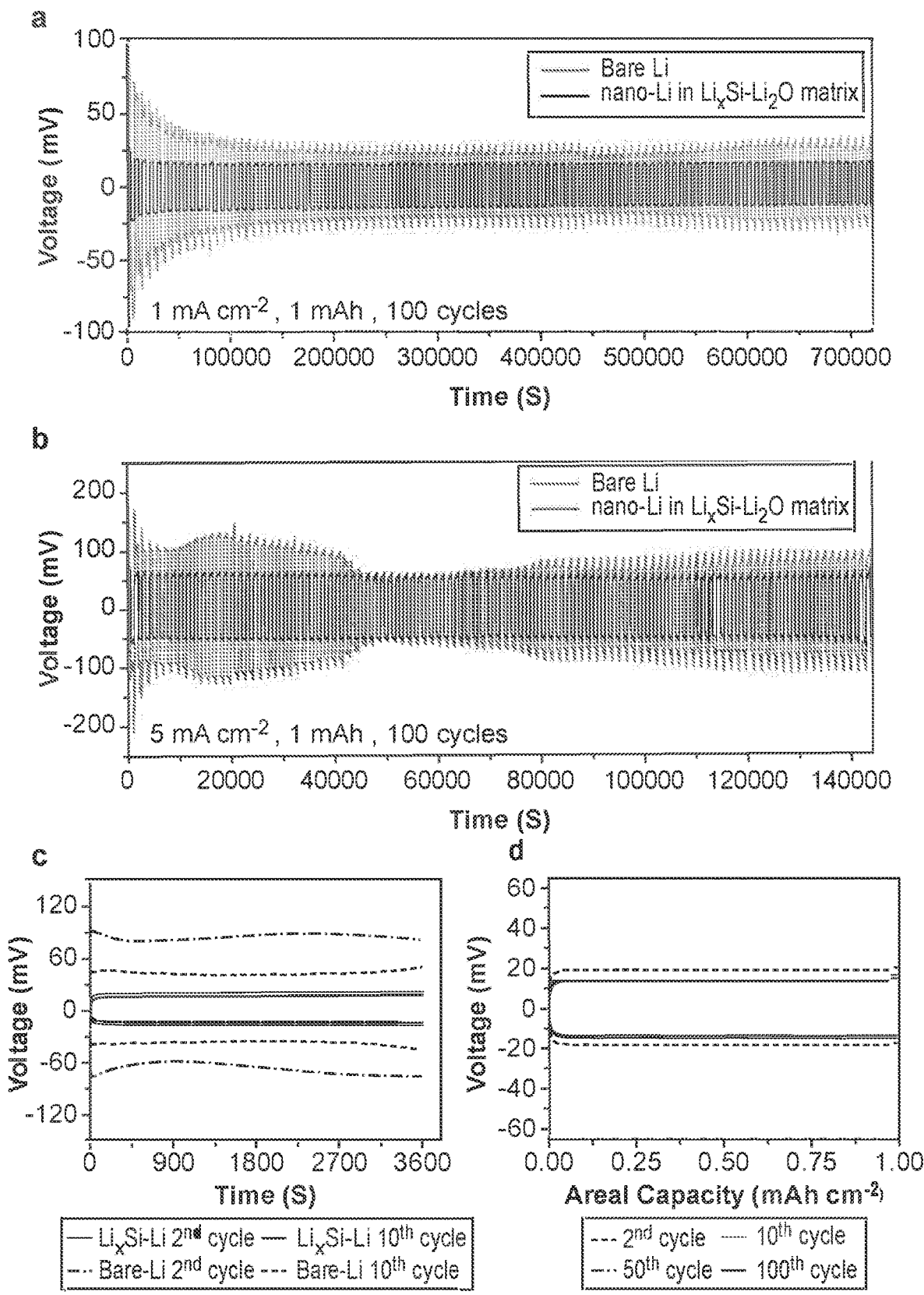

FIG. 34. Electrochemical performance of LCNEs symmetric cell in ether-based electrolyte. The voltage profiles of Li foil symmetric cells and LCNE symmetric cells in about 1:1 v/v DOL/DME with about 1% LiNO$_3$ are shown at various current densities of about 1 mA cm$^{-2}$ (a), and about 5 mA cm$^{-2}$ (b). Stripping/plating capacity is fixed at about 1 mAh cm$^{-2}$. (c) Voltage profiles of the 2nd cycle and the 10th cycle of LCNEs (solid lines) and Li metal foils (dashed lines). (d) The evolution of voltage profiles after cycling. The 2nd, 10th, 50th, and 100th cycles are shown here. For (c) and (d), the current density is fixed at about 1 mA cm$^{-2}$.

Figure 35:
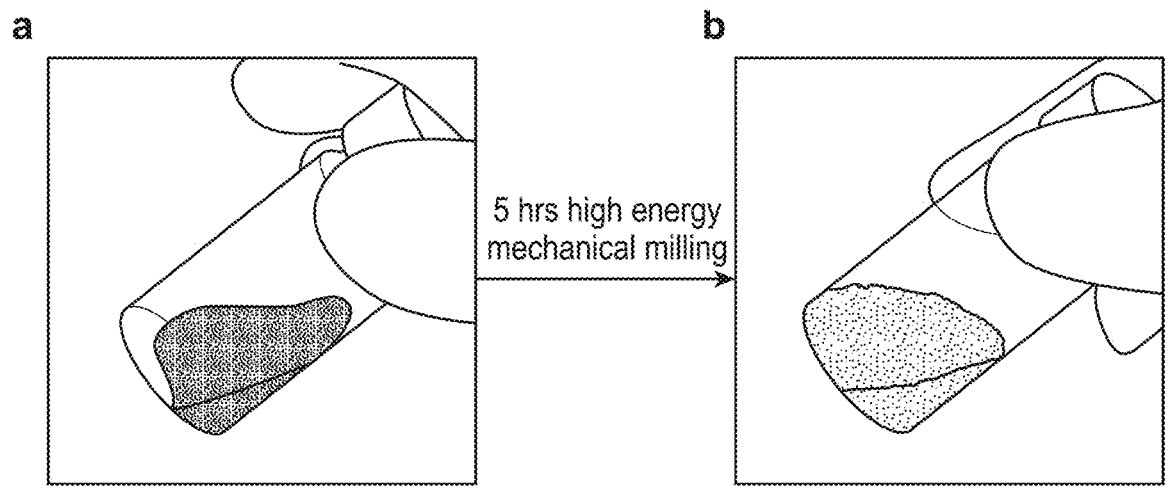

FIG. 35. The pristine SiO powders (a) and the corresponding powder after about 5 hrs of high energy mechanical milling (b). The color of the powders becomes lighter after mechanical milling which indicates that the size of the SiO becomes much smaller.

Figure 36:
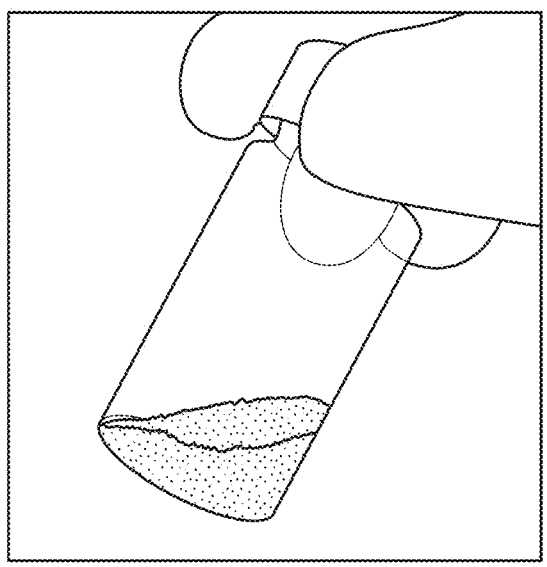

FIG. 36. The as-obtained Li—Li$_{22}$Si$_5$—Li$_2$O nanocomposite powders by overlithiation.

Figure 37:
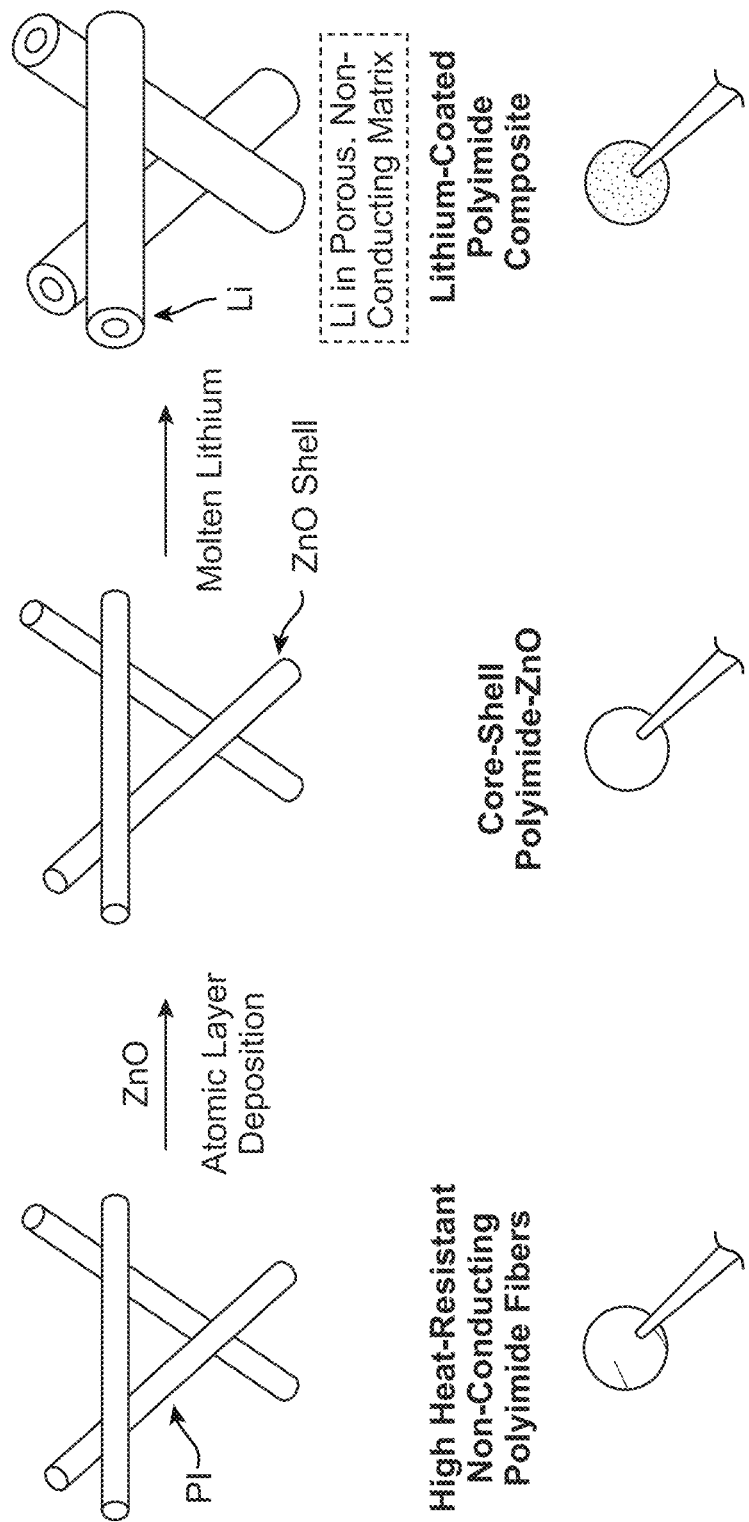

FIG. 37. Schematic of the fabrication of the Li-coated polyimide (PI) matrix. Electrospun PI was coated with a layer of ZnO via atomic layer deposition (ALD) to form core-shell PI—ZnO. The ZnO coating renders the matrix "lithiophilic" such that molten Li can readily infuse into the matrix. The final structure of the electrode is Li coated onto a porous, non-conducting polymeric matrix.

Figure 38:
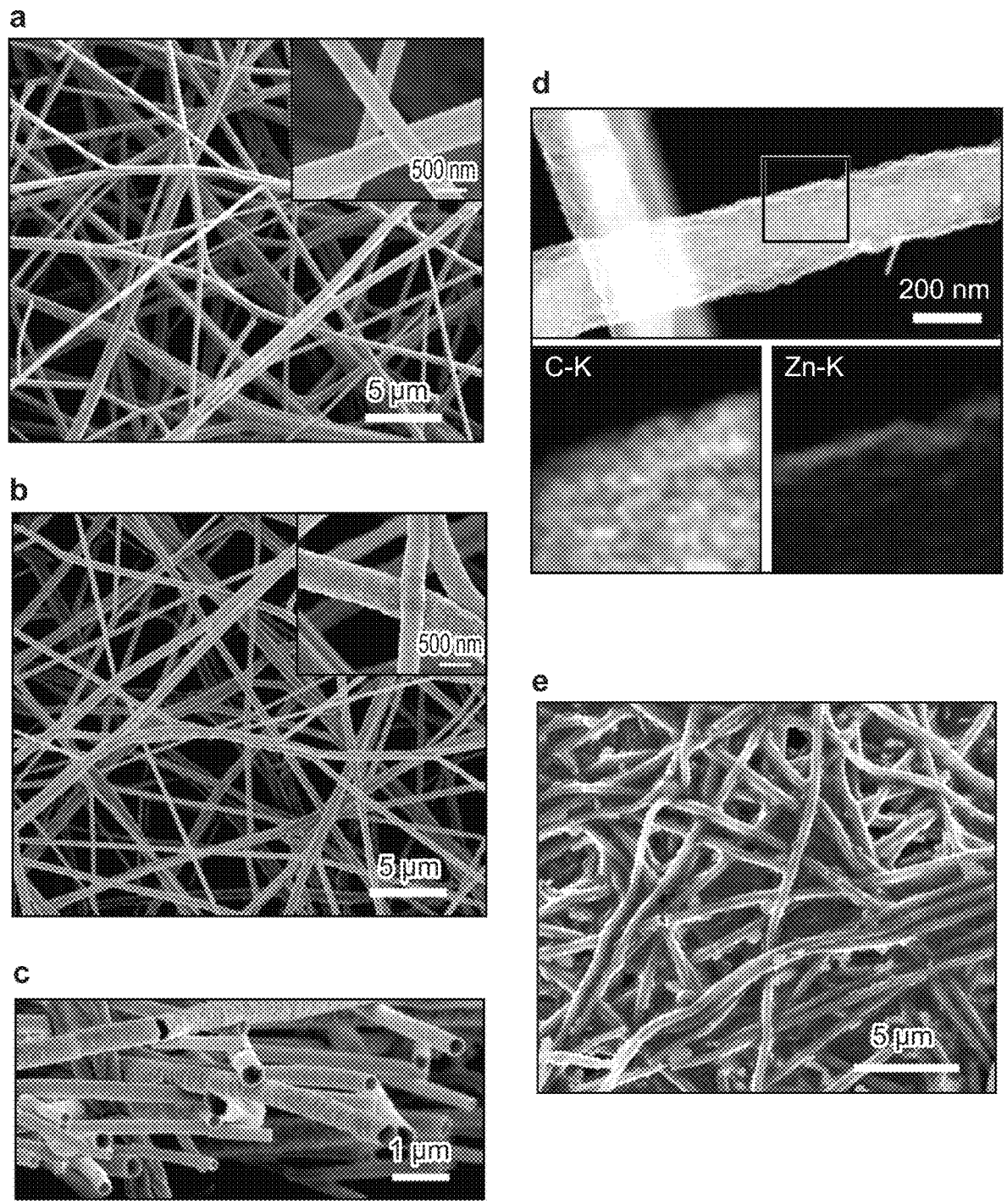
Figure 38:
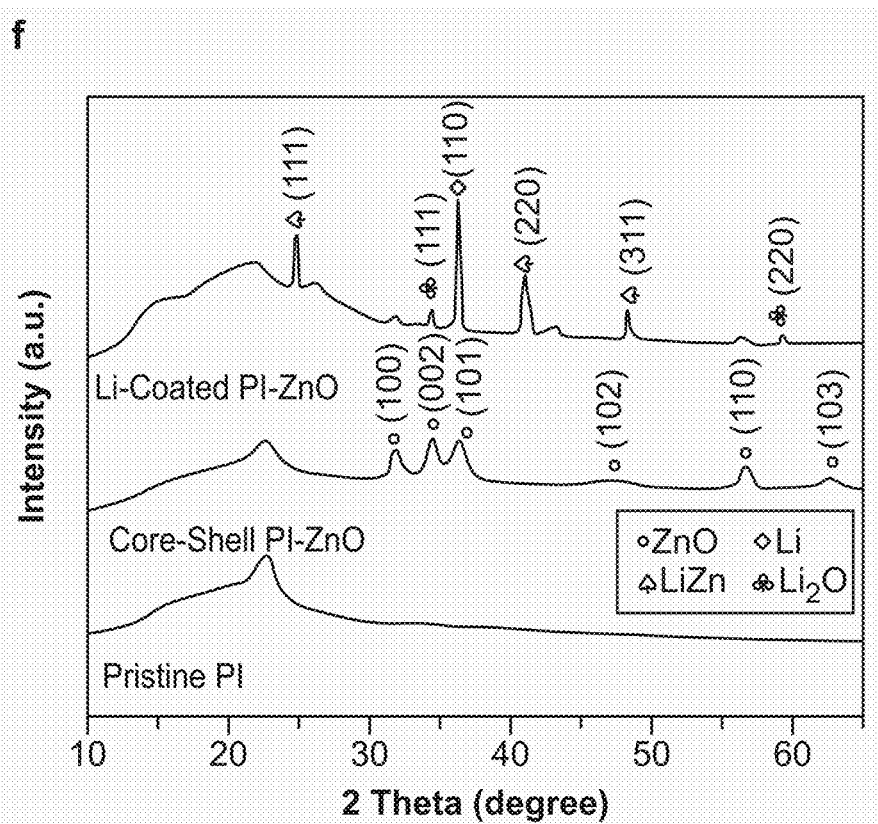
Figure 38:
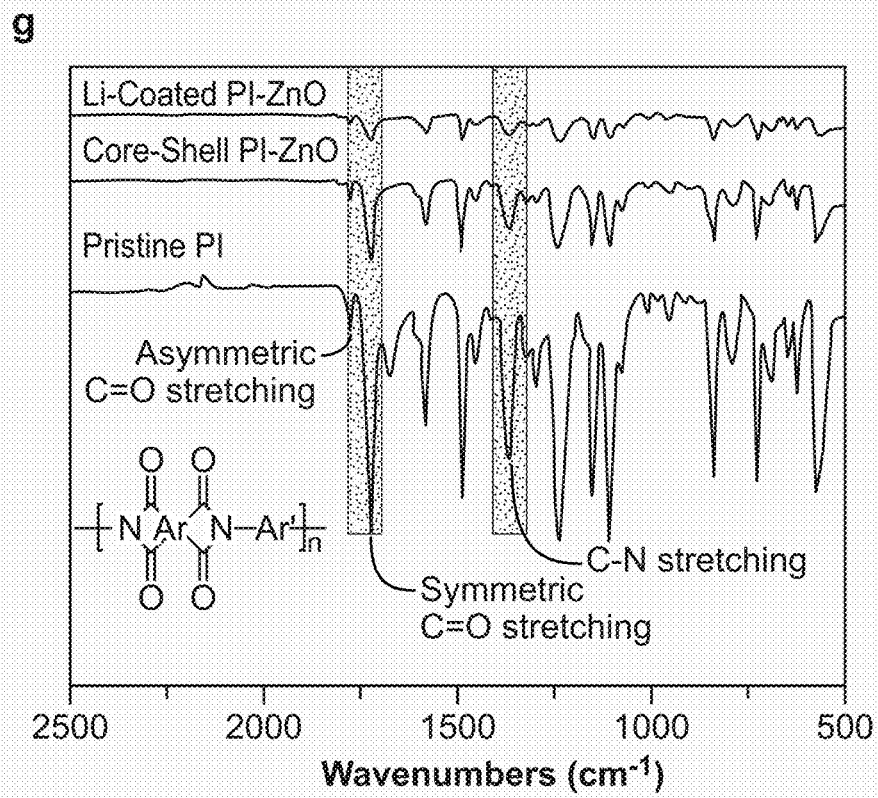

FIG. 38. Characterization of the Li-coated PI electrode. SEM images of the electrospun PI fibers (a) before and (b) after ZnO coating. (c) Cross-sectional SEM image of the core-shell PI—ZnO, where the conformal ZnO coating can be observed from the contrast of the fiber cross-sections. (d) Scanning transmission electron microscope (STEM) image of a single core-shell PI—ZnO fiber and the corresponding energy dispersive X-ray (EDX) elemental mapping of C and Zn distribution. (e) SEM image of the Li-coated PI matrix, showing the porous nature of the Li electrode. (f) XRD spectra of the pristine PI, the core-shell PI—ZnO and the Li-coated PI—ZnO matrix, where the Li-coated PI—ZnO exhibited the signals of LiZn alloy, Li$_2$O and metallic Li. (g) FTIR spectra of the pristine PI, the core-shell PI—ZnO and the Li-coated PI—ZnO matrix (Li was scraped away to expose the underlying matrix in order to obtain the signal). The characteristic peaks of PI remained after ZnO and Li coating, indicating the stability of the polymeric matrix.

Figure 39:
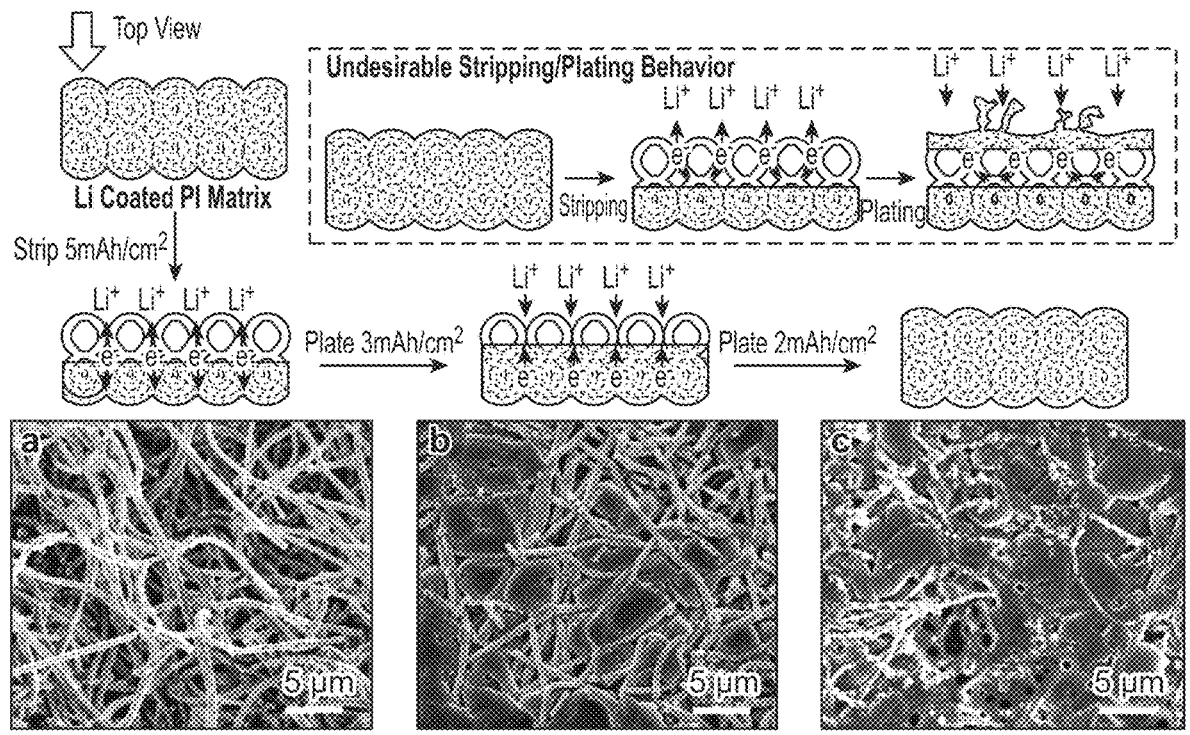

FIG. 39. SEM images and the corresponding schematics showing the well-confined stripping/plating behavior of the Li-coated PI matrix. Top view SEM images of (a) the exposed top fibers of the Li-coated PI electrode after stripping away about 5 mAh/cm$^2$ Li, (b) exposed top fibers partially filled with Li when plating about 3 mAh/cm$^2$ Li back and (c) substantially completely filled PI matrix after plating an additional about 2 mAh/cm$^2$ Li back. (Current density at about 1 mA/cm$^2$, in EC/DEC). The polymeric matrix ensures Li is dissolved and deposited from the underlying conductive Li substrate and, as a result, Li is effectively confined into the matrix. The top-right schematic illustrates the alternative undesirable Li stripping/plating behavior where after striping, Li nucleate on the top surface, leading to volume change and dendrites extending out of the matrix.

Figure 40:
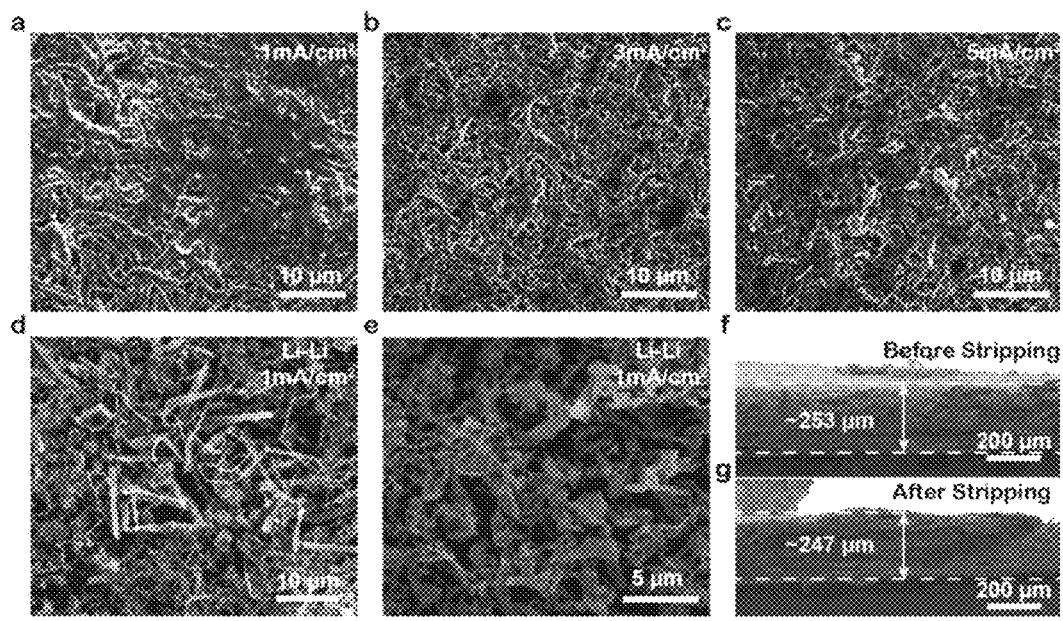

FIG. 40. Morphology characterization of the Li electrodes after cycling at different current densities. Top view SEM images of the Li-coated PI matrix after 10 cycles of stripping/plating in EC/DEC at a current density of (a) about 1 mA/cm$^2$, (b) about 3 mA/cm$^2$ and (c) about 5 mA/cm$^2$. (d, e) Top view SEM images of the bare Li electrode after 10 cycles of stripping/plating in EC/DEC at a current density of about 1 mA/cm$^2$ with large amounts of mossy Li dendrites. Cross-sectional SEM images of the Li-coated PI matrix (f) before and (g) after substantially complete Li stripping, from which no significant volume change can be seen (note that the uniform fibrous features in a-c are not dendrites but the fibrous matrix, which are distinctly different from the non-uniform, random-sized mossy Li dendrites in d and e).

Figure 41:
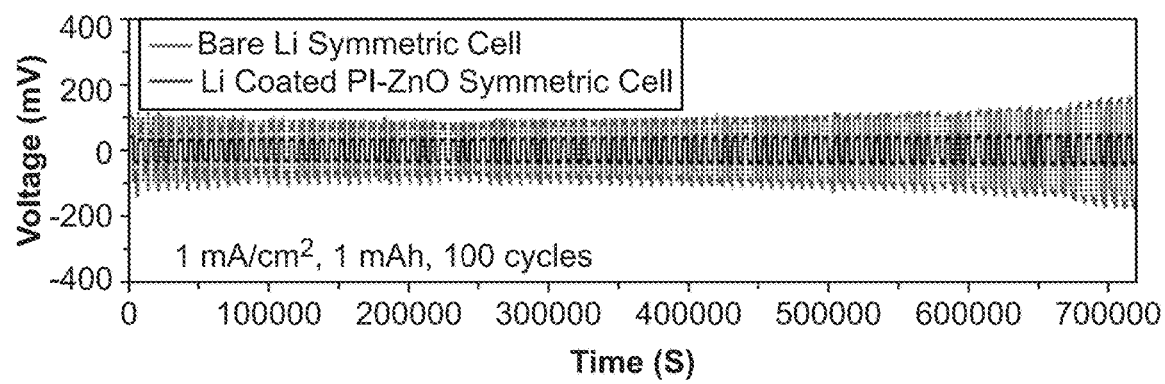
Figure 41:
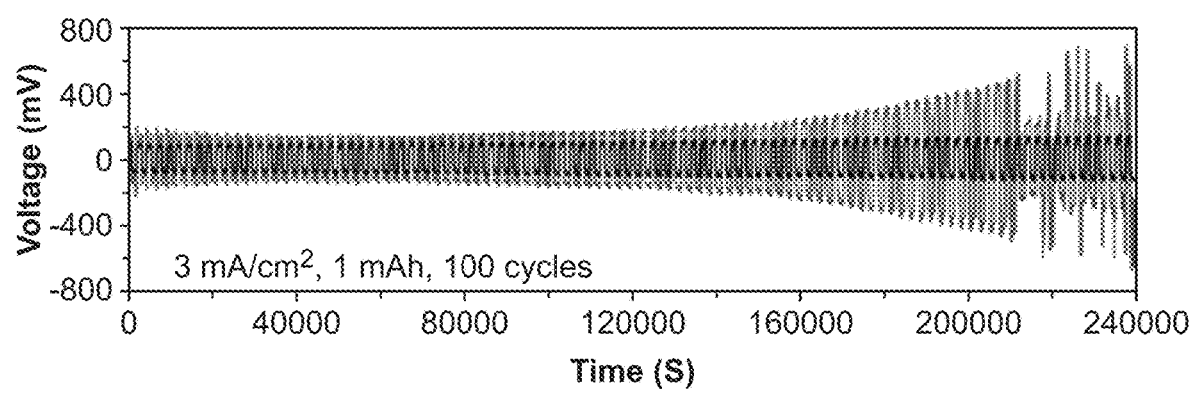
Figure 41:
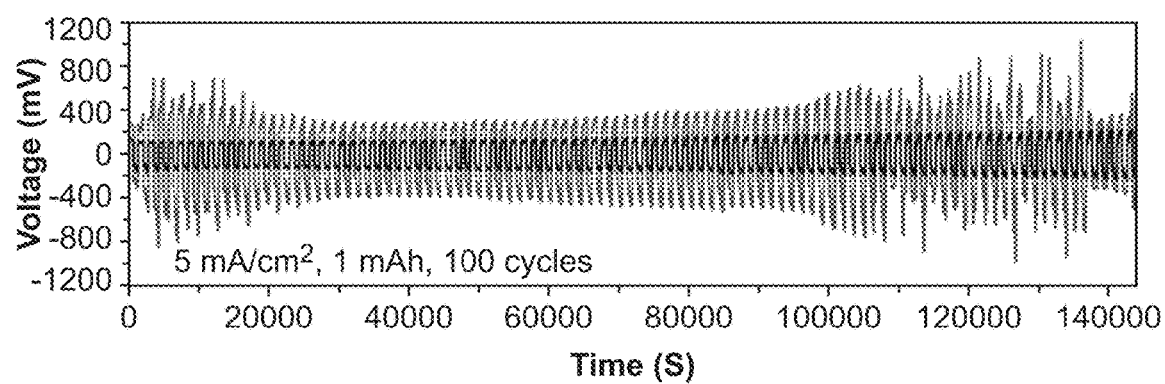
Figure 41:
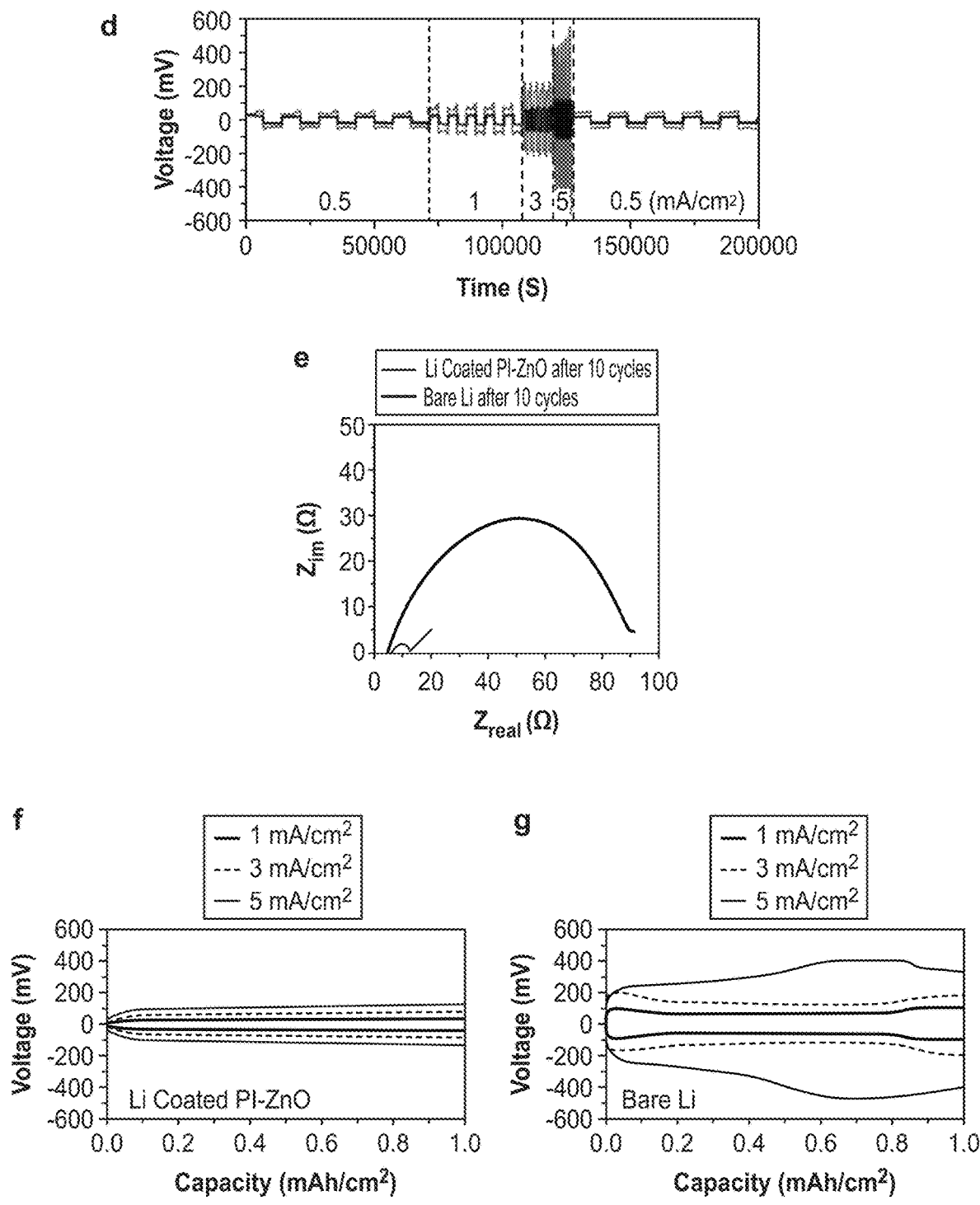

FIG. 41. Electrochemical characterization of the Li electrodes in EC/DEC electrolyte. Comparison of the cycling stability of the Li-coated PI matrix and the bare Li electrode at a current density of (a) about 1 mA/cm$^2$, (b) about 3 mA/cm$^2$ and (c) about 5 mA/cm$^2$. (d) Rate performance of the Li-coated PI matrix and the bare Li electrode. (e) Nyquist plot of the impedance spectra of the symmetrical Li-coated PI matrix and the bare Li cell after 10 cycles at a current density of about 1 mA/cm². Voltage profiles of (f) Li-coated PI matrix and (g) bare Li electrode at different current densities after 10 cycles. The amount of Li cycled was about 1 mAh/cm² in all cases.

Figure 42:
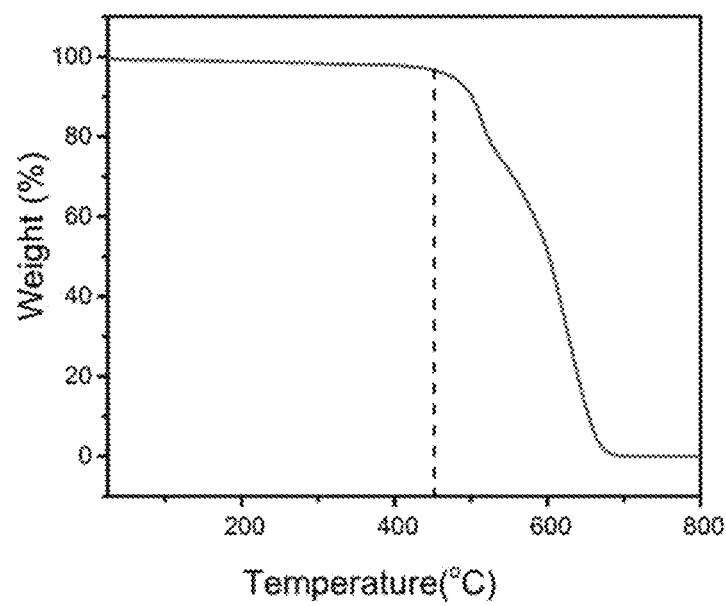

FIG. 42. Thermogravimetric analysis (TGA) curve of the electrospun PI matrix in air atmosphere.

Figure 43:
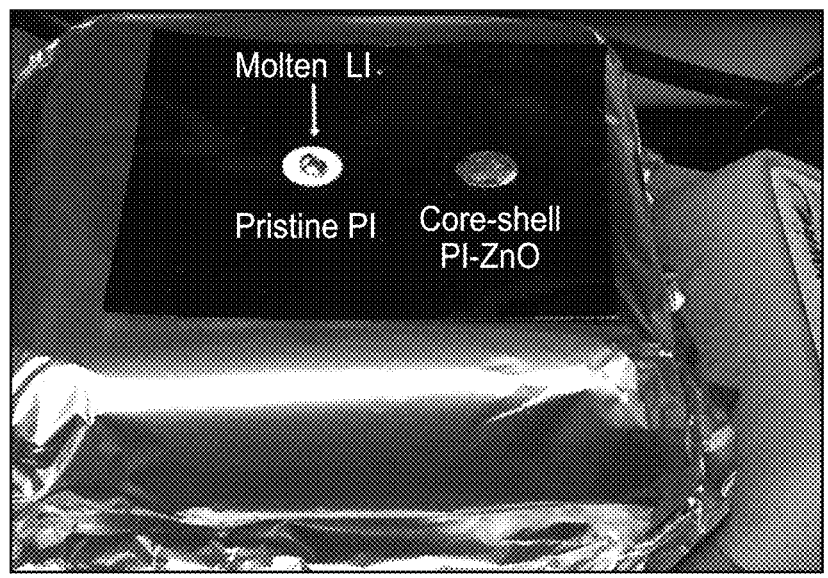

FIG. 43. Image of a bare PI matrix and a core-shell PI—ZnO matrix in molten Li indicating the difference in Li wettability.

Figure 44:
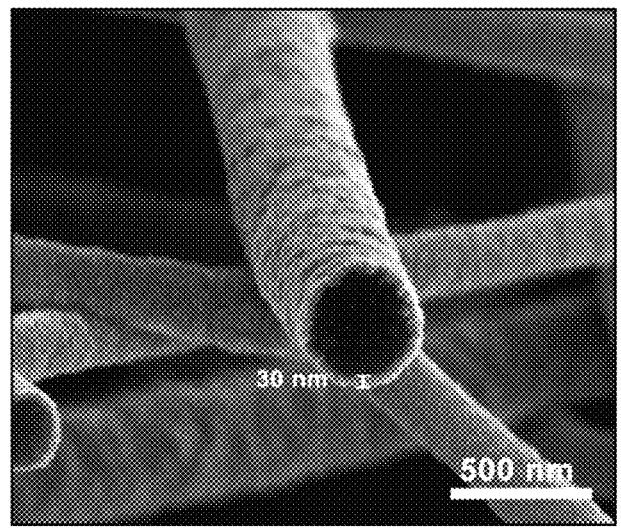

FIG. 44. Cross-sectional SEM image of the core-shell PI—ZnO fiber.

Figure 45:
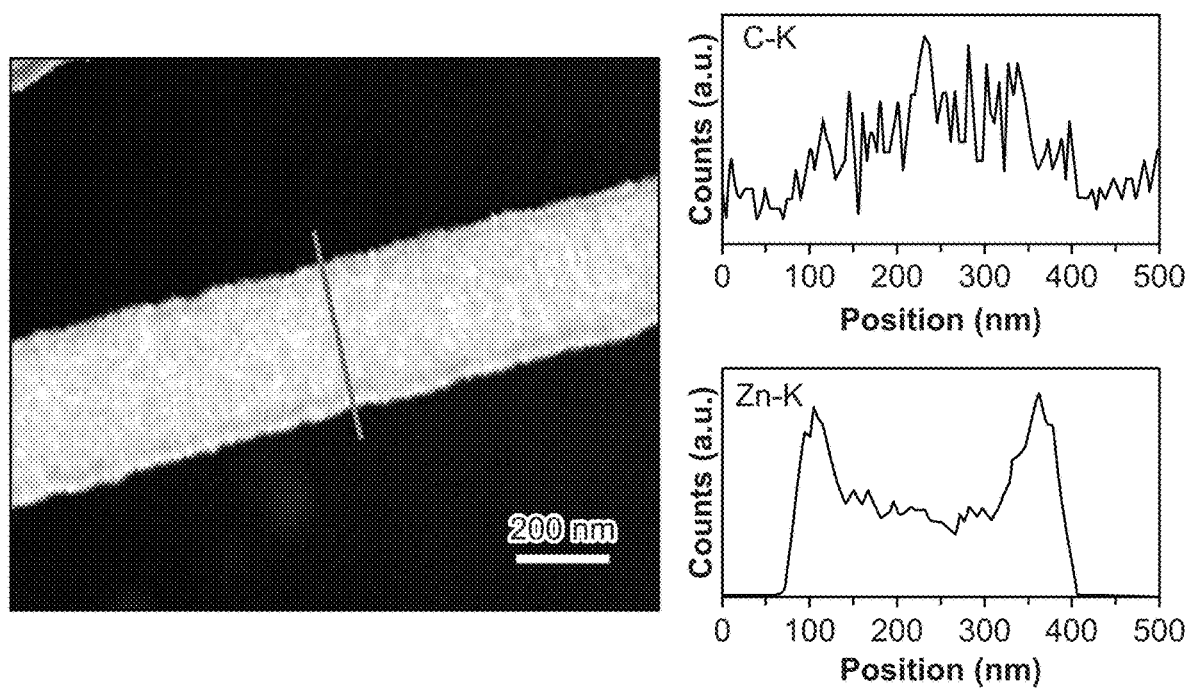

FIG. 45. EDX line scan of the PI fiber after ZnO ALD resolving the core-shell structure of the fiber. (C signal was originated from the PI polymeric core and the Zn signal was originated from the ZnO shell).

Figure 46:
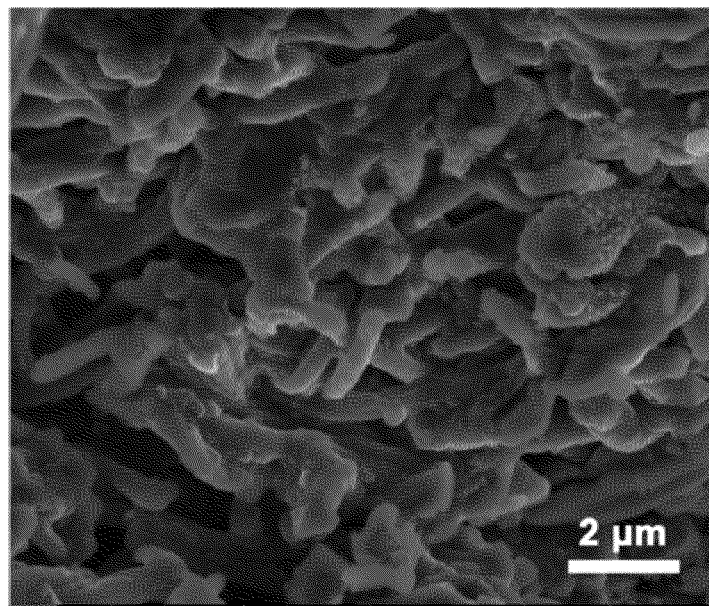

FIG. 46. Cross-sectional SEM image of the Li-coated PI matrix.

Figure 47:
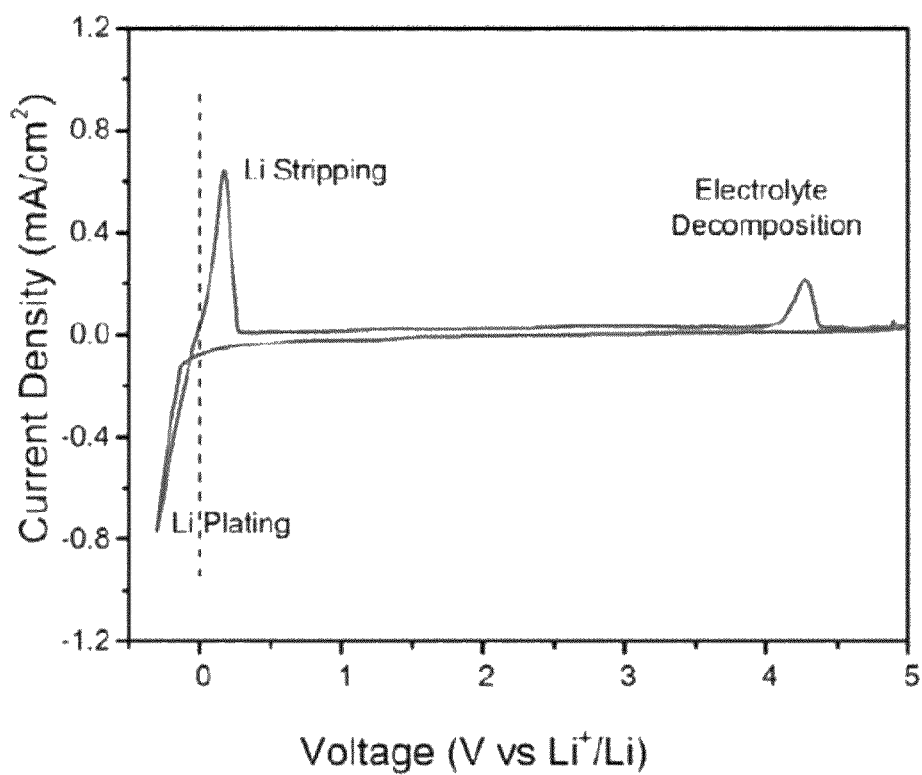

FIG. 47. Cyclic voltammetry (CV) scan of pristine PI at a scan rate of about 1 mV/s.

Figure 48:
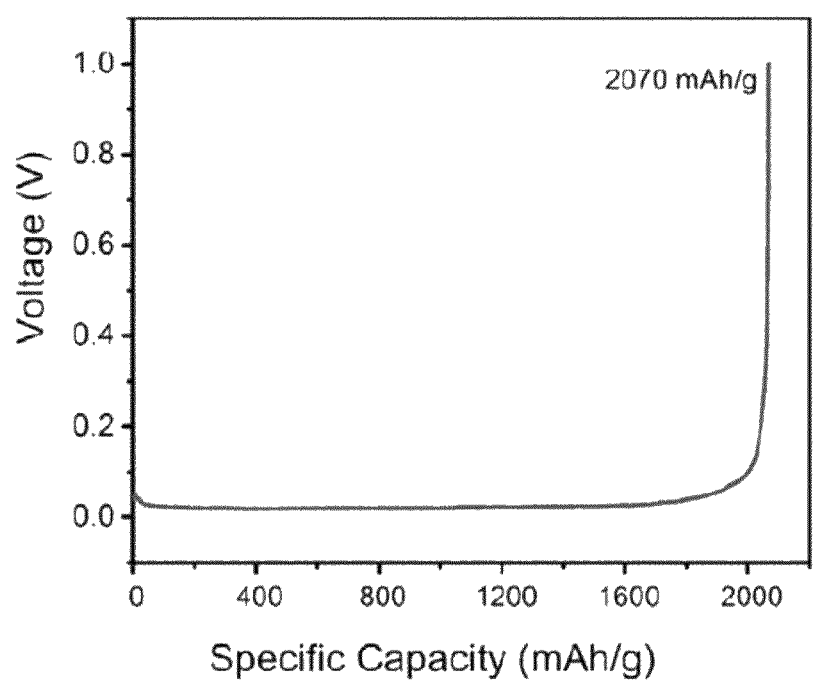

FIG. 48. A typical Li stripping curve of the Li-coated PI matrix with a stripping current density of about 0.25 mA/cm².

Figure 49:
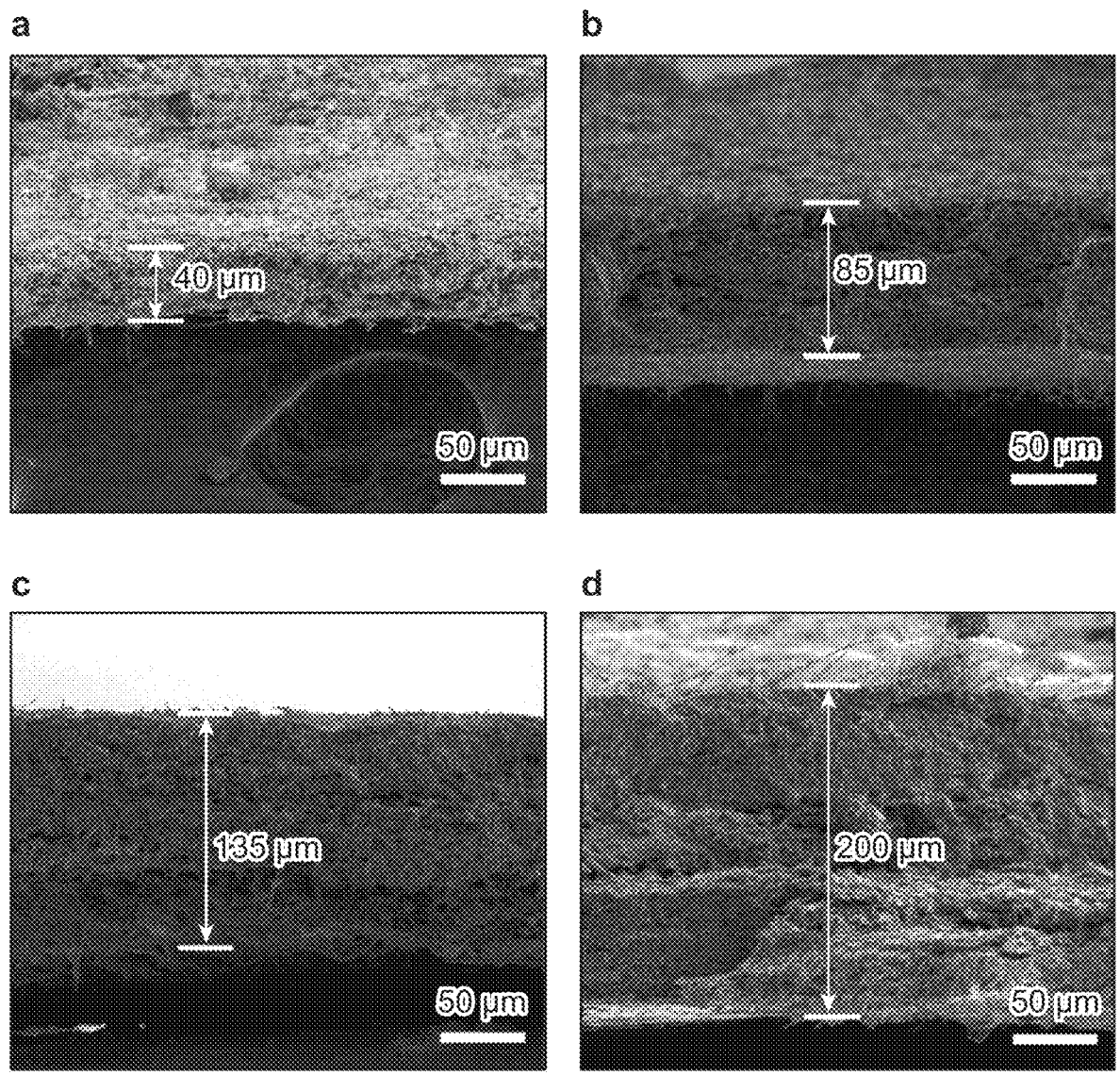

FIG. 49. Cross-sectional SEM images of the Li-coated PI matrix with different thicknesses.

Figure 50:
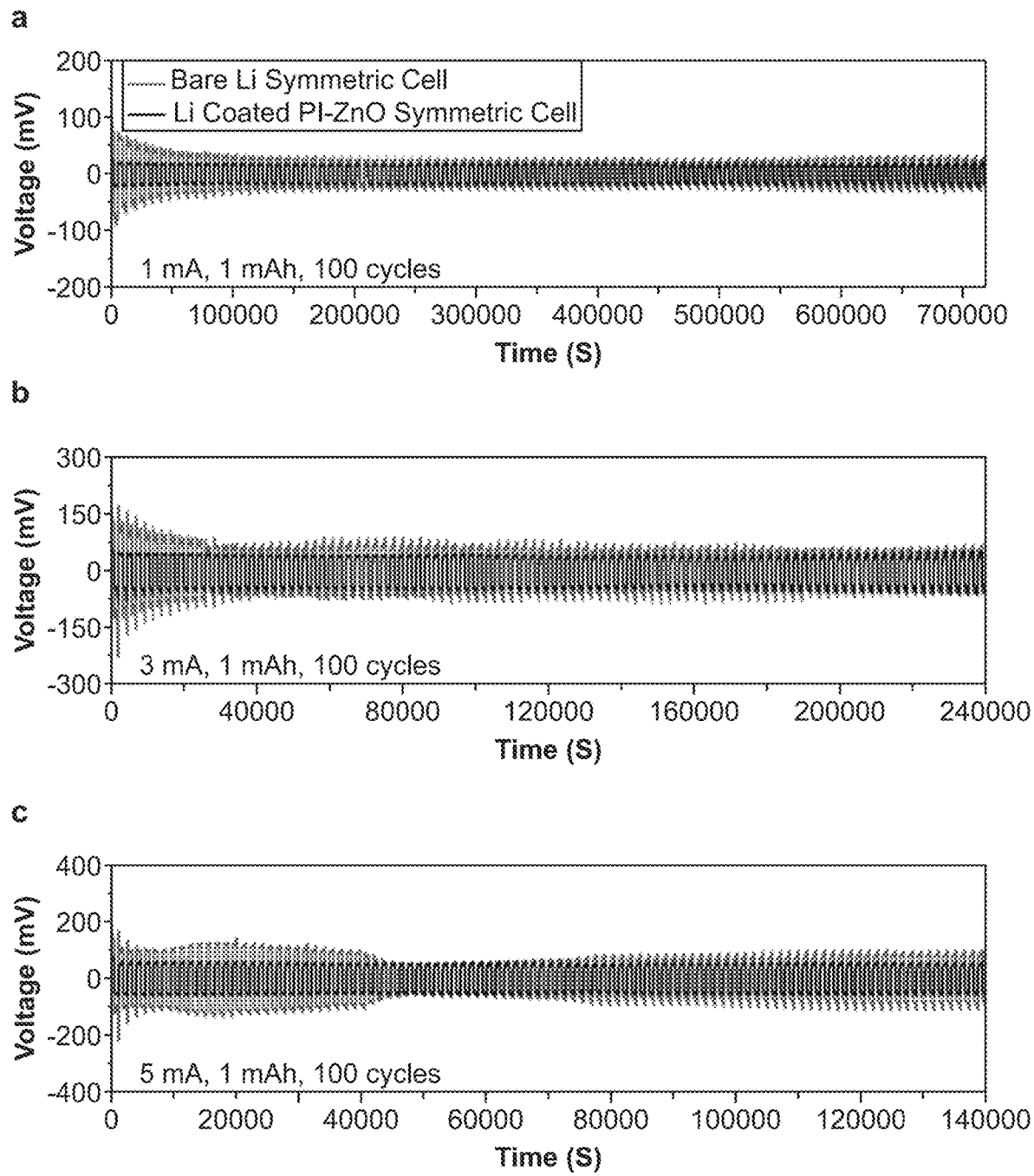

FIG. 50. Comparison of the cycling stability of the Li-coated PI matrix and the bare Li electrode at a current density of (a) about 1 mA/cm², (b) about 3 mA/cm² and (c) about 5 mA/cm² in DOL/DME electrolyte. The amount of Li cycled was about 1 mAh/cm². Necking of the voltage profile of the bare Li (overpotential first decreases and then increases) can be observed in (c) due to dendrite growth during cycling, which reduces the effective current density, leading to reduced overpotential.

Figure 51:
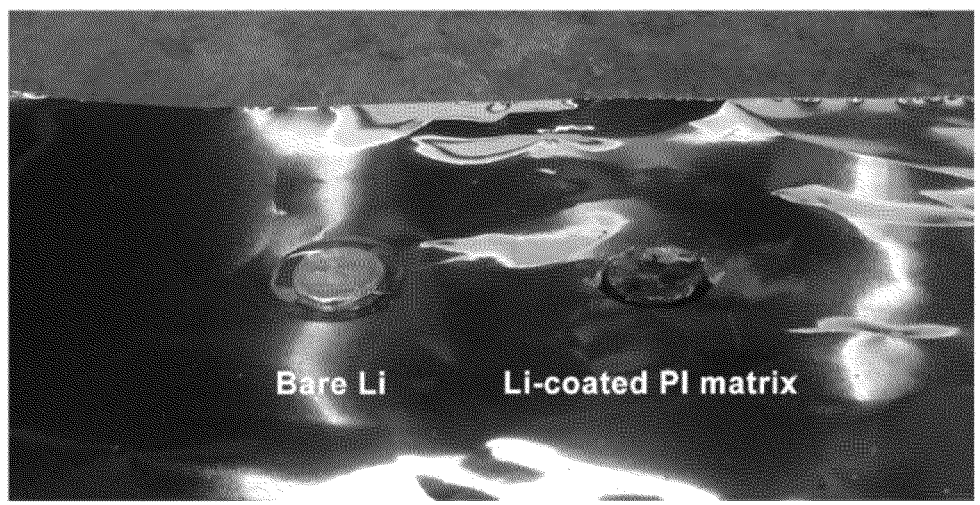

FIG. 51. Image of a Li-coated PI matrix and a bare Li electrode with about 10 µl electrolyte. The Li-coated PI matrix can uptake a large amount of electrolyte due to its porous nature.

Figure 52:
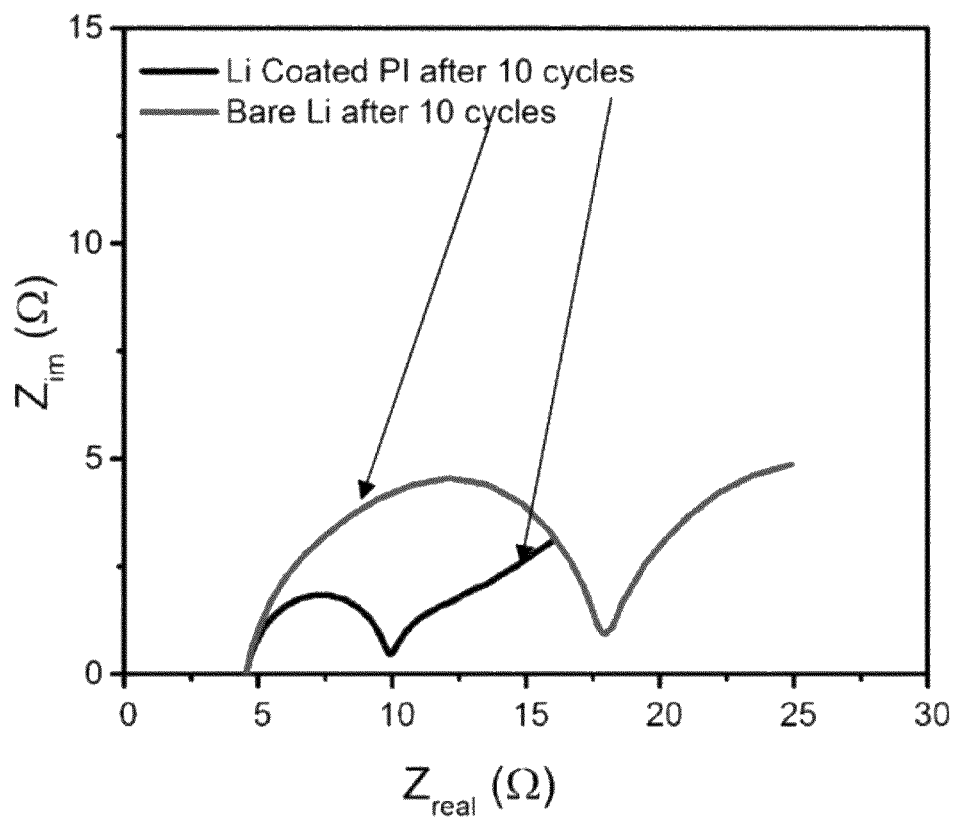

FIG. 52. Nyquist plot of the impedance spectra of the symmetrical Li-coated PI matrix and the bare Li cell after 10 cycles in DOL/DME at a current density of about 1 mA/cm².

Figure 53:
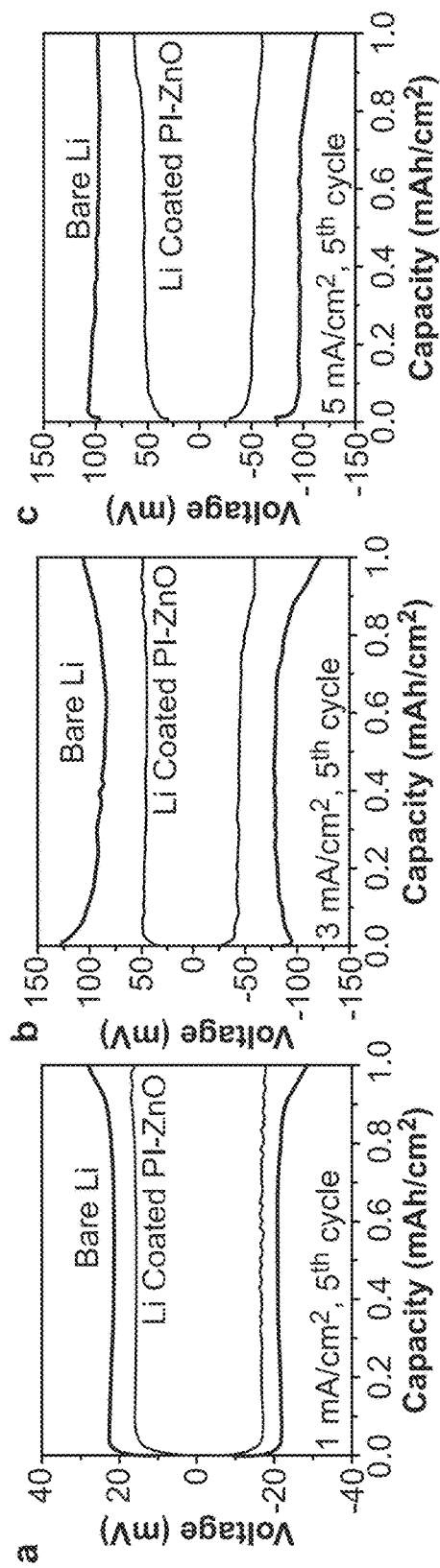

FIG. 53. Voltage profiles of Li-coated PI matrix and bare Li electrode at a current density of (a) about 1 mA/cm², (b) about 3 mA/cm² and (c) about 5 mA/cm² after 10 cycles. The amount of Li cycled was about 1 mAh/cm² in all cases.

Figure 54:
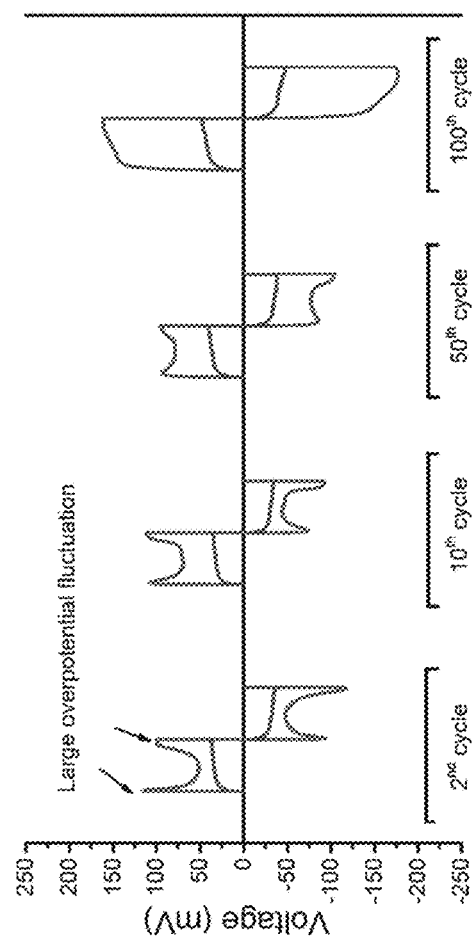

FIG. 54. Selected overpotential profiles of the Li-coated PI electrode and the bare Li electrode in EC/DEC at a current density of about 1 mA/cm². The Li-coated electrode exhibited a flat stripping/plating profile while that of the bare Li electrode showed large "overpotential bumps". The fluctuation attenuated in later cycles due to the formation of Li dendrites that roughened the surface and reduced the effective current density.

Figure 55:
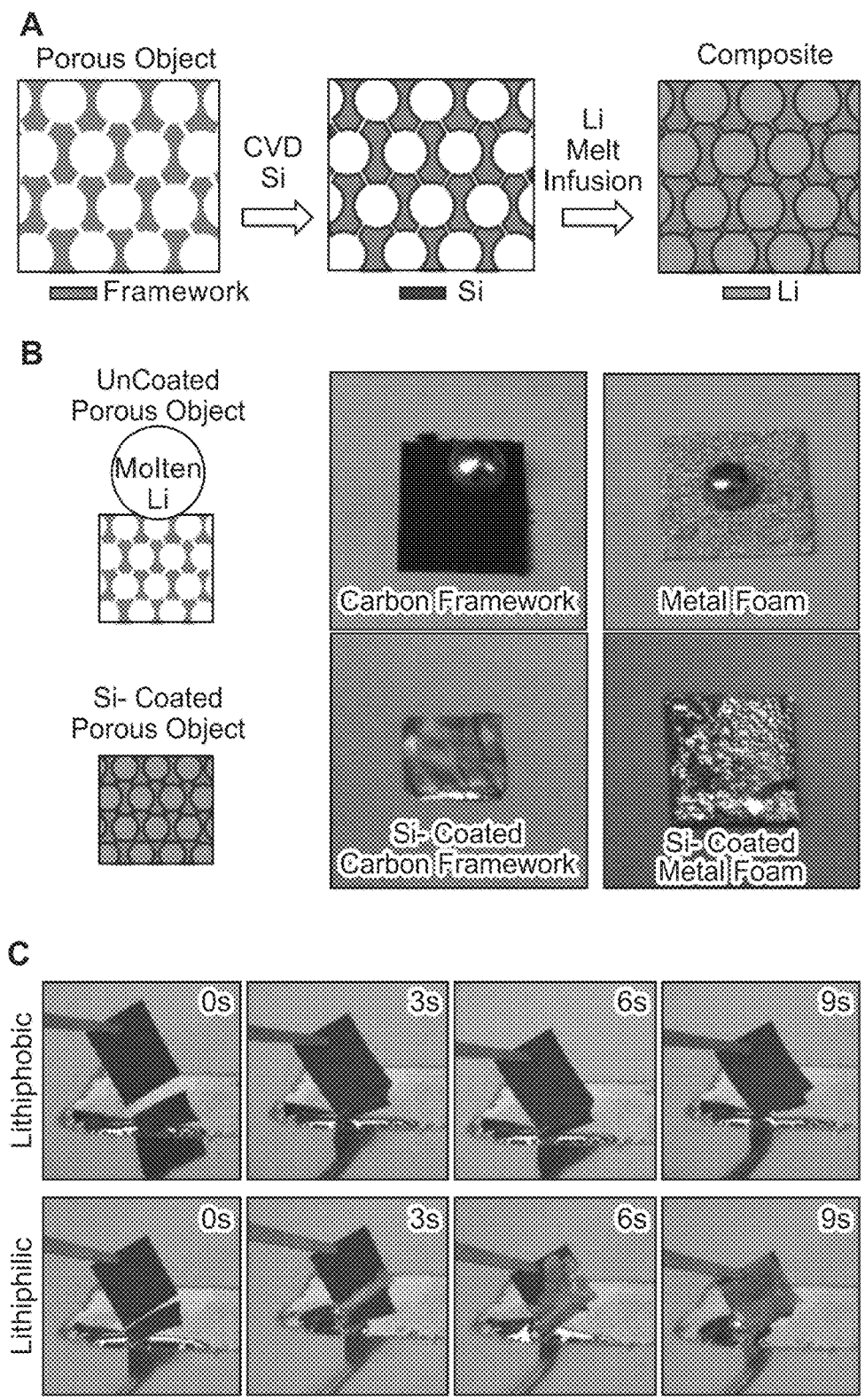

FIG. 55. Schematic and optical images of Li encapsulation by melt-infusion. (A) Schematic illustration of the design of a Li—scaffold composite. (B) Li wetting property of various porous materials with and without the Si coating. (C) Time-lapse images of Li melt-infusion process for lithiophilic and lithiophobic materials.

Figure 56:
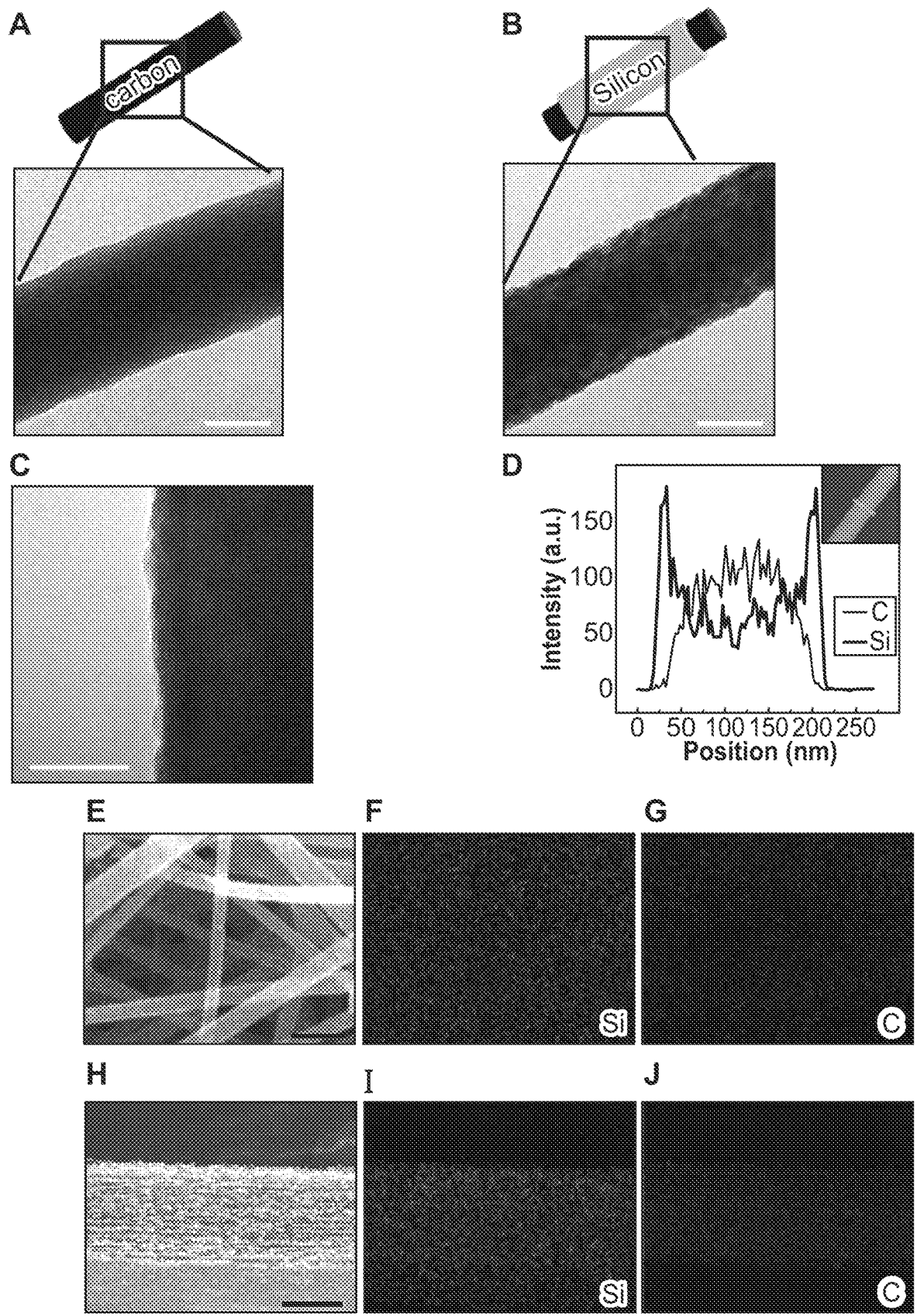

FIG. 56. Microscopic characterizations of the bare carbon fiber and Si-coated carbon fiber. (A) TEM image of a single uncoated carbon fiber. (B and C) TEM image (B) of a single Si-coated carbon fiber and its zoom-in image (C). (D, Inset) TEM-EDS linear scan profile obtained along the line on a single fiber shown in the inset. The TEM-EDS linear scan exhibits the different material compositions of inner and outer region of the fiber. (E-J) SEM-EDS characterization. Top-view SEM image (E) and cross-section SEM image (H) of the fiber layer. The corresponding elemental mapping for silicon (F and I) and carbon (G and J). (A-C) Scale bar, 100 nm. (E) Scale bar, 500 nm. (H) Scale bar, 50 µm.

Figure 57:
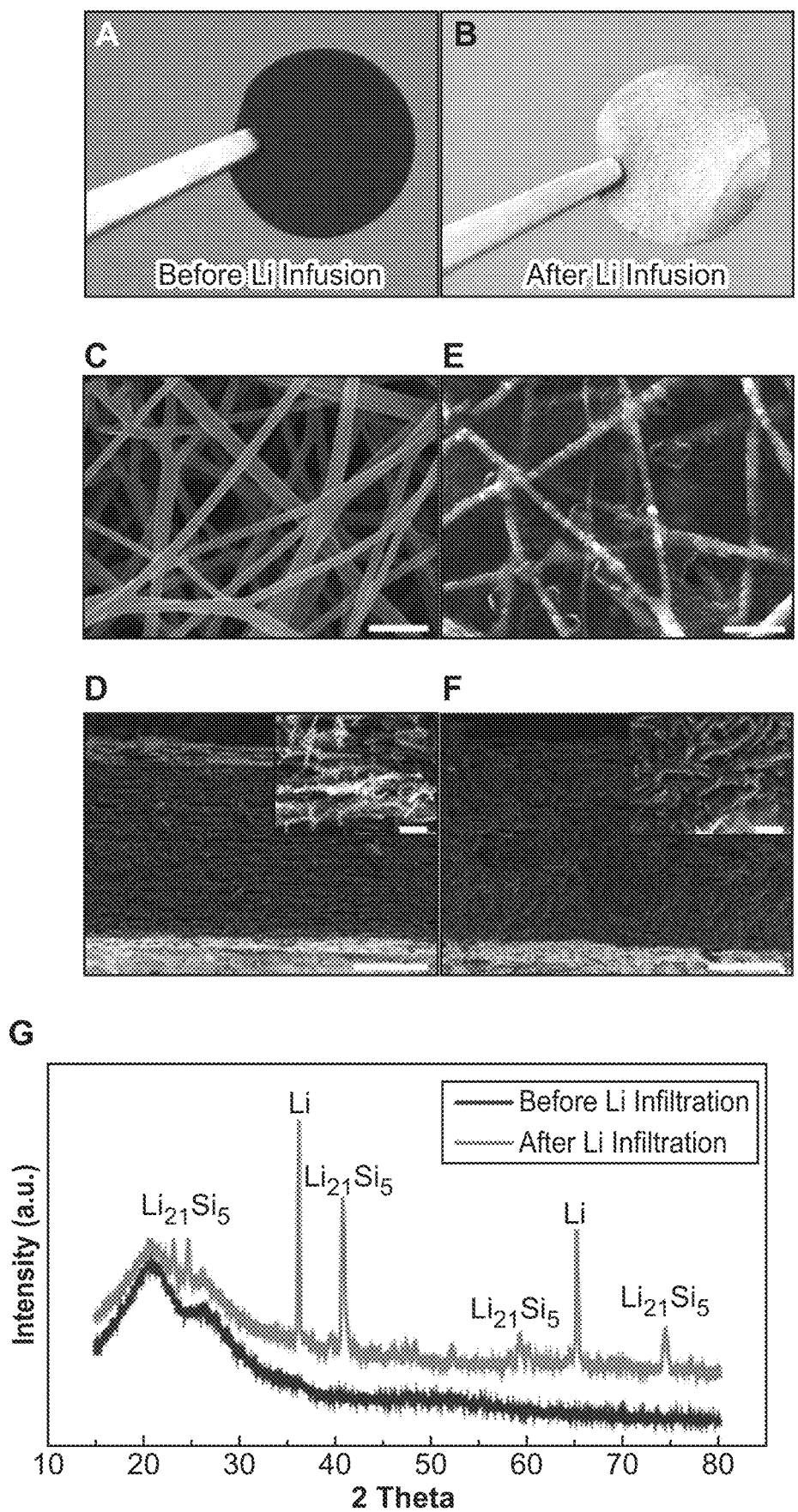

FIG. 57. SEM and XRD study of the Li/C composite material. Optical images and SEM characterizations of the modified carbon fiber network before (A, C and D) and after (B, E and F) Li infusion. The insets show corresponding high-magnification images. (G) XRD pattern collected from the modified carbon fiber before and after Li infiltration. (C and E) Scale bar, 1 µm (D and F) Scale bar, 50 µm. Insets, scale bar, 2 µm.

Figure 58:
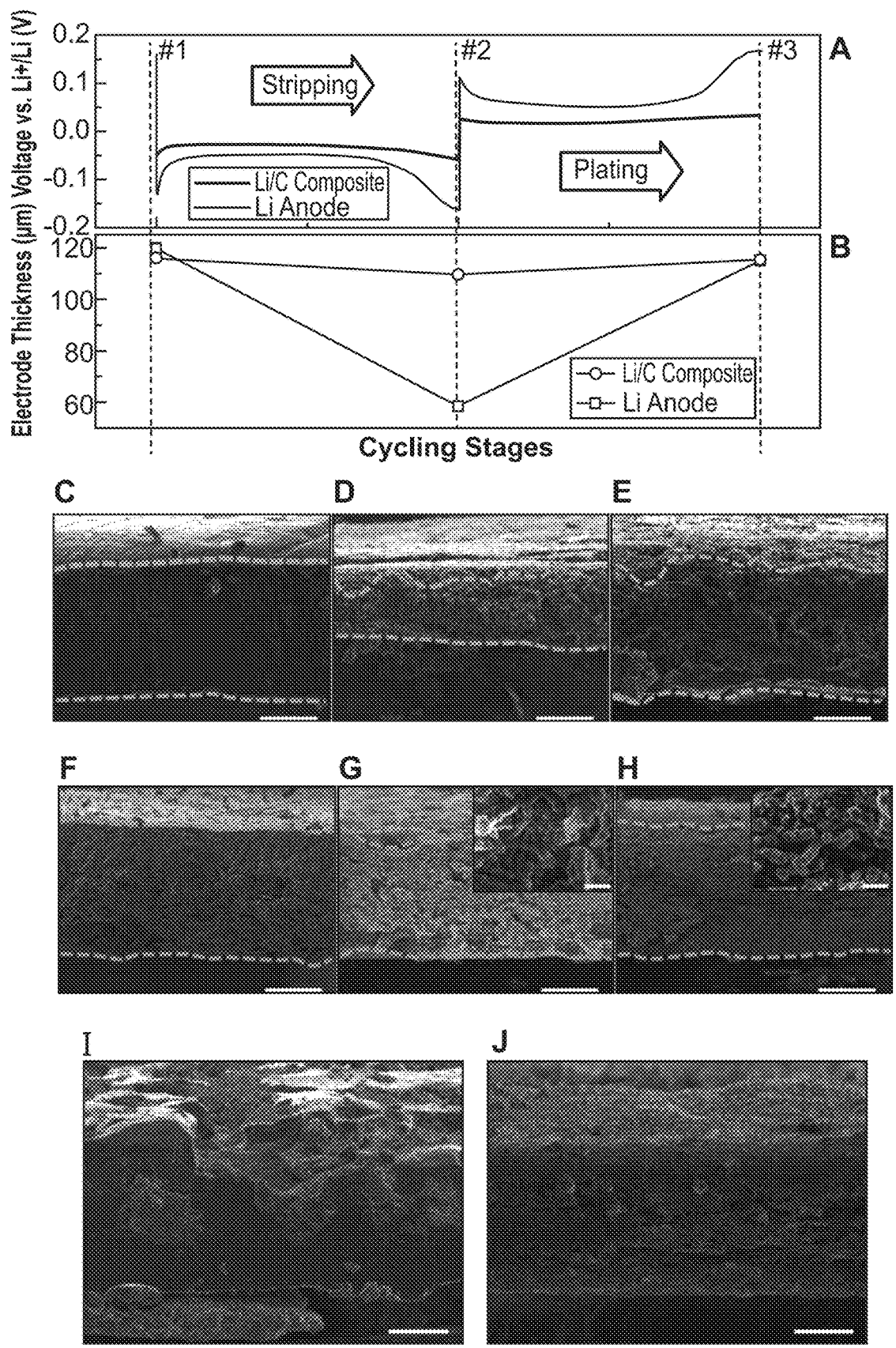

FIG. 58. Volume fluctuation of the electrode during different cycling stages. Voltage profile of a typical Li-stripping-plating process for the anode (A) and its corresponding thickness (B) at various stages of cycling. #1 corresponds to the stage before cycling; #2 corresponds to the stage after about 50% Li extraction (about 10 mAh/cm²); #3 corresponds to the stage after Li plating back. (C-E) A sequence of cross-sectional SEM images showing the huge volume fluctuation and shape change of the bare Li metal anode in a typical Li-stripping-plating cycle. (F-H) A sequence of cross-sectional SEM images showing the relatively stable Li/C electrode. (I and J) Morphology study of cross-sections of bare Li electrode (I) and Li/C electrode (J) after 30 cycles at a current density of about 3 mA/cm² for about 1 mAh/cm². (J) Cross-sectional SEM image of Li/C electrode showing an unaltered shape after cycling. (C-J) Scale bar, 50 µm. Insets, scale bar, 2 µm.

Figure 59:
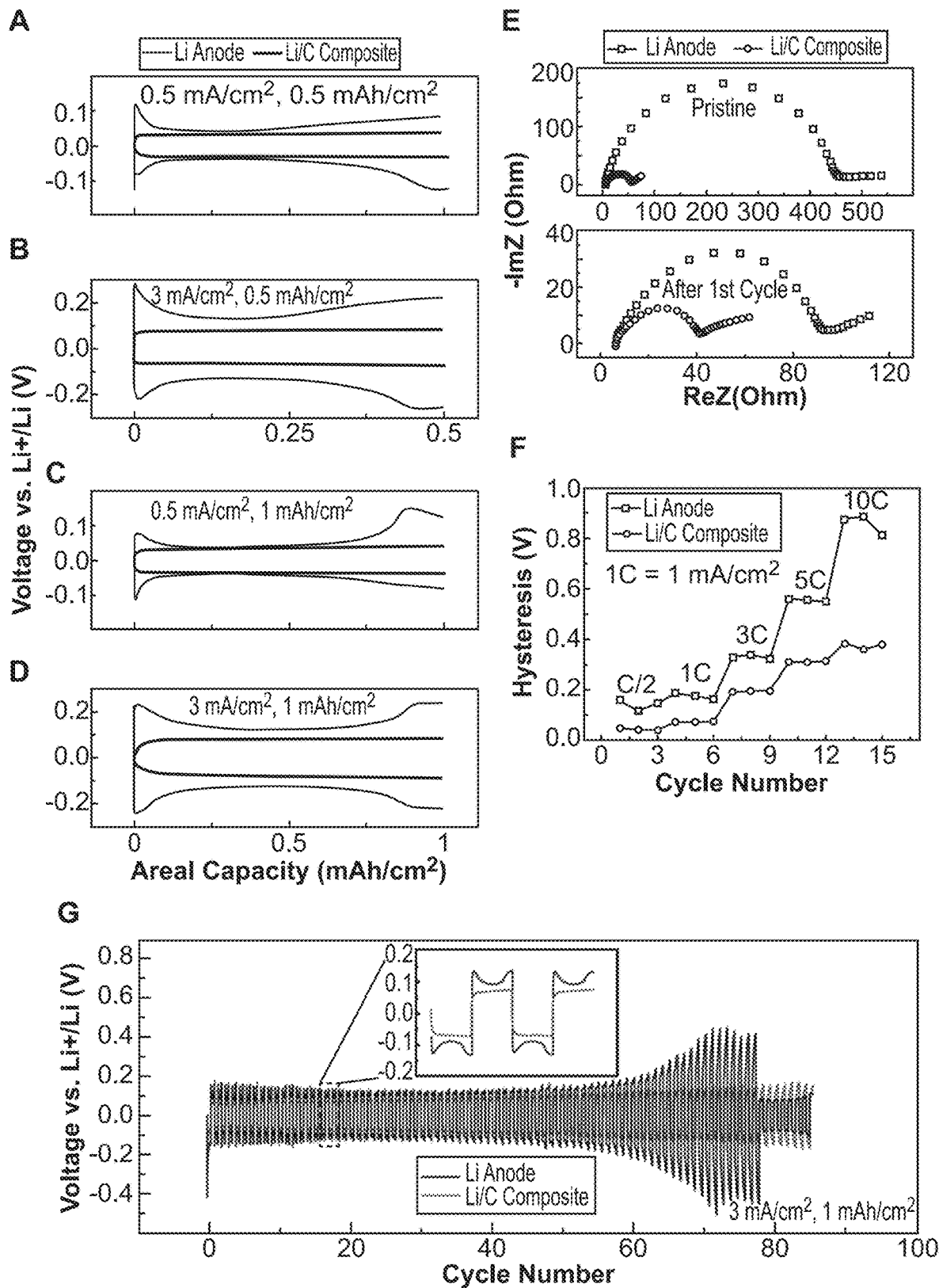

FIG. 59. Electrochemical performances of Li symmetrical cells and Li/C symmetrical cells. (A-D) Typical voltage profiles of Li-plating-stripping process with current density of about 0.5 mA/cm² for about 0.5 mAh/cm² (A), about 3 mA/cm² for about 0.5 mAh/cm² (B), about 0.5 mA/cm² for about 1 mAh/cm² (C) and about 3 mA/cm² for about 1 mAh/cm² (D). (E) Impedance spectroscopy of Li/C and bare Li electrode. (F) Comparison of voltage hysteresis of the Li-plating/stripping process for Li/C and Li electrode under various current rates. (G) Long-term cycling performance of Li/C and bare Li symmetrical cells with current density of about 3 mA/cm² for a total of about 1 mAh/cm².

Figure 60:
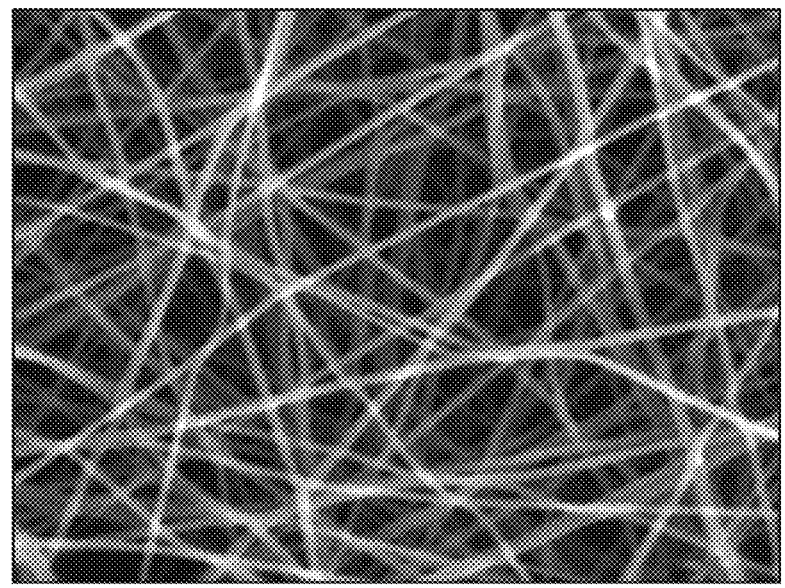
Figure 60:
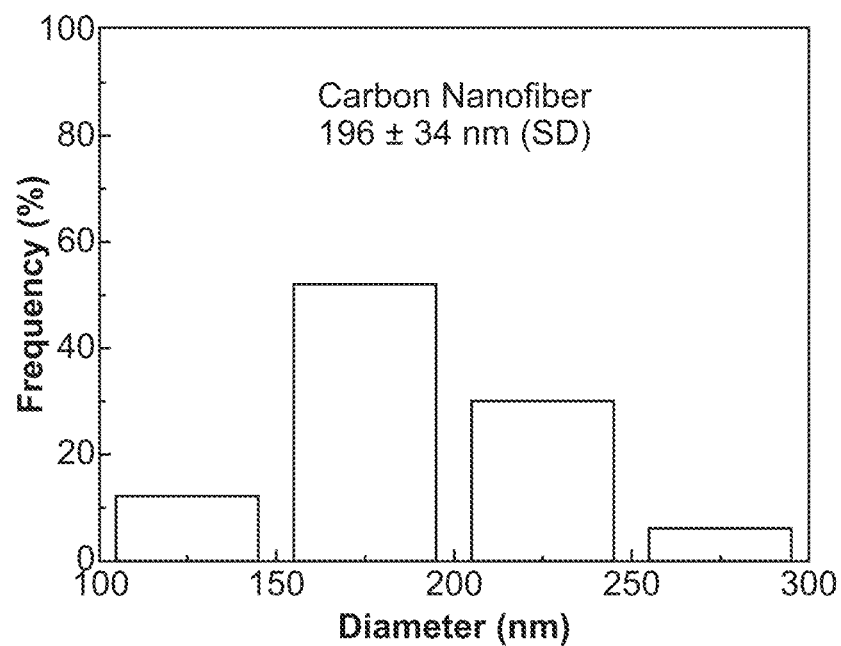

FIG. 60. Statistics of the carbon fiber diameter distribution. (A) SEM image of pristine carbon nanofiber before cycling. (B) Fiber diameter distribution showing an average size of 196 nm with a standard deviation of 34 nm based on a count number of 50.

Figure 61:
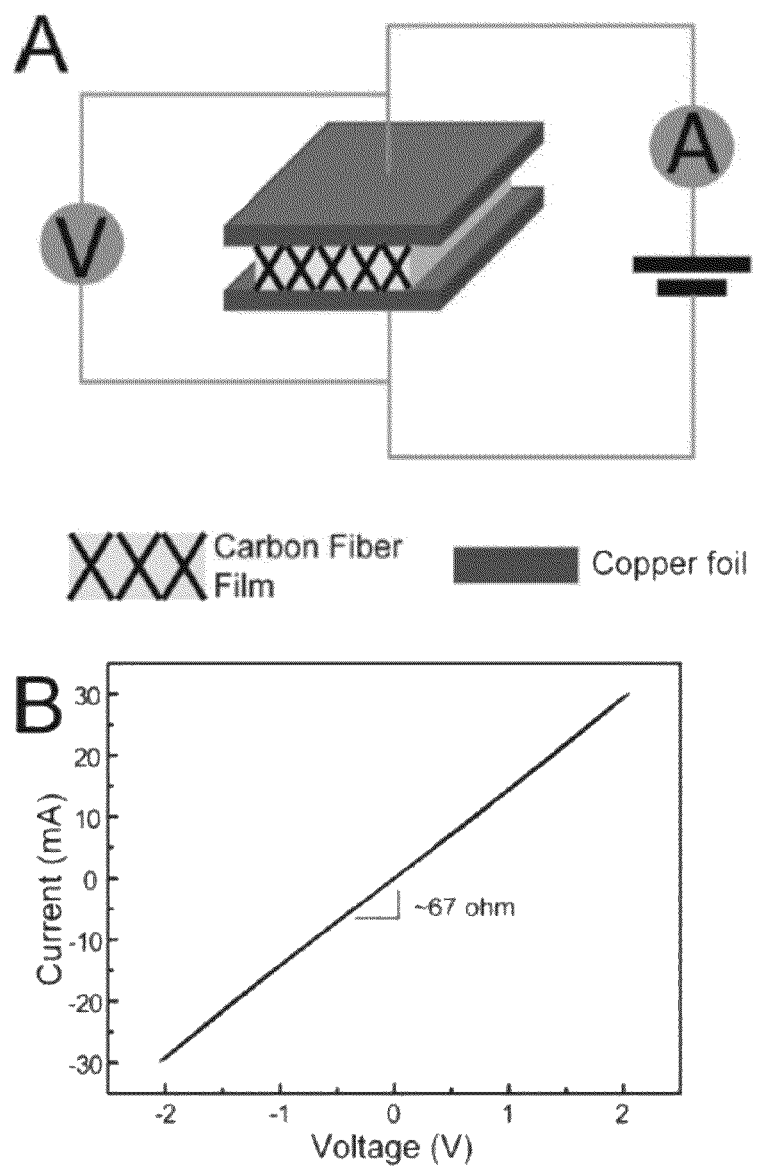

FIG. 61. Current-Voltage characteristics of the carbon fiber. (A) Schematics of the current-voltage measurement experiment setup. The thickness of the carbon fiber film is about 100-120 µm and the area is about 1 cm². (B) Current-voltage curve for through-plane resistance measurement of the carbon fiber film at a scan rate of about 50 mV/s for 3 times repetition.

Figure 62:
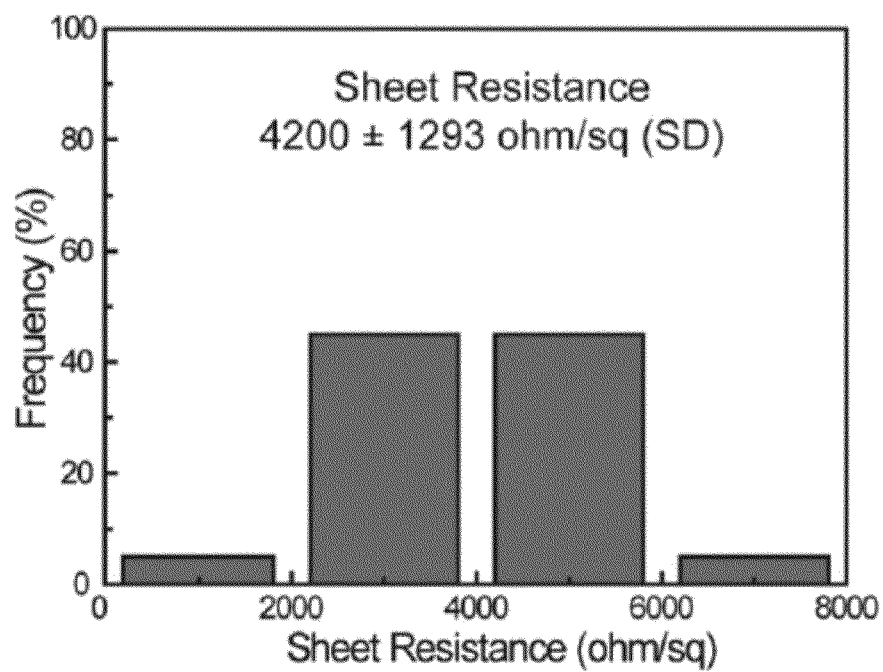

FIG. 62. Sheet resistance of PAN-based carbon fiber film using a four point meter based on 20 samples. The samples were cut into rectangles of about 1 cm×3 cm with a thickness of about 100-120 µm.

Figure 63:
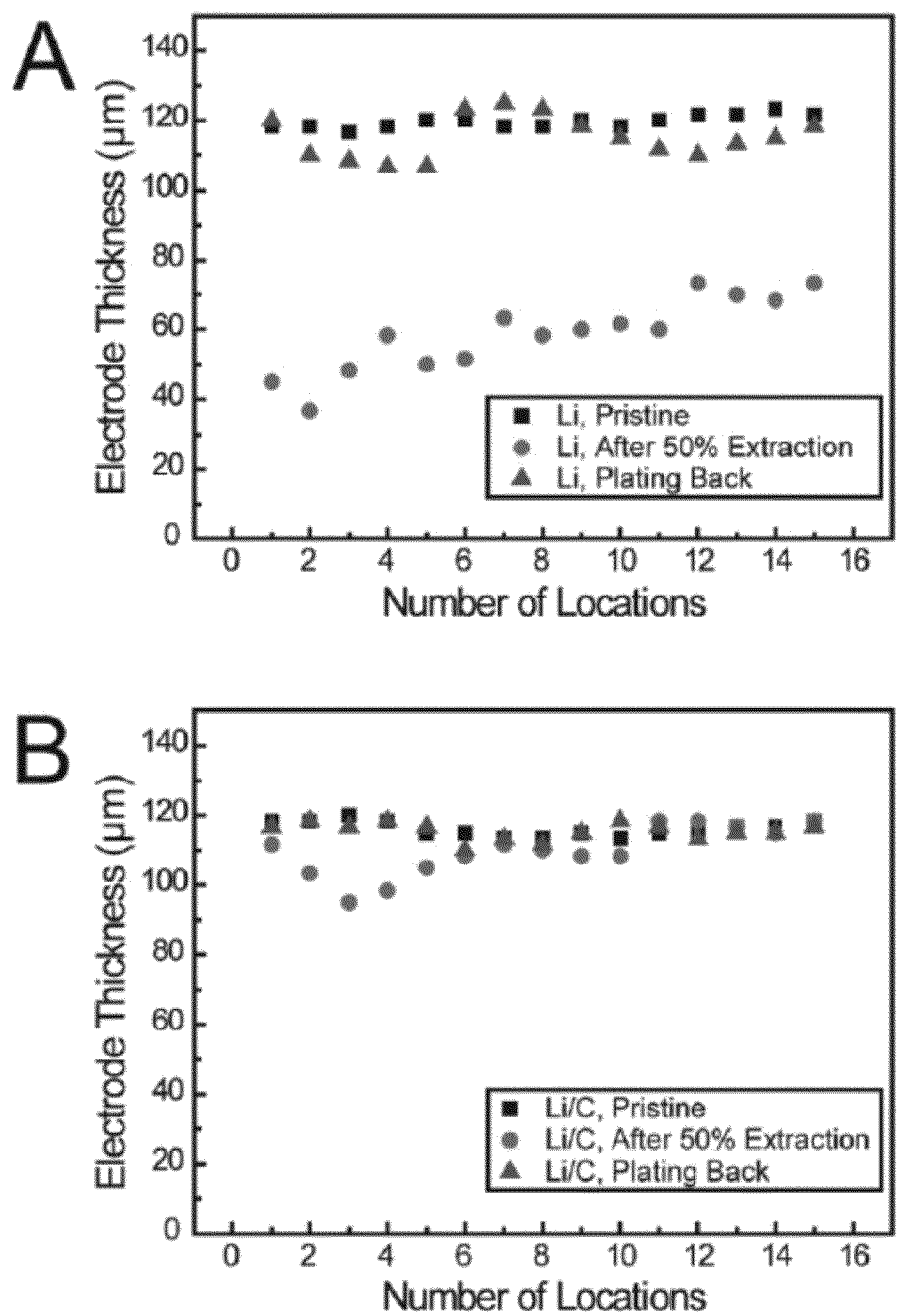

FIG. 63. Electrode thickness at 15 locations for the Li electrode and Li/C electrode cross-sections at different stages. (A) Electrode thickness of bare Li electrode at pristine stage, stripped stage and plated stage. (B) Electrode thickness of Li/C electrode at pristine stage, stripped stage and plated stage.

Figure 64:
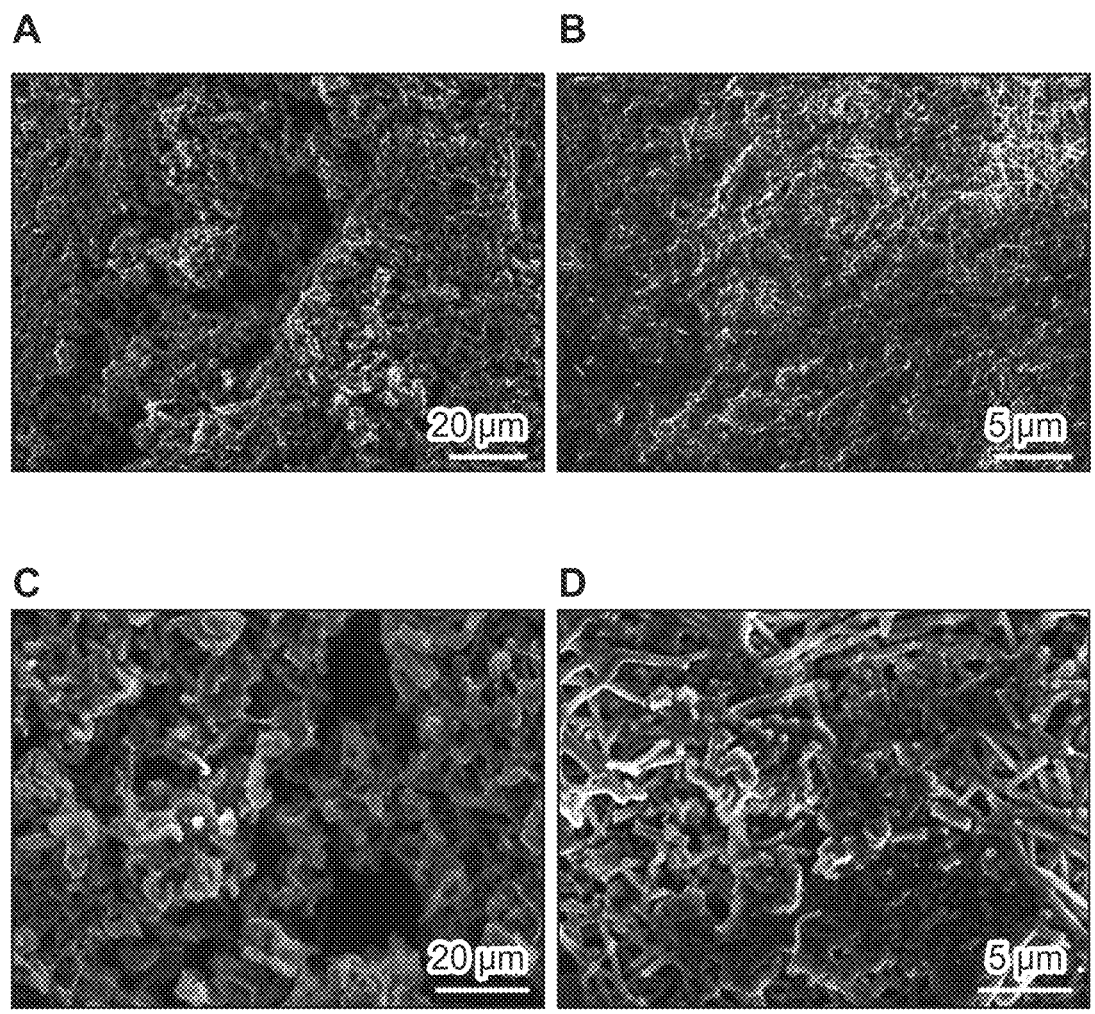

FIG. 64. Morphology study of Li electrode and Li/C electrode after 30 cycles at a current density of about 3 mA/cm² for about 1 mAh/cm². (A and B) Top-view SEM images of ramified growth of dendritic Li for bare Li electrode. (C and D) Top-view SEM images of Li/C electrode showing a relatively smooth surface. (A and C) Scale bar, 20 μm. (B and D) Scale bar, 5 μm.

DESCRIPTION

Rechargeable batteries based on Li metal anodes are desirable for next generation high-energy-density and high-power electrochemical energy storage. Nevertheless, excessive dendritic growth, virtually infinite dimension change during repeated cycles together with limited power output severely hinder practical applications. The 'hostless' nature of the Li stripping/plating process is the origin of many difficulties associated with the use of Li metal anodes. Here, some embodiments are directed to the design of an anode in which a porous matrix or scaffold is included as a "host" for metallic lithium, which together with the porous matrix form a composite lithium metal anode. Supported by a mechanically stable or rigid matrix, reduced electrode-level dimensional variation during repeated cycling can be achieved. Moreover, the porous nature of the matrix can accommodate deposition of Li within the matrix and can afford a large activated surface area for Li deposition, which yields enhanced uniformity of nucleation with little or no dendrite formation. Li batteries incorporating composite lithium metal anodes can demonstrate enhanced capacity retention, including under high-power operation. The improvement in electrochemical performance indicates the effectiveness of the anode design for developing safe and stable metallic Li anodes.

Figure 1:
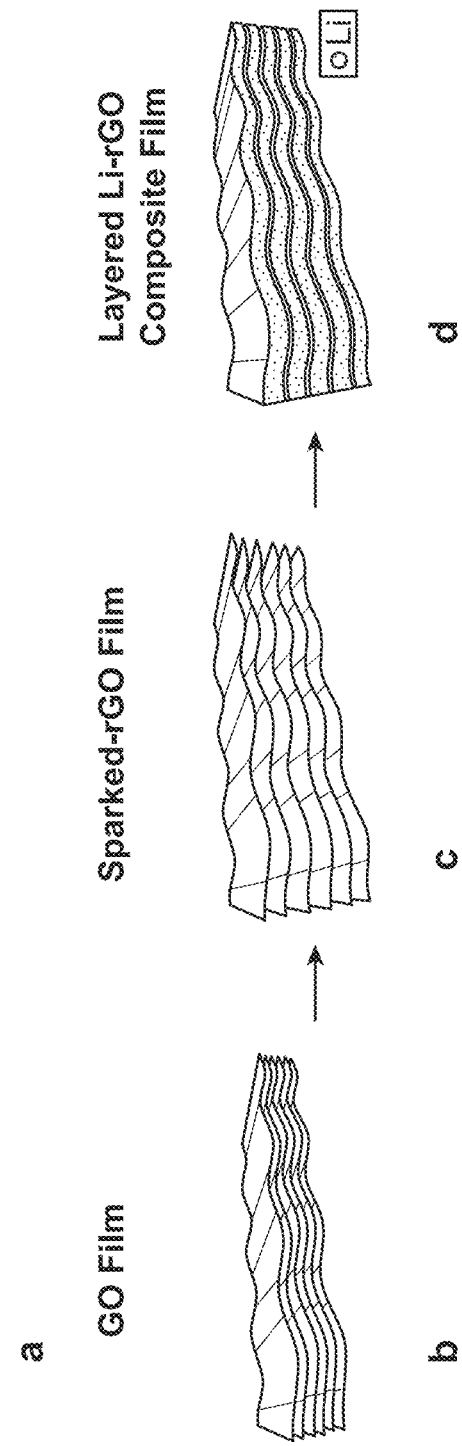
FIG. 1. Schematic of a battery.

Some embodiments are directed to a lithium battery 100, which includes a cathode 102, an anode 106, and an electrolyte 104 disposed between and in contact with the cathode 102 and the anode 106 (see FIG. 1). In some embodiments, the battery 100 is a lithium-ion battery, and the cathode 102 includes a transition metal oxide, such as lithium cobalt oxide ($LiCoO_2$), lithium manganese oxide ($LiMn_2O_4$), lithium nickel manganese cobalt oxide ($LiNi_xMn_yCo_zO_2$), or lithium iron phosphate ($LiFePO_4$). In some embodiments, the battery 100 is a lithium-sulfur battery, and the cathode 102 includes sulfur. In some embodiments, the battery 100 is a lithium-air battery, and the cathode 102 is a gas cathode, such as formed of porous carbon or other porous material. In some embodiments, the electrolyte 104 is a liquid electrolyte, such as a carbonate or an ether-based electrolyte, optionally including one or more additives.

In some embodiments, the anode 106 is a composite lithium metal anode, and includes a porous matrix and metallic lithium disposed within pores or other open spaces within the matrix. Depending on the particular implementation, the porous matrix can be electronically insulating, electronically conductive, or semiconducting; and can be ionically insulating with respect to Li ions ($Li^+$), or ionically conductive with respect to $Li^+$; or can have a combination of two or more of the foregoing characteristics. In the case of an electronically conductive implementation, the porous matrix can have a through-plane resistance of about 500 ohm or less, about 400 ohm or less, about 300 ohm or less, about 200 ohm or less, or about 100 ohm or less, and down to about 60 ohm or less, or down to about 50 ohm or less, and a sheet resistance of about 20000 ohm/sq or less, about 15000 ohm/sq or less, about 10000 ohm/sq or less, about 8000 ohm/sq or less, or about 6000 ohm/sq or less, and down to about 4000 ohm/sq or less, or down to about 2000 ohm/sq or less. In some embodiments, the porous matrix includes a fibrous material, such as a network of fibers formed of carbon, polyimide or another polymer, or another suitable material. For example, the porous matrix can include carbon fibers (e.g., carbon nanofibers) or polymeric fibers (e.g., polymeric nanofibers) having lateral dimensions (e.g., diameters), or an average lateral dimension (e.g., an average diameter), in the nanometer (nm) range, such as in the range of about 10 nm to about 1000 nm, about 50 nm to about 1000 nm, about 50 nm to about 500 nm, about 100 nm to about 1000 nm, about 100 nm to about 500 nm, about 200 nm to about 1000 nm, about 200 nm to about 500 nm, about 300 nm to about 1000 nm, or about 300 nm to about 500 nm. In some embodiments, the porous matrix includes a layered material, such as layered reduced graphene oxide or another suitable layered material. In some embodiments, the porous matrix includes a porous film, such as formed of a $Li^+$ conductive material or another suitable material. Other types of porous matrices are contemplated, such as in the form of foams or meshes.

Examples of suitable materials for the porous matrix include carbon or carbon-based materials, such as carbon fibers (e.g., carbon nanofibers), polymeric fibers (e.g., polymeric nanofibers), layered reduced graphene oxide, carbon nanotubes, and mesoporous carbon.

Additional examples of suitable materials for the porous matrix include $Li^+$ conductive materials, such as lithium-containing binary alloys of the formula $Li_xM$, where M is a Group 14 element, and x indicates the atomic ratio of Li to M and can be, for example, about 5:1 or less, about 4.5:1 or less, about 4:1 or less, about 3:1 or less, or about 2:1 or less, and down to about 1:1, down to about 1:3, or down to about 1:6. In some embodiments, x is in the range of about 5:1 to about 4:1 or about 4:1 to about 3:1. The Group 14 element can be selected from, for example, carbon (C), silicon (Si), germanium (Ge), tin (Sn), and lead (Pb). In some embodiments, the porous matrix includes $Li_xC$. In some embodiments, the porous matrix includes $Li_xSi$. In some embodiments, the porous matrix includes $Li_xGe$. In some embodiments, the porous matrix includes $Li_xSn$. In some embodiments, the porous matrix includes nanoparticles that include $Li_xM$, such as having at least one dimension in the range of about 1 nm to about 1000 nm, about 500 nm or less, about 400 nm or less, about 300 nm or less, or about 200 nm or less, and down to about 100 nm or less, down to about 50 nm or less, down to about 20 nm or less, or down to about 10 nm or less. In some embodiments, the porous matrix further includes, in addition to $Li_xM$, a lithium-containing compound, such as an oxide, a fluoride, a sulfide, a selenide, a chloride, a bromide, a iodide, a phosphide, or a nitride of lithium. In some embodiments, the porous matrix includes an oxide of lithium, such as $Li_2O$. In some embodiments, the porous matrix includes nanoparticles that include a lithium-containing compound, such as having at least one dimension in the range of about 1 nm to about 1000 nm, about 500 nm or less, about 400 nm or less, about 300 nm or less, or about 200 nm or less, and down to about 100 nm or less, down to about 50 nm or less, down to about 20 nm or less, or down to about 10 nm or less, and where the nanoparticles including the lithium-containing compound are interspersed with nanoparticles including $Li_xM$ to form the porous matrix. Further examples of suitable $Li^+$ conductive materials include solid-state electrolyte materials such as lithium phosphorus oxynitride (LiPON), $Li_7La_3Zr_2O_{12}$ (LLZO), $Li_{10}GeP_2S_{12}$ (LGPS), LLAO, and so forth.

In some embodiments, a characterization of the porous matrix is its porosity, which is a measure of the extent of voids resulting from the presence of pores or any other open spaces in the porous matrix. A porosity can be represented as a ratio of a volume of voids relative to a total volume, namely between 0 and 1, or as a percentage between 0% and 100%. In some embodiments, the porous matrix can have a porosity that is at least about 0.1 and up to about 0.95 or more, and, more particularly, a porosity can be in the range of about 0.1 to about 0.9, about 0.2 to about 0.9, about 0.3 to about 0.9, about 0.4 to about 0.9, about 0.5 to about 0.9, about 0.5 to about 0.8, or about 0.6 to about 0.8. Techniques for determining porosity include, for example, porosimetry and optical or scanning techniques.

In some embodiments, another characterization of the porous matrix is its surface area, such as its Brunauer-Emmett-Teller (BET) surface area, which can be at least about 9 m$^2$ g$^{-1}$, at least about 10 m$^2$ g$^{-1}$, at least about 13 m$^2$ g$^{-1}$, at least about 15 m$^2$ g$^{-1}$, at least about 20 m$^2$ g$^{-1}$, at least about 50 m$^2$ g$^{-1}$, at least about 100 m$^2$ g$^{-1}$, at least about 200 m$^2$ g$^{-1}$, or at least about 300 m$^2$ g$^{-1}$, and up to about 400 m$^2$ g$^{-1}$ or greater, or up to about 500 m$^2$ g$^{-1}$ or greater.

In some embodiments, another characterization of the porous matrix is its light-weight nature, such as having a density of about 3 g cm$^{-3}$ or less, about 2.8 g cm$^{-3}$ or less, about 2.5 g cm$^{-3}$ or less, about 2.3 g cm$^{-3}$ or less, about 2 g cm$^{-3}$ or less, or about 1.8 g cm$^{-3}$ or less, and down to about 1.5 g cm$^{-3}$ or less, down to about 1.3 g cm$^{-3}$ or less, or down to about 1 g cm$^{-3}$ or less. In some embodiments, in at least one cycling state of the battery 100 (such as one in which the anode is substantially fully plated with Li), the porous matrix can account for no more than about 50% of a total weight of the anode 106, such as no more than about 40%, no more than about 35%, no more than about 30%, no more than about 25%, no more than about 20%, no more than about 15%, no more than about 10%, or no more than about 8%, and down to about 7% or less, or down to about 5% or less.

In some embodiments, the anode 106 omits a current collector, and is composed primarily of (e.g., in terms of weight percentage), consists essentially of, or consists of the porous matrix and metallic lithium.

In some embodiments, lithium metal is included in the anode 106 as Li domains (e.g., nano-sized Li domains) within pores or any other open spaces in the porous matrix. In some embodiments, the Li domains have at least one dimension in the range of about 1 nm to about 1000 nm, such as about 900 nm or less, about 800 nm or less, about 700 nm or less, about 600 nm or less, about 500 nm or less, about 400 nm or less, about 300 nm or less, or about 200 nm or less, and down to about 100 nm or less, down to about 50 nm or less, down to about 20 nm or less, or down to about 10 nm or less.

In some embodiments, the anode 106 is formed as a composite lithium metal anode, by a manufacturing method including providing the porous matrix, providing liquefied or molten Li metal (e.g., in a state at or above the melting point of Li of about 180° C.), and infusing or infiltrating the liquefied Li metal into the porous matrix. In some embodiments, the porous matrix has a high thermal stability up to a temperature above the melting point of Li, such as up to about 600° C., up to about 550° C., up to about 500° C., up to about 450° C., up to about 400° C., up to about 350° C., or up to about 300° C., as reflected, for example, through thermogravimetric analysis. In some embodiments, the porous matrix has a high electrochemical and chemical stability with respect to Li, so as to reduce or avoid undesired reactions during manufacturing or during Li stripping/plating processes.

In some embodiments, the porous matrix is intrinsically "lithiophilic" or is rendered or otherwise treated to become "lithiophilic", so as to facilitate infusing of lithium metal into the porous matrix. "Lithiophilicity" or "lithiophilic" nature of a material refers to an affinity of the material towards lithium metal, such as in its liquefied or molten state. In some embodiments, "lithiophilic" nature of a material can be characterized according to wettability of a solid surface of the material by liquefied or molten Li metal. A measure of wettability is a contact angle between the solid surface and a drop of liquefied Li metal disposed on the surface, where the contact angle is the angle at which the liquid-vapor interface intersects the solid-liquid interface. As the tendency of the liquefied Li metal to spread over the solid surface increases, the contact angle decreases. Conversely, as the tendency of the liquefied Li metal to spread over the solid surface decreases, the contact angle increases. Contact angles less than 90° (low contact angles) typically indicate that wetting of the solid surface is favorable (high wetting), while contact angles greater than or equal 90° (high contact angles) typically indicate that wetting of the surface is unfavorable (low wetting). In some embodiments, the porous matrix is or is rendered "lithiophilic" so as to form a contact angle with liquefied Li metal of less than 90°, such as about 89° or less, about 87° or less, about 85° or less, about 80° or less, about 75° or less, about 70° or less, about 65° or less, about 60° or less, or about 50° or less, and down to about 30° or less, down to about 20° or less, or down to about 10° or less.

In some embodiments, the porous matrix is formed of an intrinsically "lithiophilic" material, such as layered reduced graphene oxide, and is readily infused with liquefied Li metal to form a composite lithium metal anode. In some embodiments, the porous matrix is rendered or otherwise treated to become "lithiophilic", such as by applying a coating of a "lithiophilic" material to an initial porous material to form the porous matrix that is rendered "lithiophilic", by surface functionalization with functional groups, such carbonyl (C=O), alkoxy (C—O), or epoxyl (C—O—C), which afford strong Li binding, or by removing surface functional groups which afford weak Li binding. In some embodiments, the porous matrix is rendered "lithiophilic" by applying a coating of M, such as by chemical vapor deposition (CVD), and infusion of liquefied Li metal can yield a reaction that forms Li$_x$M and additional Li metal, where M is a Group 14 element, and x indicates the atomic ratio of Li to M and can be, for example, about 5:1 or less, about 4.5:1 or less, about 4:1 or less, about 3:1 or less, or about 2:1 or less, and down to about 1:1, down to about 1:3, or down to about 1:6. In some embodiments, x is in the range of about 5:1 to about 4:1 or about 4:1 to about 3:1. The Group 14 element can be, for example, silicon (Si), and the reaction can yield Li$_x$Si and Li. In some embodiments, the porous matrix is rendered "lithiophilic" by applying a coating of a metal (M')-containing compound, such as an oxide of M' that is applied by atomic layer deposition (ALD), and infusion of liquefied Li metal can yield a reaction that forms Li$_y$M', a lithium-containing compound, such as an oxide of Li like Li$_2$O, and additional Li metal, where M' is a metal different from Li, such as zinc (Zn) or other transition metal, and y indicates the atomic ratio of Li to M' and can be, for example, about 3:1 or less, about 2:1 or less, or about 1:1 or less.

EXAMPLES

The following examples describe specific aspects of some embodiments of this disclosure to illustrate and provide a description for those of ordinary skill in the art. The examples should not be construed as limiting this disclosure, as the examples merely provide specific methodology useful in understanding and practicing some embodiments of this disclosure.

Example 1

Layered Reduced Graphene Oxide with Nanoscale Interlayer Gaps as Stable Host for Lithium Metal Anodes Overview Lithium (Li) ion batteries have gained commercial success as the dominating power source for portable electronics and electric vehicles. Li metal, due to its highest theoretical capacity (about 3860 mAh $g^{-1}$), lowest electrochemical potential (about −3.040 V versus Standard Hydrogen Electrode), and light-weight nature (about 0.534 g $cm^{-3}$), is widely recognized to be the most prominent candidate for the next-generation high-energy-density Li battery anodes. Nevertheless, the dendritic deposition nature as well as the virtually infinite relative dimension change during cycling severely impede its practical applications. Extensive efforts have been devoted to tackle the problems of uneven Li deposition and unstable solid electrolyte interphase (SEI), while the electrode dimension stability is generally ignored. In this example, a 'host' for Li metal was introduced to solve the multifaceted problems. Exploiting the merits of carbon-based materials, inclusive of light-weight, high-surface-area and excellent electrochemical/mechanical stability, this example sets forth the design of a layered reduced graphene oxide (rGO) film with nanoscale interlayer gaps as the Li metal 'host'. In contrast to other carbon materials, rGO sheets exhibited surprisingly good surface Li affinity, and when coupled with nanoscale capillary force, uniform and efficient infusion of molten Li into the interlayer gaps can be realized. The as-obtained Li-rGO nanoscale layered structure exhibited high surface area, high Li content, and excellent flexibility, and also offered significantly reduced dimension change on the whole electrode level during cycling (about 20% versus virtually infinite for Li foil). As a consequence, reduced electrode dimension fluctuation, dendrite suppression, more stable electrode/electrolyte interface and high specific capacity (about 3390 mAh $g^{-1}$) can be fulfilled simultaneously, which opens up promising opportunities for stable Li anodes with outstanding electrochemical properties.

Introduction

Lithium (Li) metal is a particularly desired anode material for Li batteries. To realize applicable Li metal anodes, effort has been made to understand the Li deposition mechanism and tackle the problems of dendrite formation as well as unstable solid electrolyte interphase (SEI). The major strategies employed can be summarized into the following three categories: (i) developing electrolyte additives for the formation of stable SEI; (ii) engineering high modulus solid electrolyte to prevent dendrite penetration; and (iii) designing electrochemically and mechanically stable artificial interface for SEI stabilization and dendrite suppression. All of the above-mentioned approaches have been demonstrated to be efficacious to a certain extent for mitigating either or both the issues of dendritic Li growth and SEI collapse. Nevertheless, none of them addresses the relatively infinite electrode dimension change brought by the 'hostless' Li plating/stripping. It should be recognized that the stabilization of the electrode dimension is also important for the practical applications of Li anodes. With infinite relative volume change, the resulting huge internal stress fluctuation and the floating electrolyte/electrode interface can damage the cells and lead to potential safety hazards, and also bring about tremendous engineering challenges implementing the battery into a well-defined cell space. More importantly, SEI stabilization is also strongly correlative to dimensional stability. The SEI may not be able to accommodate the drastic variation of interfacial morphology and would thus face the danger of collapse during continuous cycling. Such SEI collapse can in turn exacerbate the locally favorable Li dendrite growth and the continuous electrolyte decomposition. As a consequence, an improved approach capable of solving the multifaceted problems including dimensional stability is desired for practical applications.

The virtually infinite dimension change of Li is originated from its 'hostless' nature. To address the problem, rational design of a 'host' for metallic Li is desired. Here, the host should satisfy several criteria. First, a mechanically stable scaffold with high porosity is desired in order to host maximum amount of Li and maintain a stable dimension during electrochemical cycling. Secondly, a light weight material with high surface area for Li nucleation is favorable. High density scaffold can significantly reduce the weight percentage of infused Li and thus lower the specific capacity; while limited surface area may concentrate the local ion flux, resulting in uneven deposition. In addition, the host material should be electrochemically stable under the highly reductive condition in the presence of Li. Otherwise, side reactions with the host will continuously consume the Li source through cycling, giving rise to low Coulombic efficiency (CE).

Considering these criteria, carbon-based materials are desired 'host' candidates for Li metal. Carbon is among the lightest materials available in the periodic table for the scaffold construction. It is also noted that carbon materials including carbon nanotubes (CNTs), graphene, and mesoporous carbon have appealingly high surface area with excellent mechanical strength. Moreover, carbon materials are generally stable under the redox environment within Li batteries.

However, to design the 'host' for Li metal, one extra criterion, namely, outstanding Li affinity ('lithiophilicity'), should be taken into account. Good Li affinity indicates strong binding between Li and the material's surface, which is desired for achieving both the uniform molten Li infusion during synthesis and the low Li nucleation barrier in later battery cycling. For most of the carbon materials, the relatively weak binding between Li and the carbon surface leads to their poor Li affinity, excluding many candidates as desired host materials. Surprisingly, it is found that reduced graphene oxide (rGO) has extremely high lithiophilicity, which is rather unique among carbon-based materials. In the presence of strongly reductive molten Li, GO can be partially reduced to remove most of the electrochemically unstable surface functional groups such as the hydroxyl groups (—OH). Nevertheless, the more stable functional groups, such as carbonyl (C═O), alkoxy (C—O) and epoxyl (C—O—C), can still remain, which afford strong Li binding on surface, making rGO a desired backbone for hosting metallic Li.

Results

Herein, a layered rGO host was designed for metallic Li, which exhibited well-defined nanoscale gaps in between the layers. Subsequently, molten Li can readily infuse into the spacious interlayer gaps and the final structure of the Li-rGO composite anodes can be described as the periodic stacking of layered Li and rGO (as shown in the schematic, FIG. 2a). Notably, this structure has several advantages. First, layered rGO structure offers a stable scaffold for Li stripping/plating, which significantly mitigates the volume change on the electrode level during cycling. Secondly, the excellent lithiophilicity of rGO with large surface area provides uniform Li infusion and deposition in the initial synthesis and later cycling, respectively. In addition, the very top rGO cap layer provides electrochemically and mechanically stable artificial interface, which can play a role in stabilizing the SEI formed at the electrolyte/electrode interface. With the above merits, the layered Li-rGO films provided highly improved electrochemical performance with uniform deposition, stable cycling and low polarization.

Figure 2:
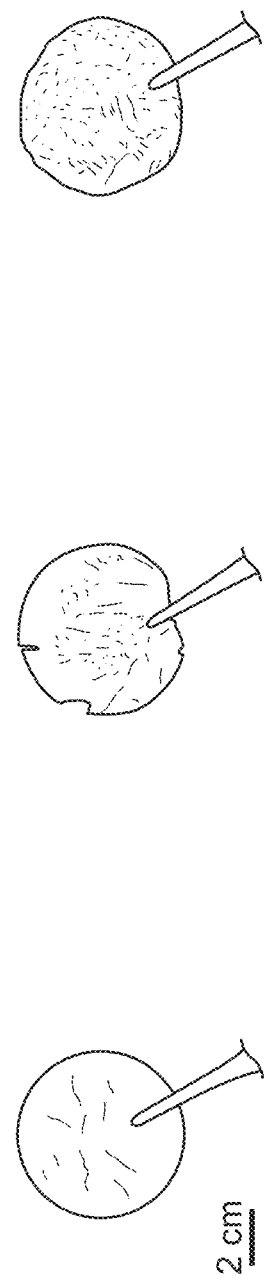
FIG. 2. Fabrication of layered Li-reduced graphene oxide (rGO) composite film a, Schematic of material design and the consequent synthetic procedures from graphene oxide (GO) film (left) to sparked rGO film (middle) and to layered Li-rGO composite film (right). Corresponding digital camera images of the GO film (b), sparked rGO film (c) and layered Li-rGO composite film (d) are shown accordingly.
Figure 3:
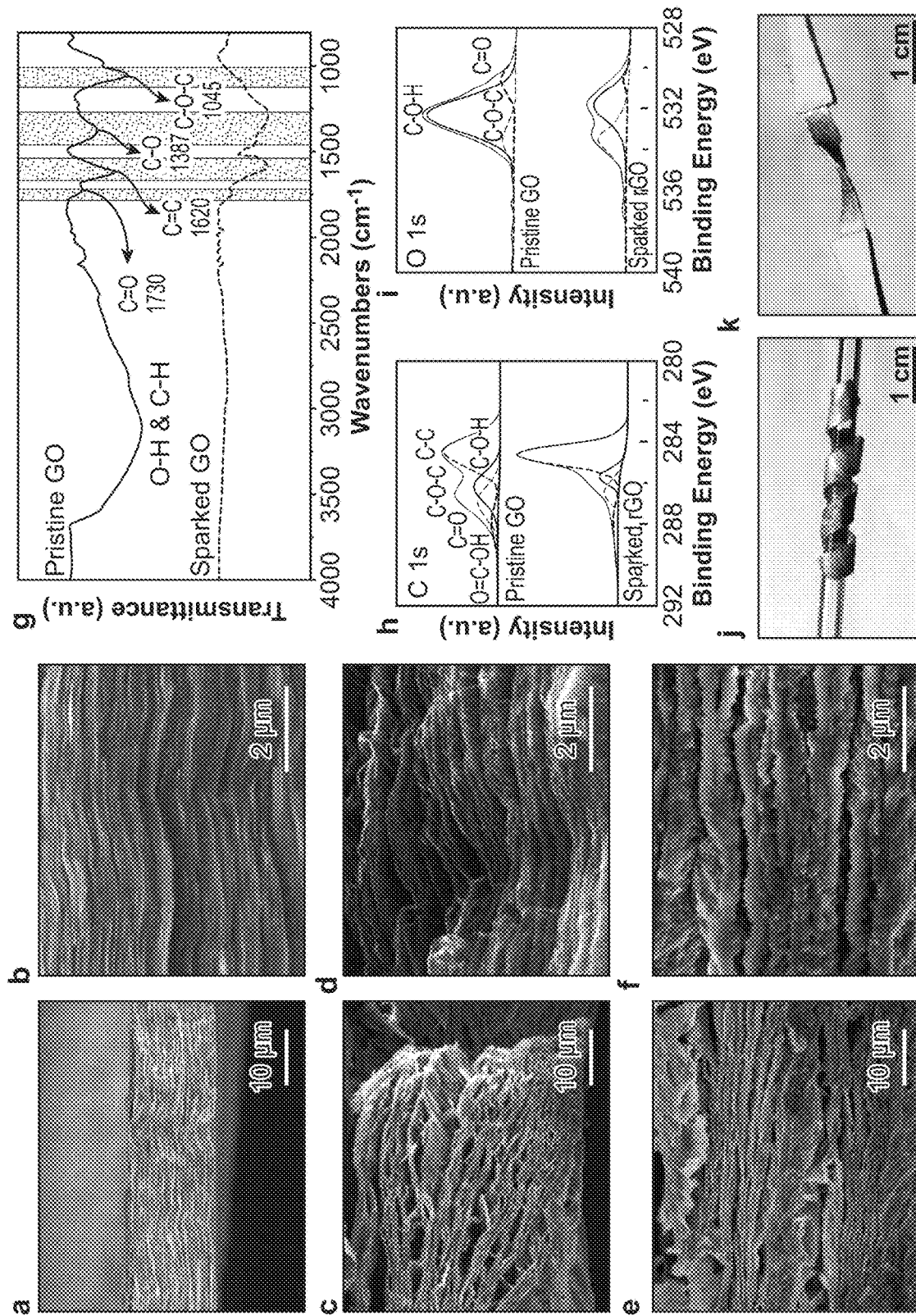
FIG. 3. Characterization of materials. Low-magnification (a) and magnified (b) scanning electron microscope (SEM) images of the pristine GO film prepared by vacuum filtration. The corresponding SEM images of sparked rGO film and layered Li-rGO film are shown in c,d and e,f, respectively. g, Fourier transform infrared spectroscopy (FTIR) spectra of pristine GO film (top) and sparked rGO film (bottom). h,i Deconvoluted X-ray photoelectron spectroscopy (XPS) spectra of C 1s (h) and O 1s (i) before (top) and after (bottom) spark reaction. j, A layered Li-rGO strip coiled on a glass rod showing good flexibility. k, A layered Li-rGO strip twisted by two tweezers showing good twistability.
Figure 6:
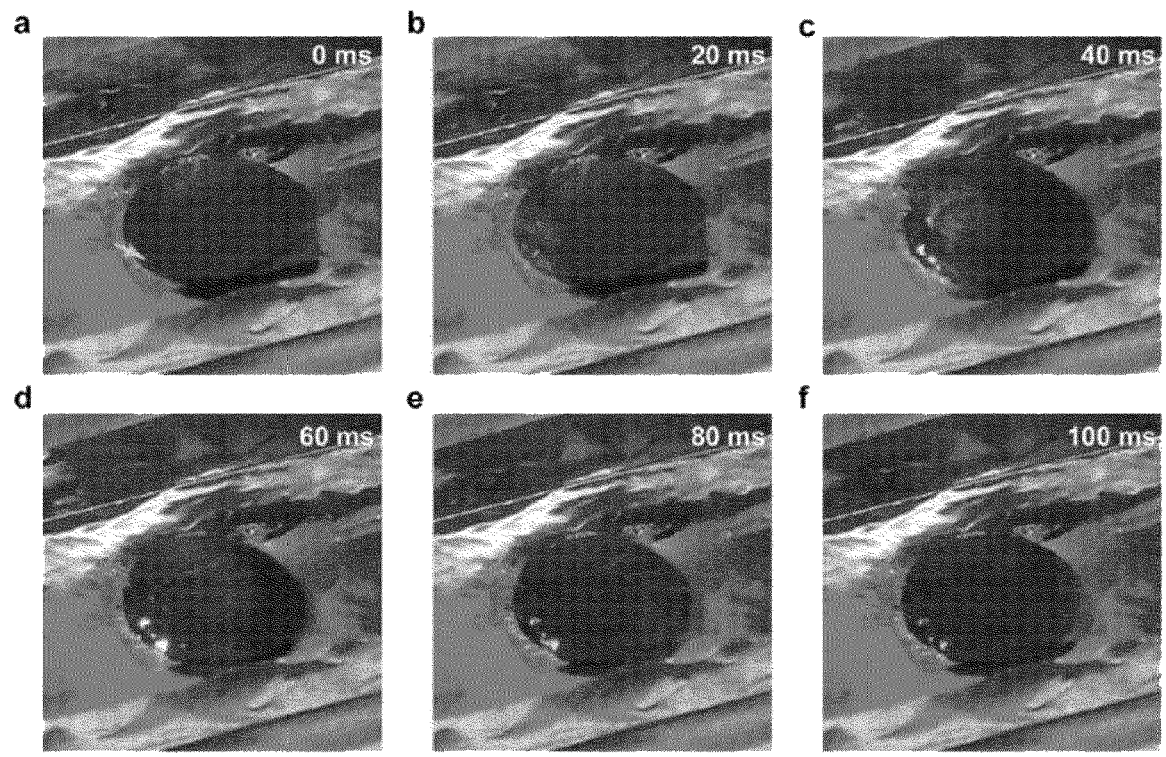
FIG. 6. Time-lapse images of the spark reaction visualizing the detailed phenomenon of the reaction within about 100 milliseconds. The images of the reaction at different time of 0 ms (a), 20 ms (b), 40 ms (c), 60 ms (d), 80 ms (e), and 100 ms (f) are shown successively. The arrow in a shows the initial contact point between GO and molten Li, where the reaction initiated. The flame shown in the images illustrates the possible H$_2$ formation under the strong reduction condition in the presence of molten Li and its combustion reaction with the trace amount of oxygen in the glove box. This can be one of the reasons for the interlayer expansion of GO.
Figure 7:
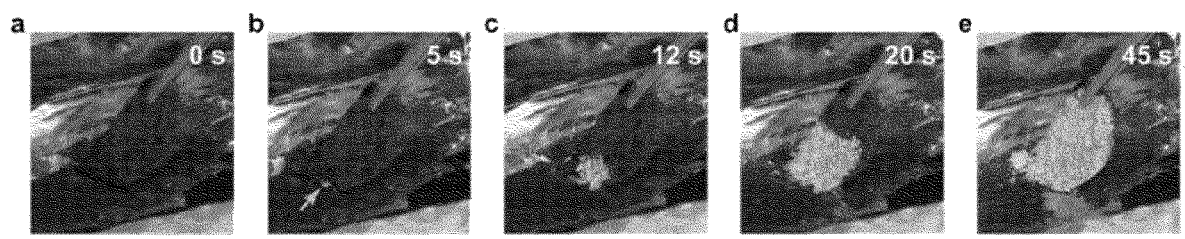
FIG. 7. Time-lapse images (a, 0 s; b, 5 s; c, 12 s; d, 20 s; e, 45 s) of Li infusion process into the sparked-rGO film. The edge of the sparked-rGO film was put in contact with the molten Li. Rapid Li infusion can be observed where it took less than about 1 minute for Li to spread across the whole sparked-rGO surface.

In order to obtain the desired layered structure, two operations, namely, fabricating a layered rGO film with nanoscale interlayer spacing and uniformly infusing Li into the interlayer gaps, should be realized. With densely packed GO film prepared by vacuum filtration as the starting material (FIG. 2b), a 'spark' reaction is implemented for producing the uniform nanoscale gaps (FIG. 2a, operation 1). It is observed that when GO film was partially put into contact with molten Li (about 250° C.), a spark reaction can happen quickly across the whole film, expanding the film into a much more porous structure. This phenomenon could be explained by the sudden pressure release within the GO layers due to the removal of superheated residual water/surface functional groups and the rapid combustion of hydrogen formed under the reduction condition (FIG. 6). The spark reaction successfully generated the desirable nanoscale interlayer spacing for Li, and also partially reduced the GO film, where the reactive surface functional groups were selectively removed. As a consequence, a much more porous and stable scaffold can be obtained for later Li intake and electrochemical cycling (FIG. 3c).

Figure 8:
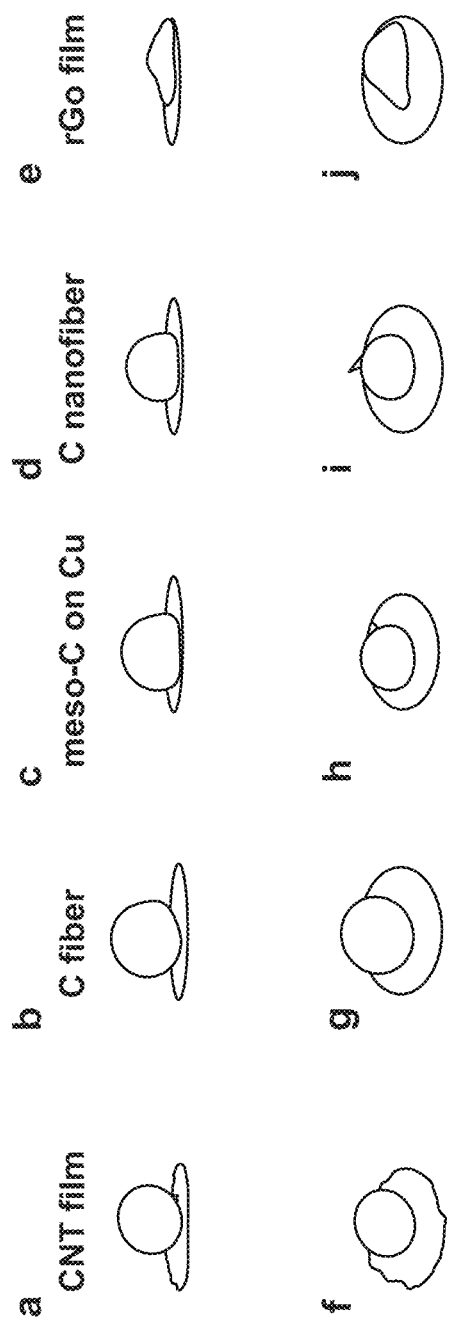
FIG. 8. Surface wetting of molten Li on different carbon materials, including carbon nanotube (CNT) film (a,f), carbon fiber paper (b,g), mesoporous carbon coated on Cu foil (c,h), electrospun carbon nanofiber (d,i) and sparked-rGO film (e,j). For sparked-rGO film, the molten Li was rapidly infused into the matrix with good wettability. In contrast, the other carbon materials showed relatively large contact angle, indicating relatively poor Li surface wettability.
Figure 9:
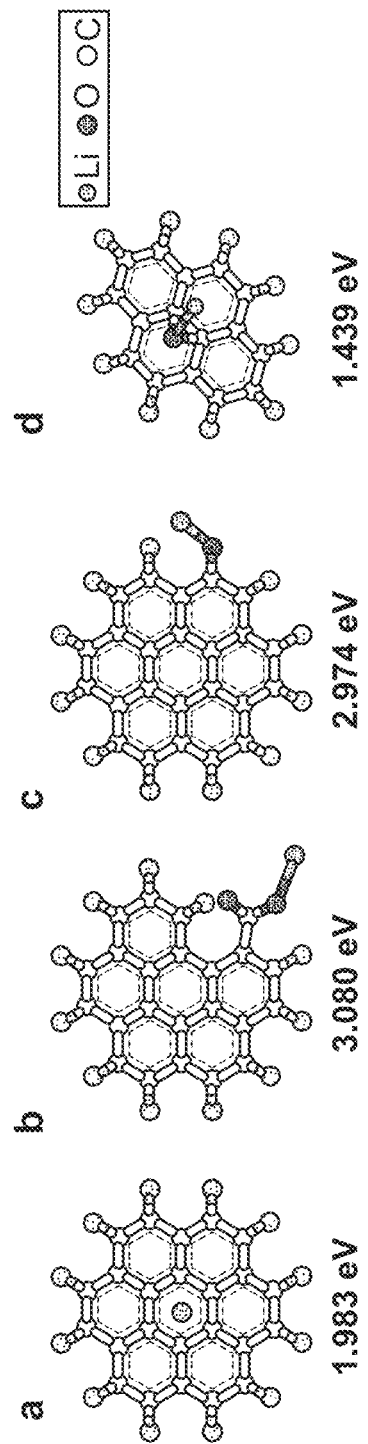
FIG. 9. First-principles calculations showing the binding energy between Li and bare graphene surface (a), carbonyl (C=O) groups (b), alkoxy groups (C—O) (c), and epoxyl (C—O—C) groups (d). The carbonyl and alkoxy groups show much stronger interaction with Li compared to bare graphene surface.
Figure 10:
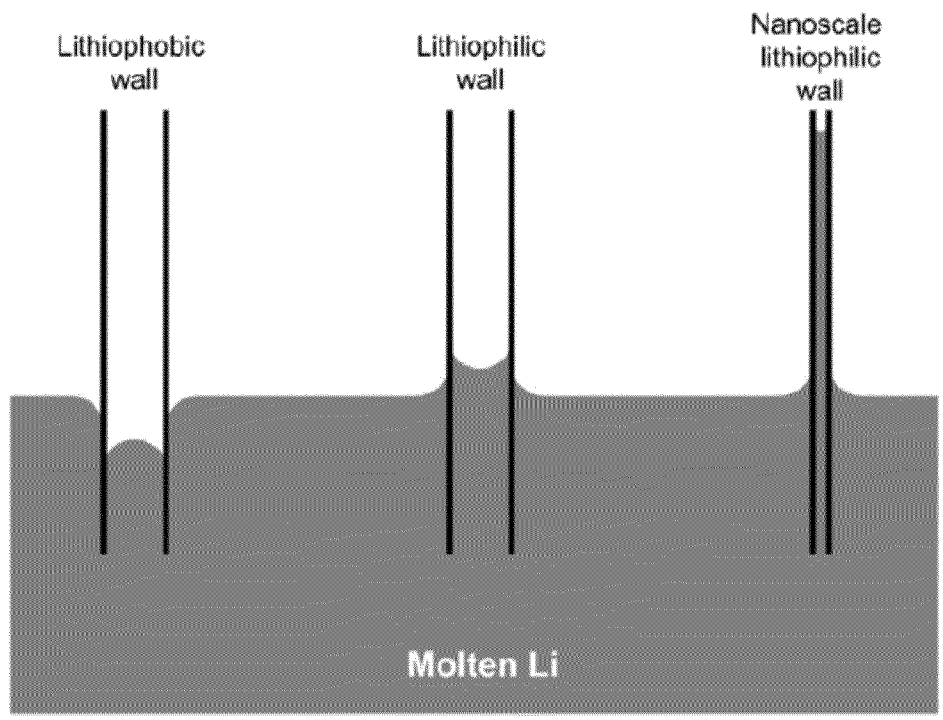
FIG. 10. Schematic showing the effect of capillary force with different surface 'lithiophilicity' ('lithiophobic'—left, 'lithiophilic'—middle & right) and different interlayer gap dimension ('larger interlayer dimension'—middle, 'nanoscale interlayer dimension'—right). The capillary force on lyophobic surface will lower the liquid level while the lyophilic surface will lift the liquid level. The height of the liquid level is inversely proportional to the diameter, which means smaller spacing with lyophilic surface will give rise to higher liquid level.

The other operation is to homogeneously infuse Li into the interlayer spacing (FIG. 2a, operation 2). After gently pressing the sparked rGO films to smooth the surface, the films were directly employed for Li infusion without the need for any surface functionalization. Fast and uniform Li intake can be fulfilled by contacting the edge of the rGO films with molten Li. Less than about 1 minute is involved for silvery Li to spread across the whole rGO film (FIG. 2d, about 47 mm of diameter). Noticeably, such rapid Li intake into rGO films is rather unusual when compared with other carbon materials (FIG. 8), which can hardly be wetted by molten Li. This unusual property is believed to be the synergistic effect of the lithiophilic nature of the sparked rGO and the capillary force produced by the nanoscale gaps. According to first-principles calculations (FIG. 9), the surface groups of rGO, such as carboxyl (3.080 eV) and alkoxy (2.974 eV) groups, exhibit much stronger binding energy to Li than the bare graphene counterpart (1.983 eV). The strong binding can highly increase the surface Li affinity and thus efficiently drive Li intake. Capillary force is another factor for Li infusion (FIG. 10). With superior lithiophilic surface of rGO, capillary force can lift up the molten Li into rGO interlayers. Since shrunk gap dimension can offer stronger capillary force, the nanoscale interlayer spacing here provided extremely powerful driving force for the fast Li intake.

Figure 11:
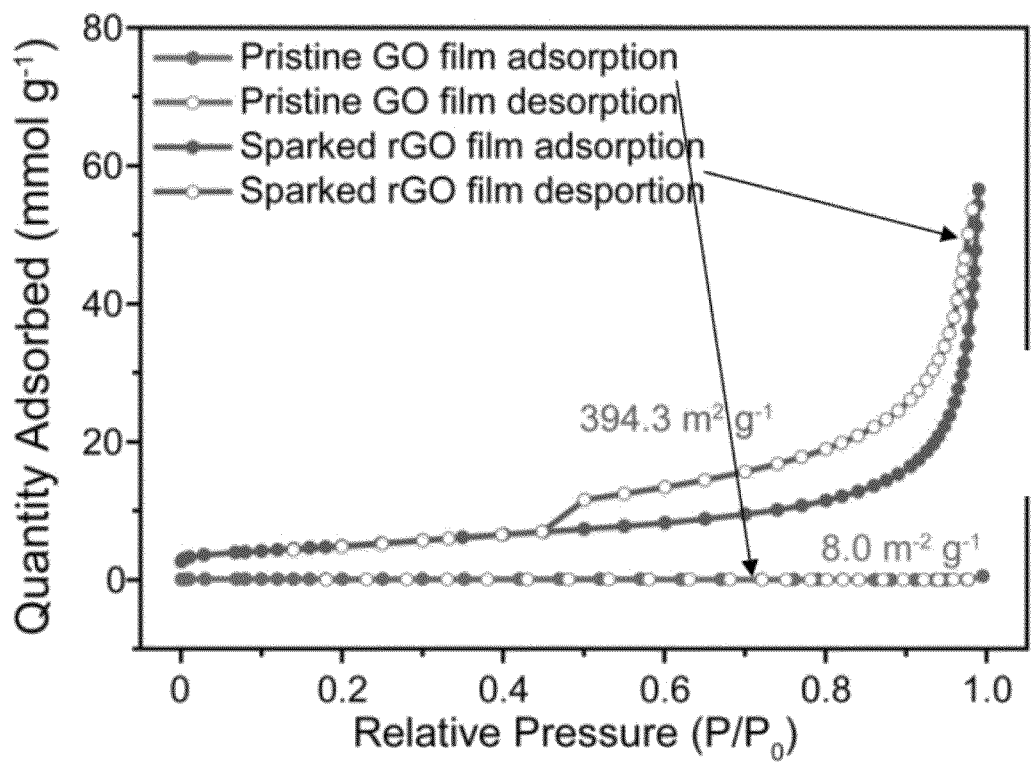
FIG. 11. $N_2$ adsorption-desorption isotherms of the pristine GO film (bottom) and the sparked rGO film (top), from which the Brunauer-Emmett-Teller (BET) surface area was calculated to be about 8.0 $m^2$ $g^{-1}$ and about 394.3 $m^2$ $g^{-1}$, respectively.

To further investigate the obtained nanostructures and their related properties, characterizations on the films before and after spark reaction as well as after Li infusion were carried out. FIG. 3a, b show the low magnification and magnified scanning electron microscope (SEM) images of the pristine GO film, which exhibited the typical densely-packed feature. After spark reaction (FIG. 3c, d), significantly enlarged interlayer spacing can be observed. As shown in FIG. 3d, uniform gaps in the scale of several hundred nanometers can be obtained after spark reaction, which is favorable for later Li infusion. Nitrogen sorption analysis (FIG. 11) confirmed the increased porosity after spark reaction, where the Brunauer-Emmett-Teller (BET) surface area of the film increased from about 8.0 $m^2$ $g^{-1}$ to about 394.3 $m^2$ $g^{-1}$. Once Li was infused to the rGO films, as indicated in FIG. 3e, f, the nanoscale gaps were filled by Li, while the uniform layered structure was still maintained.

Figure 12:
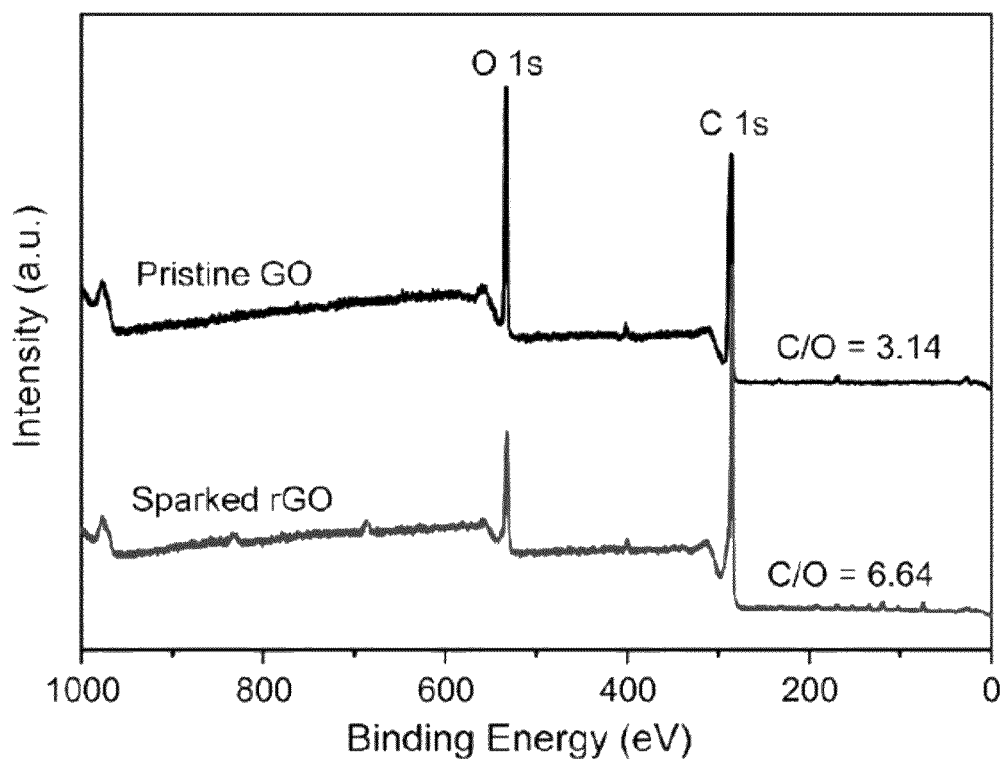
FIG. 12. XPS survey spectra of pristine GO (top) and sparked rGO (bottom). After spark reaction, significantly increased ClO ratio can be observed, which indicates the removal of O-containing species and the reduction of GO in the spark process.
Figure 13:
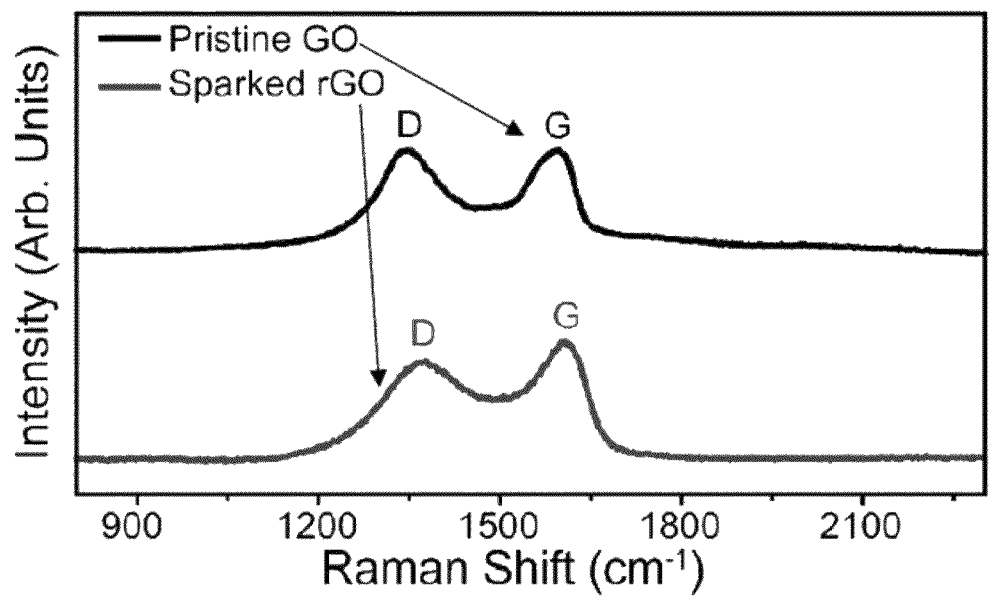
FIG. 13. Raman spectra of pristine GO (top) and sparked rGO (bottom) films. The sparked rGO showed lower D/G band ratio.
Figure 14:
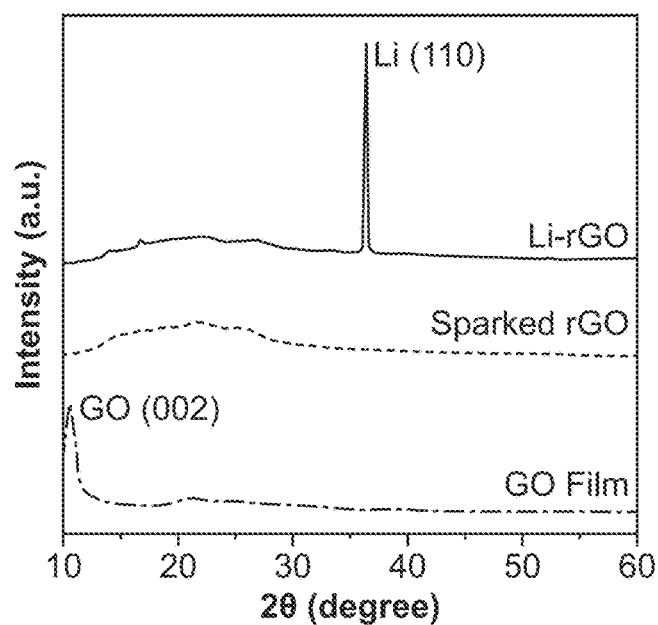
FIG. 14. X-ray diffraction (XRD) spectra of pristine GO film, sparked rGO and Li-rGO composite. Pristine GO showed a sharp peak at 2θ of about 11°, which is indicates a highly oxidized graphite with remarkably increased interlayer spacing (d of about 0.8 nm). The peak at 2θ of about 11° disappeared for sparked rGO, indicating the partial reduction of GO. A sharp peak corresponding to metallic Li (110) can be observed for Li-rGO, indicating the successful infusion of Li into the rGO matrix.

The selective reduction of the GO films by spark reaction can be supported by the Fourier transform infrared spectroscopy (FTIR, FIG. 3g), and the X-ray photoelectron spectroscopy (XPS, FIG. 3h,i), both of which are sensitive to the material's surface chemistry. As shown in FIG. 3g, before spark reaction, strong peak corresponding to —OH stretching (broad peak beyond about 3000 $cm^{-1}$) was detected, which revealed the presence of a large proportion of —OH groups either in the form of adsorbed water or surface —OH. At the same time, characteristic peaks of other surface groups such as carbonyl (C=O) (about 1730 $cm^{-1}$) and epoxyl (C—O—C) (about 1045 $cm^{-1}$) groups were also observed. In contrast, after spark reaction, the —OH peak became almost undetectable, which verified the removal of both residual water and surface —OH groups. However, despite slight shift, the peaks of the other more stable oxygen-containing surface moieties were still retained, which rendered the sparked rGO with excellent lithiophilicity for efficient Li intake. Consistent with the FTIR result, the survey XPS spectra indicated a significant reduction in the amount of O element after spark reaction (FIG. 12). And as can be observed from the deconvoluted C 1s and O 1s spectra (FIGS. 3h and i), the peaks corresponding to C—O—H dropped greatly in intensity while the other surface functional groups exhibited less decrease, which affirmed the selective removal of —OH groups.

Figure 15:
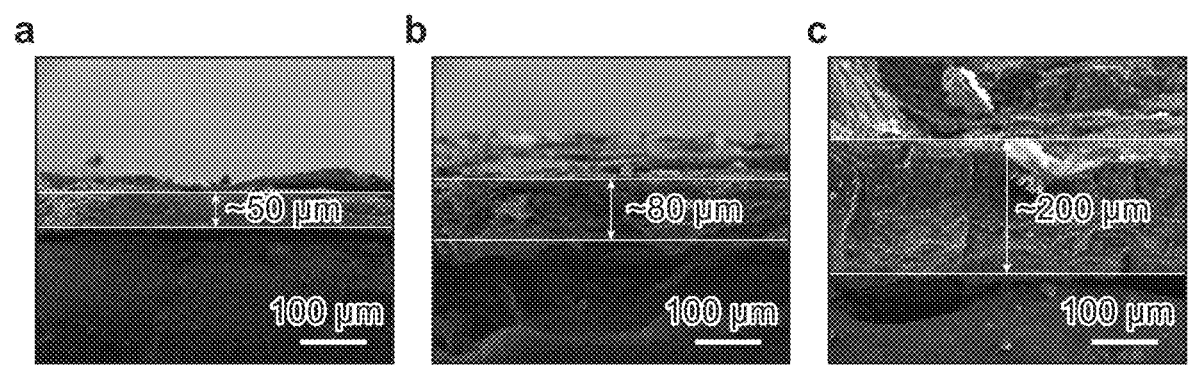
FIG. 15. SEM images of the Li-rGO electrodes with different thickness of about 50 μm (a,d), about 80 μm (b,e), and about 200 μm (c,f). The magnified SEM images shown in d-f indicate consistent layered structure with similar spacing despite the electrode thickness.
Figure 15:
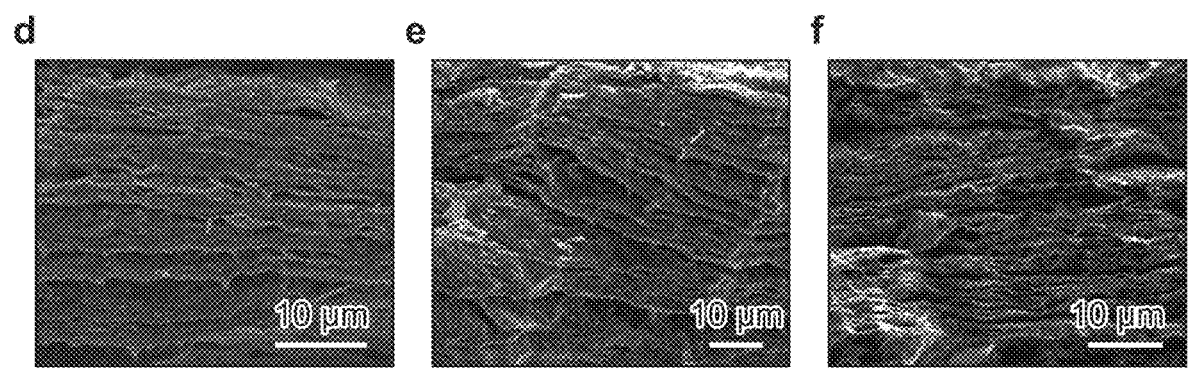
Figure 16:
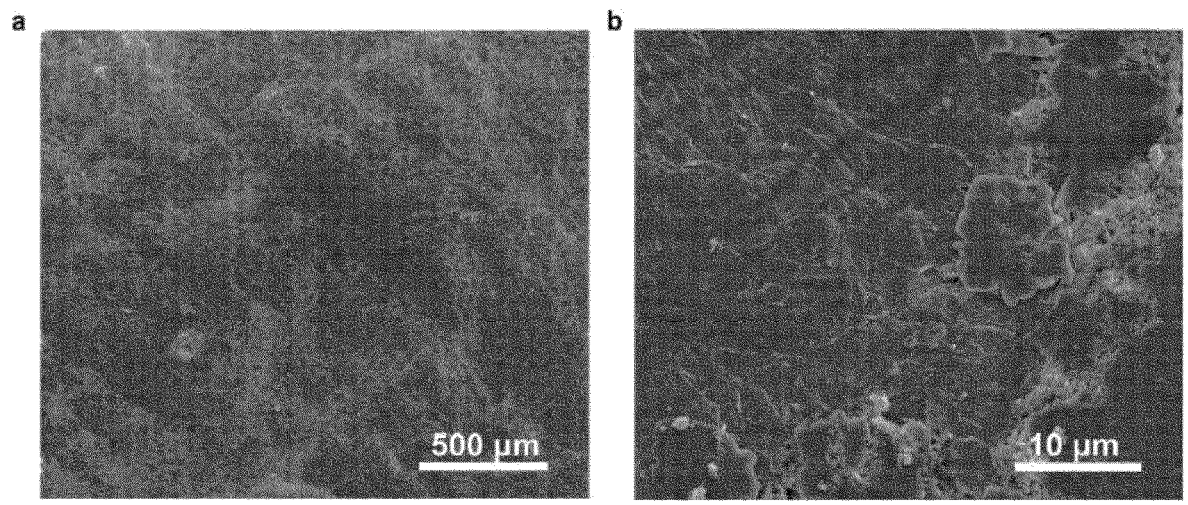
FIG. 16. Low-magnification (a) and magnified (b) SEM images of the top surface of layered Li-rGO electrode after 10 galvanostatic cycles with current density of about 5 mA $cm^{-2}$. The stripping/plating capacity was fixed at about 1 mAh $cm^{-2}$. The images show relatively flat surface, although some Li can be observed on the top surface (b).

It is further noted that good electrode flexibility is also desired for battery manufacturing since both pouch and cylindrical cell configuration specify flexibility to some extent for either folding or rolling process. For alternative Li hosts with rigid backbone, it is challenging to afford foldable features without damaging the electrodes. Due to the flexible nature of rGO and the layered structure which significantly reduced the built-in strain after folding, the as-obtained layered Li-rGO electrodes exhibited outstanding flexibility and twistability as shown in FIG. 3j, k. Notably, the electrodes can still remain intact after several cycles of folding. In practical points of view, the good flexibility offers exciting possibilities for fabricating processable composite metallic Li anodes and potentially flexible packaging for next-generation Li batteries. Furthermore, by changing the thickness of the initial GO film, the thickness of the resulting Li-rGO electrode can be readily tuned (FIG. 15).

To study the electrochemical performance of the layered Li-rGO films, a carbonate-based electrolyte, which is the dominant electrolyte for Li-ion batteries, was utilized to conduct the tests. It was reported that due to its relatively positive reduction potential and the brittleness of the as-formed SEI layer, uniform Li deposition, limited side reaction and stable cycling are especially challenging to realize in carbonate-based electrolyte. However, it is of importance to evaluate the electrochemical performance in carbonate environment due to its reduced flammability compared with ether electrolyte and better compatibility to the existing battery technology. In this example, due to the rational design of a Li metal host, improvement in electrochemical properties can be achieved in addition to dimensional stability even in a carbonate-based electrolyte.

Figure 4:
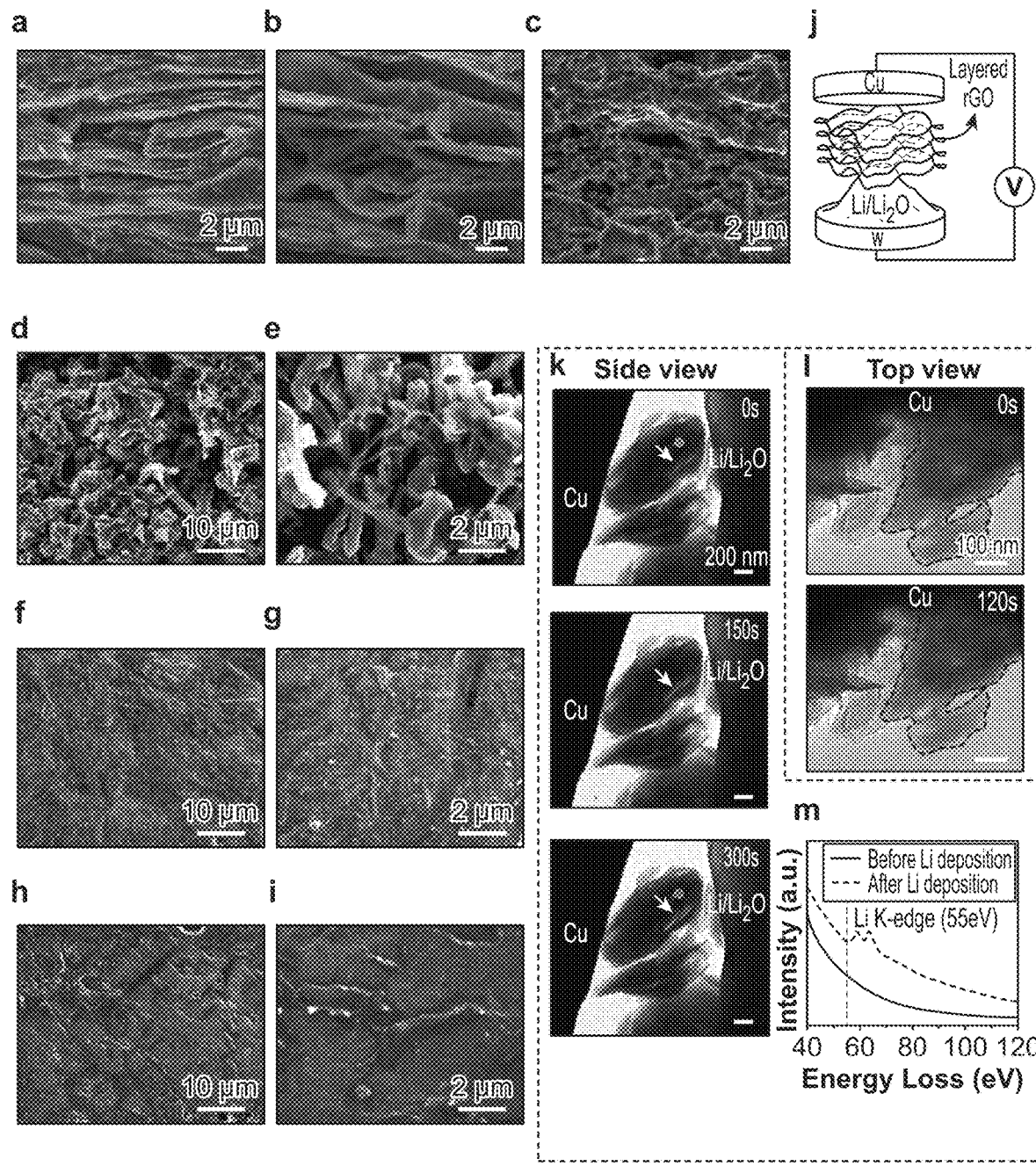
FIG. 4. Li deposition behavior and in situ characterization. Cross section SEM images of the Li-rGO electrode before (a) and after (b) Li stripping, and after 1 stripping/plating cycle (c). d,e SEM images of the bare Li foil surface after 10 galvanostatic cycles. f,g SEM images of the Li-rGO surface after 10 galvanostatic cycles. The current density of the cells shown in d-g was fixed at about 1 mA cm$^{-2}$ while the capacity was set at about 1 mAh cm$^{-2}$. h,i SEM image of the Li-rGO electrode surface after 10 galvanostatic cycles with a higher current density of about 3 mA cm$^{-2}$. j, Schematic of the in situ transmission electron microscope (TEM) cell configuration. k, Time-lapse images showing the side view of rGO film during Li deposition process. l, Top view of rGO film at initial (top) and final (bottom) stage of Li deposition. m, Electron energy loss spectroscopy (EELS) spectra of rGO film before (bottom) and after (top) Li deposition. The signals were collected at the positions marked in k at the initial (top dot) and final (bottom dot) stages, respectively.

First, uniform Li stripping/plating behavior can be realized using the layered Li-rGO composite electrode. To study the surface morphology, layered Li-rGO films with adequate thickness of about 50-100 μm were assembled into symmetric-cell configuration and cycled. The stripping/plating capacity was fixed at about 1 mAh cm$^{-2}$ with a current density of about 1 mA cm$^{-2}$ unless further noted. FIG. 4a-c shows the cross section SEM images of the pristine layered Li-rGO film, the film after Li stripping, and after one cycle of stripping/plating, respectively. As shown, when Li was stripped (FIG. 4b), the interlayered gaps originally occupied by metallic Li appeared again. This illustrated that the interlayered spacing did not undergo noticeable change in the initial Li infusion and the later Li stripping operations. After plating Li back, as shown in FIG. 4c, most of the interlayered spacing was refilled by Li. Although the deposited Li exhibited different morphology compared with the initial stage, no noticeable dendritic Li can be observed. Such observation is a good indicator of the much more uniform Li deposition provided by the rGO frameworks. The surface morphology after multiple cycles was also characterized in comparison with the bare Li foil counterpart (FIG. 4d-i). FIG. 4d, e show the SEM images of Li foil surface after 10 cycles, from which mossy, dendritic Li can be observed. In contrast, the layered Li-rGO surface remained smooth after 10 cycles (FIG. 4f, g) without observable dendrites. The uniform deposition can be sustained even at increased current density. At a current density of about 3 mA cm$^{-2}$ (FIG. 4h, i), the cycled electrode also maintain a flat surface without dendritic Li plated on top.

Figure 17:
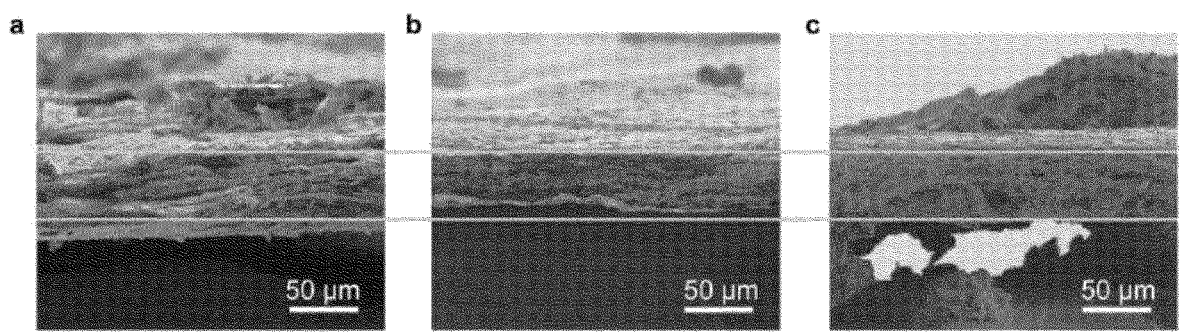
FIG. 17. Ex situ SEM characterization on the thickness change before (a), after (b) Li stripping and after one stripping/plating cycle (c). After Li stripping, a reduced thickness decrease of about 20% can be observed. And after plating Li back, the thickness is similar to the original state.
Figure 18:
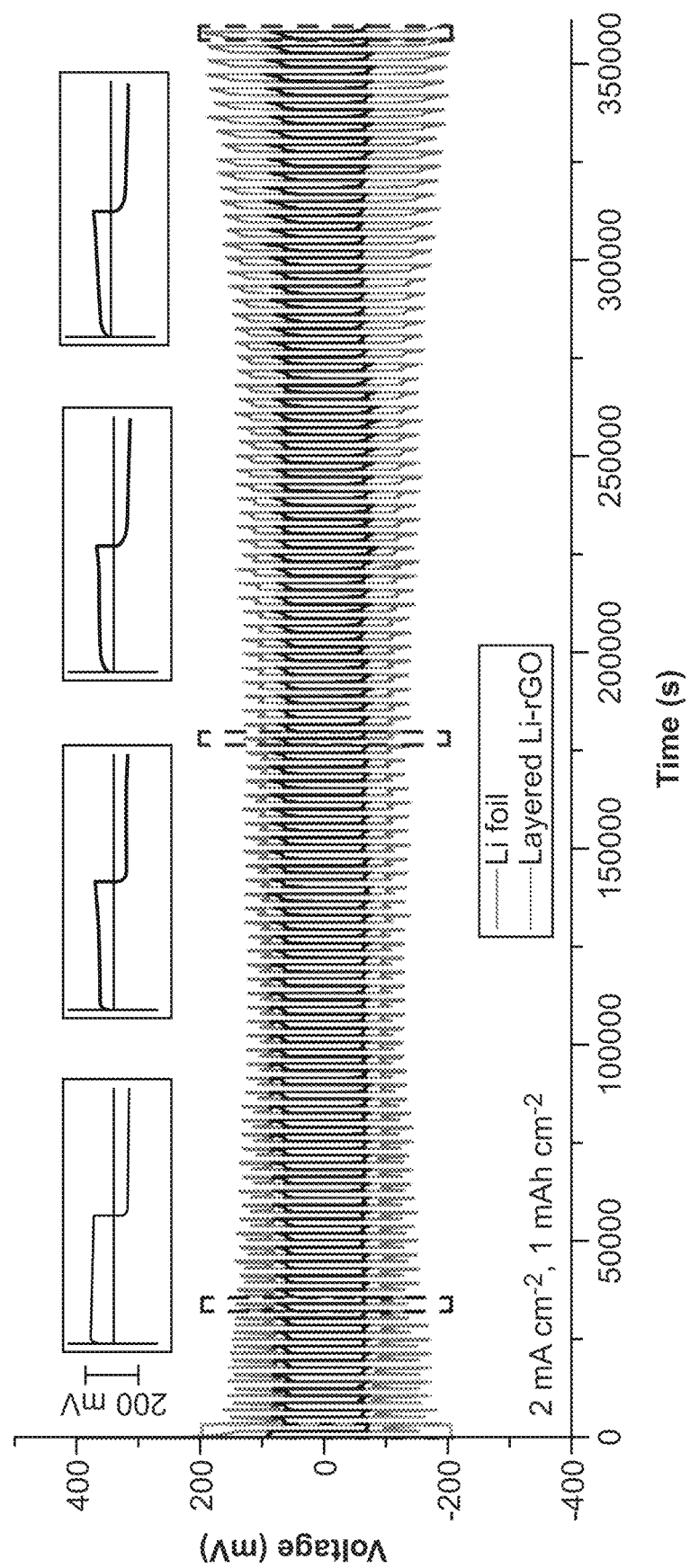
FIG. 18. Galvanostatic cycling of Li foil and Li-rGO film in symmetric cell configuration at the current density of about 2 mA $cm^{-2}$. The stripping/plating capacity was fixed at about 1 mAh $cm^{-2}$. The detailed voltage profiles of the 1st, 10th, 50th, and 100th cycles were further shown in the inset figures with scale of y axis shown on the left.

In order to visualize the Li deposition behavior within the rGO film, in situ transmission electron microscope (TEM) technique was exploited using a specialized dual-probe biasing TEM holder (Nanofactory Instrument). FIG. 4j schematically illustrates the in situ TEM device, where a Cu metal wire decorated by sparked rGO film was employed as one electrode and a W wire covered by Li as the other. A thin oxide layer formed on the surface of Li can perform as the solid electrolyte in the cell. Both side-view (FIG. 4k) and top-view (FIG. 4l) characterizations were carried out in the in situ study to obtain comprehensive information on Li deposition. From the time evolution side-view images, little thickness change can be observed after Li deposition, which shows the merit of layered rGO as the host to maintain the dimension. The relatively stable dimension can be further confirmed by the ex situ SEM study after Li stripping and plating, which showed about 20% of thickness fluctuation (FIG. 17). The injection of Li into the interlayered rGO spacing was further confirmed by the electron energy loss spectroscopy (EELS). FIG. 4m shows the EELS spectra collected from the corresponding interlayer spots marked in FIG. 4k. Characteristic Li peaks appeared after Li deposition, which indicates the successful Li deposition into the interlayer spacing. The top-view characterization further consolidates the uniform Li deposition. As shown in FIG. 4l, the rGO sheet exhibited continuous Li infusion with slightly expanded lateral dimension. The even expansion across the whole rGO sheet illustrates the uniform Li plating within the host.

The observed uniform Li deposition behavior can be rationalized by the highly increased number of nucleation sites and the high extent of interfacial protection by rGO layers. On one hand, the existence of a large number of two dimensional Li interlayers provided tremendously enhanced activated surface area for Li deposition. Since reduced energy barrier is involved to deposit Li directly on Li, much more uniform Li nucleation on the large Li surface within the layers can be achieved. On the other hand, the flexible and mechanically strong rGO layer can perform as the stable artificial electrolyte/electrode interface. With the stable rGO interface and the small dimension change, SEI cracking and the resulting 'hot spot' for uneven Li deposition can be highly suppressed.

Figure 5:
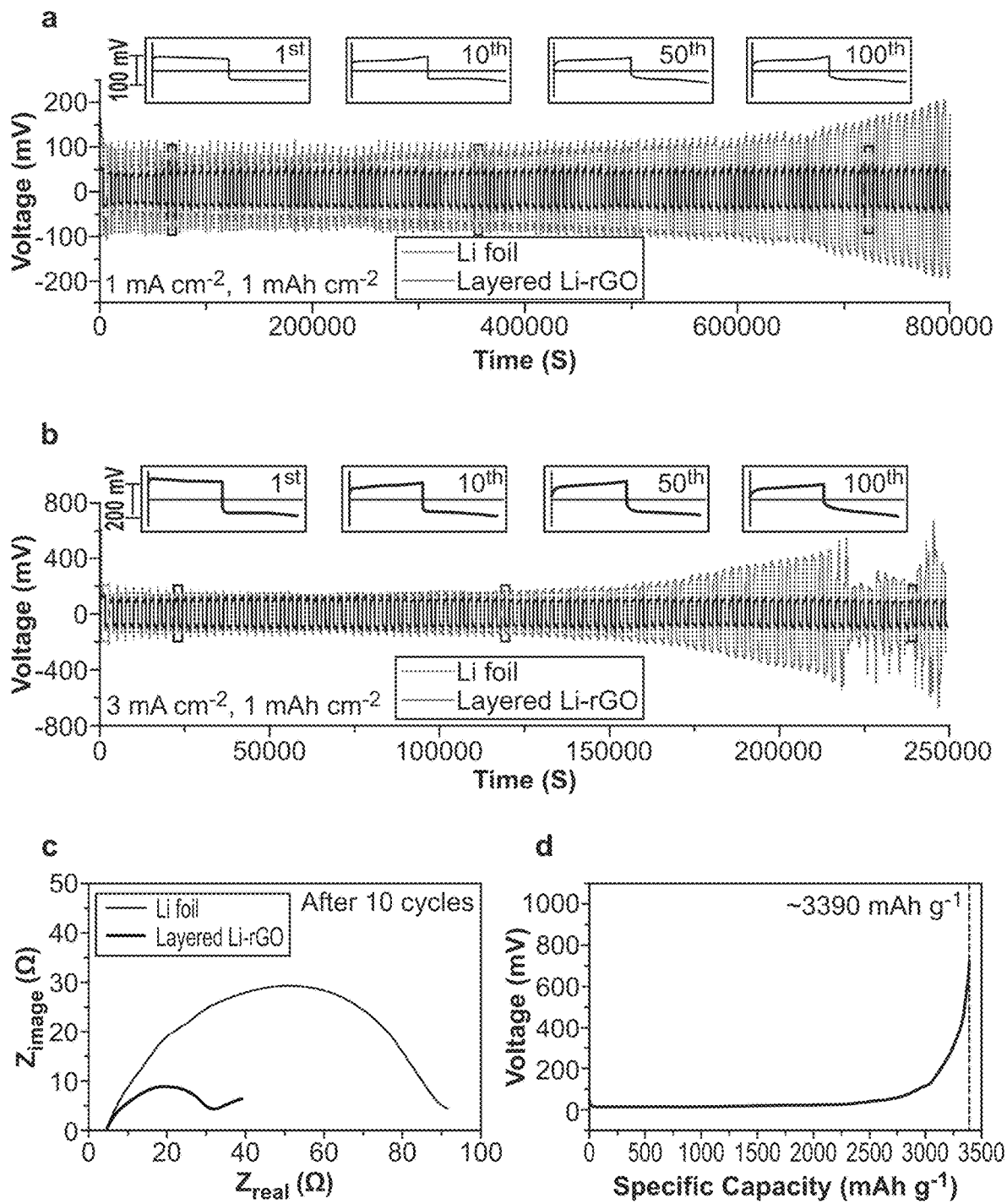
FIG. 5. Electrochemical characterization of Li-rGO electrode. a, Galvanostatic cycling of symmetric Li-rGO electrode and bare Li foil in the first 800,000 seconds. The current density was fixed at about 1 mA cm$^{-2}$ with stripping/plating capacity of about 1 mAh cm$^{-2}$. The detailed voltage profiles were further displayed as the insets on the top (from left to right, shown are the 1st, 10th, 50th, and 100th cycles, respectively). The y axis scale of the inset figures is shown on the left. b, Corresponding higher current density (about 3 mA cm$^{-2}$) cycling of symmetric Li-rGO electrode and bare Li foil in the first 250,000 seconds with the detailed voltage profiles shown as the insets. c, Nyquist plots of the symmetric cells after 10 galvanostatic cycles. d, Full Li stripping curve of the Li-rGO electrode to about 1 V versus Li$^+$/Li, which shows a specific capacity about 3390 mAh g$^{-1}$.
Figure 19:
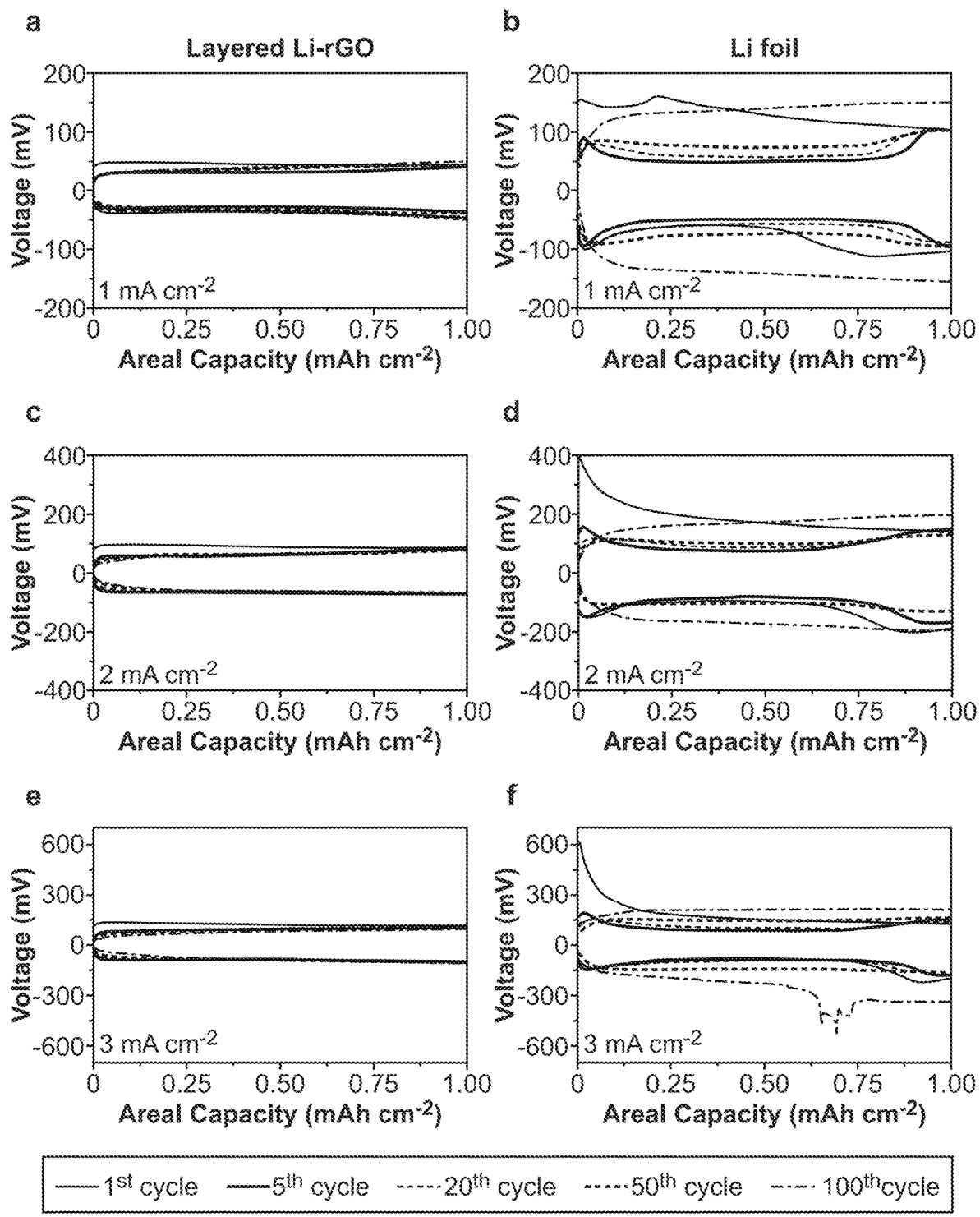
FIG. 19. Voltage profiles of Li-rGO (left column) and Li foil (right column) symmetric cells at different cycles varied from the 1st to the 100th cycle. Profiles at different current densities of about 1 mA $cm^{-2}$ (a,b), about 2 mA $cm^{-2}$ (c,d) and about 3 mA $cm^{-2}$ (e,f) were chosen for comparison.

The demonstrated highly reduced electrode dimension fluctuation and uniform Li deposition with stable interfacial layer afforded stable long-term cycling performance with reduced polarization (voltage hysteresis). FIG. 5a compares the voltage profile of symmetric layered Li-rGO electrode cells and the bare Li foil electrode counterparts through over 100 cycles. The current density is fixed at about 1 mA cm$^{-2}$ with about 1 mAh cm$^{-2}$ of stripping/plating capacity. It is apparent that the Li-rGO electrodes exhibited stable cycling voltage profile with small hysteresis. In contrast, the Li foil displayed gradual increase in hysteresis over the cycles, with almost 100% higher value after 100 cycles. To study the evolution of voltage profile in detail, the 1st, 10th, 50th and 100th cycle of layered Li-rGO were further enlarged as the insets in FIG. 5a. The four plots were drawn in the same scale for fair comparison. For the layered Li-rGO electrodes, flat voltage plateaus at both charging and discharging states can be retained throughout the whole cycling process without noticeable increase in hysteresis. This is a significant improvement compared with bare Li electrodes, which showed fluctuated voltage profiles with consistently higher overpotential at both initial and final stages of each stripping/plating process (FIG. 19). This supports the notion that low-barrier Li nucleation and uniform deposition can be obtained with rGO during cycling.

At an increased current density of about 3 mA cm$^{-2}$, stable cycling beyond 100 cycles with stable hysteresis can still be attained using layered Li-rGO electrodes (FIG. 5b), while the Li foil counterpart exhibited gradual hysteresis augment. At 92 cycles, sudden voltage drop was detected for bare Li foil with fluctuated voltage in the later cycles, which could be explained by the internal soft short circuit with Li dendrite penetration. The enlarged voltage profiles of the selected cycles shown in FIG. 5b further confirm the stable cycling of Li-rGO with flat voltage plateaus through the cycles at the elevated current density.

Figure 20:
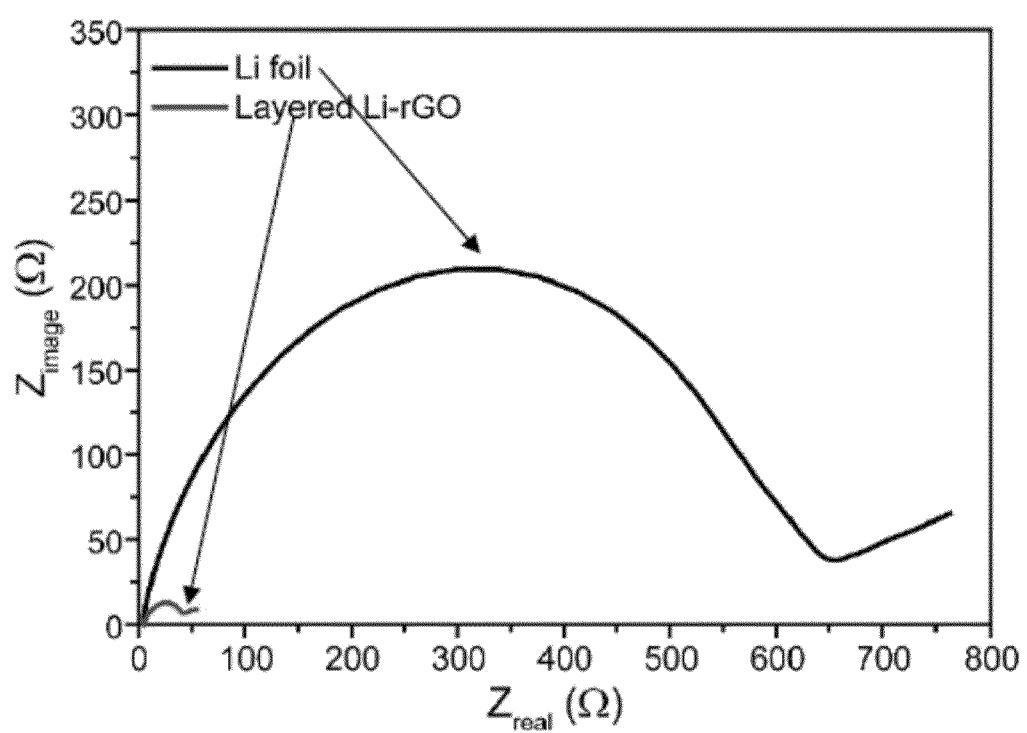
FIG. 20. Nyquist plots of the symmetric cells of Li foil (top) and layered Li-rGO (bottom) before electrochemical cycling. Li foil showed considerably larger interfacial resistance compared to the layered Li-rGO counterpart.
Figure 21:
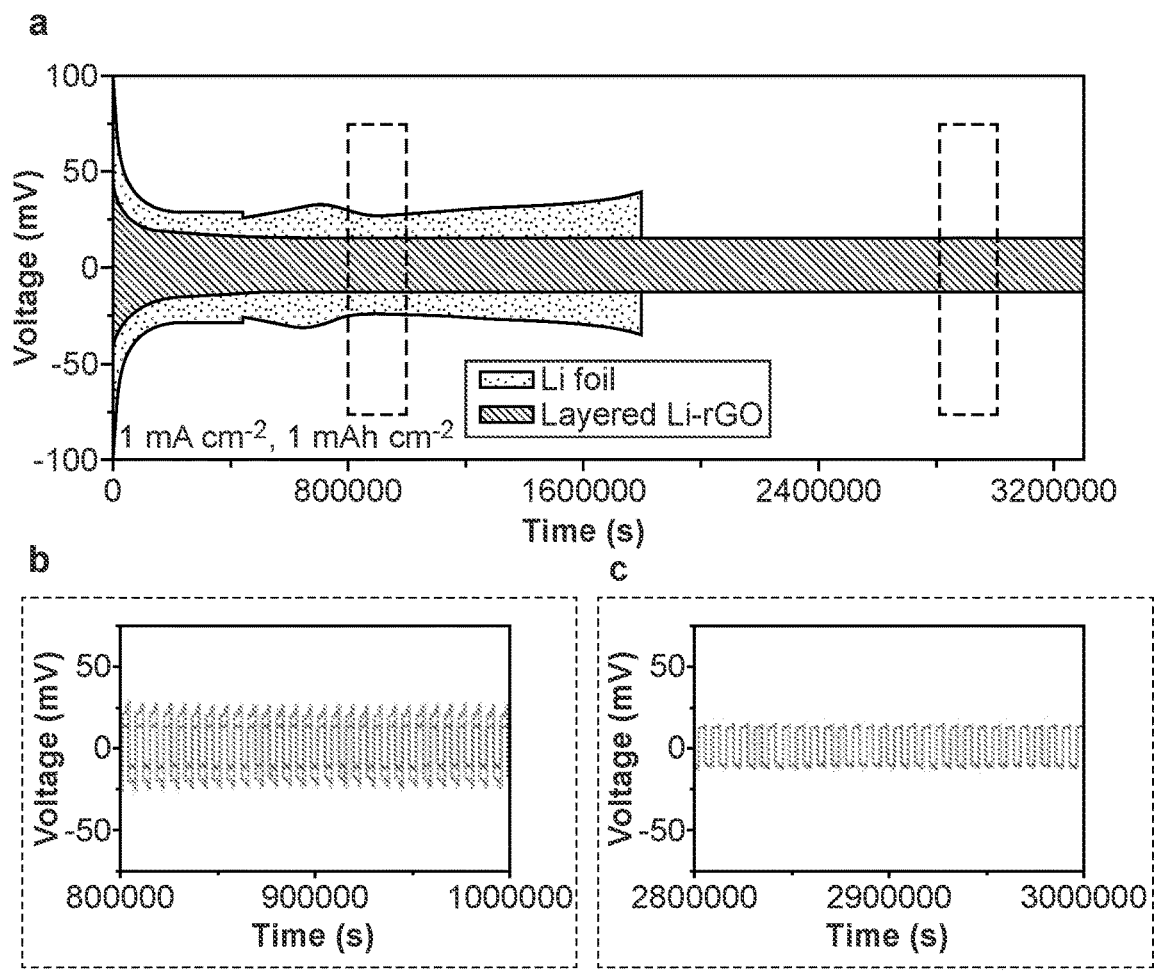

The highly reduced polarization and stable cycling can be further supported by the electrochemical impedance spectroscopy (EIS) analysis, which was conducted on symmetric cells before cycling (FIG. 20) and after 10 galvanostatic cycles (FIG. 5c). The corresponding Nyquist plots are shown where the semicircle at the high frequency range is a good indicator of interfacial resistance at SEI and the charge-transfer resistance at Li surface. As can be seen from the figures, bare Li foil cells exhibited consistently higher interfacial resistance. It is noted that before cycling, Li foils showed an extremely large interfacial resistance of about 650Ω, which was originated from the native oxide layers formed on the electrodes. After 10 cycles, interfacial resistance dropped to a lower value of about 85Ω, due to the break of the native oxide layers as well as the dendritic Li formation which significantly increased the surface area. In contrast, the layered Li-rGO electrodes had relatively constantly low interfacial resistance. Before cycling, significantly lower interfacial resistance of about 30Ω can already be attained and after 10 cycles, the layered Li-rGO electrodes exhibited little resistance drop to about 25Ω. This phenomenon illustrates that much better electrode stability and more favorable Li stripping/plating kinetics can be achieved with the layered Li-rGO electrodes.

Notably, the layered Li-rGO electrode exhibited outstanding electrochemical properties, and also demonstrated uncompromised specific capacity. As shown in FIG. 5d, unprecedentedly high capacity of about 3390 mAh g$^{-1}$ (based on the weight of the whole electrode) can be extracted when charged to about 1 V, which is very close to the about 3860 mAh g$^{-1}$ theoretical capacity of pure Li (about 87.8% capacity retention compared with pure Li). The high specific capacity can be attributed to the lightweight and porous nature of the sparked rGO where the mass of the framework took up about 7 wt % of the whole Li-infused electrode. Therefore, the choice of carbon-based host material offers the exciting possibility to fabricate high performance Li anodes with reduced compensation on capacity.

In summary, a layered Li-rGO composite electrode with uniform nanoscale layered structure was developed as a Li metal anode. The spark reaction as well as molten Li infusion driven by the lithiophilic rGO surface and the nanoscale capillary force were combined to realize the structure design. Contrary to the "hostless" cycling of bare Li, the well-defined structure afforded a reduced electrode dimension change during cycling, and also a much more stable electrolyte/electrode interface. The stabilized interface together with the highly increased activated surface for Li nucleation afforded the uniform deposition of Li without noticeable dendritic Li growth at various current densities. In situ TEM was further exploited to visualize and confirm the dimensional stability and uniform Li deposition. As a result, excellent electrochemical cycling can be obtained. Low overpotential of about 40 mV and about 80 mV with flat plateaus can be maintained for over 100 cycles at the current density of about 1 mA cm$^{-2}$ and about 3 mA cm$^{-2}$, respectively. Simultaneously, near-theoretical specific capacity of about 3390 mAh g$^{-2}$ can still be retained due to the low density and high porosity of the graphene-based host matrix. The electrode design developed in this example provides a methodology for fabricating stable Li anodes to be applied to the next-generation high energy density and high power Li battery system.

Methods

Electrodes synthesis. Firstly, vacuum filtration with anodic aluminum oxide membrane (AAO, Whatman, with diameter of about 47 mm and pore size of about 0.2 μm) as filter was utilized to yield the densely packed GO films. The highly concentrated GO solution (about 5 g L$^{-1}$, Graphene Supermarket) was commercially available and used as received. The as-obtained freestanding GO films were dried in a vacuum oven at about 60° C. for about 48 hrs and then transferred to an argon-filled glove box with sub-ppm O$_2$ level. To perform the spark reaction, Li foil (about 99.9%, Alfa Aesar) was first melted in a stainless steel pan on a hot plate at about 250° C. The GO films were then put into contact with molten Li and the spark reaction occurs within seconds. The spark reaction can partially reduce the GO films into rGO films. The as-obtained rGO films were gently pressed between two pieces of stainless steel plates to obtain smooth surface. The edge of the pressed rGO films were made to touch the molten Li, and Li is infused into the rGO films with observed color change from black to silvery. The as-obtained films can perform as the electrodes once cooled down to room temperature.

Characterizations. A FEI XL30 Sirion scanning electron microscope is used for SEM characterizations. Before conducting SEM study of the cycled electrodes, the batteries were first disassembled in the glovebox and followed by gentle rinse in dioxolane (DOL) to remove residue Li salts. XPS analysis was obtained on a SSI SProbe XPS spectrometer with Al(Kα) source. Raman spectra were measured on a WITEC Raman spectrometer with an about 531 nm excitation laser. FTIR spectra were recorded on a Nicolet iS50 FT/IR Spectrometer (Thermo Scientific). XRD patterns were recorded on a PANalytical X'Pert instrument and the Li-rGO electrode was loaded on a glass slide and covered with Kapton tape during measurements to avoid direct contact with air. N$_2$ sorption studies were performed in a Micromeritics ASAP 2020 adsorption apparatus at about 77 K and at pressure up to about 1 bar after the samples were first degassed at about 180° C. overnight. The Brunauer-Emmett-Teller (BET) surface area was calculated using the adsorption data in a relative pressure ranging from about 0.1 to about 0.3.

In situ TEM observation. The in situ electrochemical experiment was carried out in an FEI Titan 80-300 environmental TEM at the acceleration voltage of about 300 kV. Nanofactory Instruments Dual-Probe STM-TEM in situ sample holder was used to demonstrate the lithiation process of rGO. Li metal was used for the counter electrode in this STM-TEM holder. During transferring Li metal electrode inside TEM, the electrode was exposed to air for about 5 seconds to create a thin Li$_2$O layer of about 20 nm functioning as a solid electrolyte. A relative bias of about −3.4 V was induced between the two electrodes, which caused Li$^+$ ions to be transferred to rGO electrode through the solid electrolyte. During the experiment, the electron beam was spread out to lessen electron beam effects.

Electrochemistry. To study the Li stripping/plating processes, the electrodes were assembled into 2032-type coin cells (MTI) in a symmetric cell configuration. The electrodes used were either the layered Li-rGO films or the freshly-scraped Li foils (about 99.9%, Alfa Aesar). The electrolytes employed were either about 1 M lithium hexafluorophosphate (LiPF$_6$) in about 1:1 ethylene carbonate (EC)/diethyl carbonate (DEC) (BASF Selectilyte LP40) with about 2% vinylene carbonate (VC) as additive for carbonate-based system study, or about 1 M Lithium bis(trifluoromethane-sulphonyl)imide (LiTFSI) in about 1:1 v/v 1,3-dioxolane (DOL)/1,2-dimethoxyethane (DME) with about 1 wt % lithium nitrate for ether-based system. Celgard 2325 (25 μm PP/PE/PP) was used as the separator. Galvanostatic cycling was conducted either on an Arbin 96-channel battery tester or a LAND 8-channel battery tester. The electrochemical impedance spectroscopy measurements were carried out on a Biologic VMP3 system.

Example 2

High-Activated-Surface Nanocomposite Matrix as Dendrite-Free, Low Energy Barrier, and Stable Lithium Metal Anodes Overview Rechargeable batteries based on lithium (Li) metal chemistry are desirable for next generation high-energy-density and high-power electrochemical energy storage. Nevertheless, excessive dendritic growth, virtually infinite dimension change during repeated cycles together with limited power output, severely hinders the practical applications. Although progress has been made towards realizing dendrite-free deposition, a versatile solution is still desired. Here, this example sets forth a principle to address the multifaceted problems. In this example, a Li$^+$ conductive matrix is constructed as the "host" for nanoscale metallic lithium domains, which was fulfilled by applying "overlithiation"

technique on metastable phase SiO. Supported by a rigid matrix, highly constant electrode-level dimension during repeated cycling can be achieved. Moreover, the $Li^+$ conductive nature of the matrix afforded a highly increased activated surface area for Li, which afforded the uniform nucleation and thus dendrite-free deposition. In addition, the proposed $Li^+$ conductive nanocomposite electrode (LCNE) exhibited extraordinary low energy barriers and constantly low overpotential during stripping/plating cycling in both carbonate and ether-based liquid electrolyte systems. By in-depth analysis on the behaviors of Li foil, such phenomenon can also be rationalized by the vast activated surface area and naturally built-in nanosized lithium domains as nucleation sites. Furthermore, Li—S prototype cells with LCNEs were assembled, which demonstrated much higher capacity retention under high-power operation compared to the conventional Li foil counterpart. This all-round improvement on electrochemical performance indicates the effectiveness of the design methodology for developing safe and stable metallic Li anodes.

Introduction

Extensive research has been conducted on developing advanced lithium (Li) battery anode substitutes, including silicon, tin and Li metal, for applications with high-energy-density specification. Among all the alternatives, Li metal is the most prominent candidate. Its lowest electrochemical potential ($Li^+$/Li=about −3.040 V v.s. standard hydrogen electrode), highest theoretical capacity (about 3860 mAh $g^{-1}$) and light weight nature (about 0.534 g $cm^{-3}$) have attracted broad scientific and technological interest. Nevertheless, despite over forty years of continuous efforts, the real application of Li metal anode was kept stagnant due to several intrinsic challenges.

Figure 22:
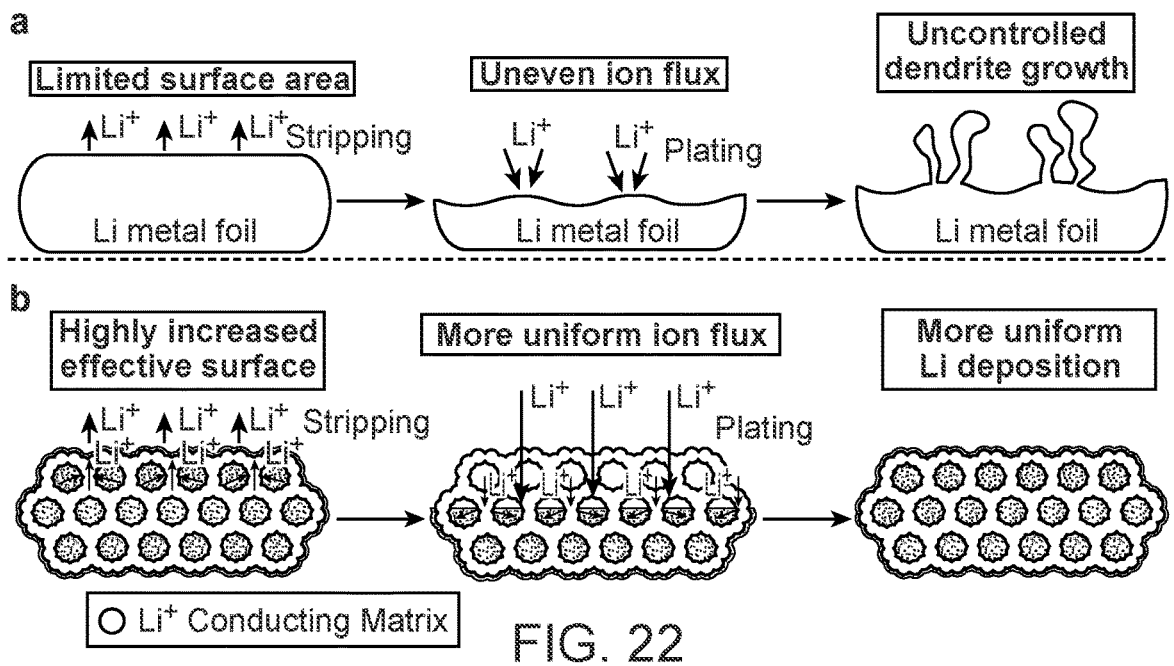
FIG. 22. Schematic of lithium stripping/plating processes on different lithium electrodes. Schematic illustration of lithium stripping/plating processes on Li metal foil (a) with limited activated top surface area, and those on $Li^+$ conductive matrix (b) with highly increased activated surface area.

Dimension change at the electrode level is one of the major concerns. In contrast to conventional graphite with about 10% volume change during cycling, Li metal foil is a "hostless" electrode, which in principle has infinite volume change during stripping/plating cycle (FIG. 22*a*). On one hand, the enormous dimension change will lead to vast built-in stress and floating electrode interface, which can bring internal short circuit and potential explosion hazard. On the other hand, solid electrolyte interphase (SEI) is vulnerable to the moving interface and prone to collapse. Continuous SEI formation during cycling can decompose electrolyte and consume $Li^+$ and also accumulate ionic insulating layer which further blocks the ion transfer. Dendritic and mossy Li growth arisen from uneven electric field and $Li^+$ concentration distribution during cycling is another issue (FIG. 22*a*). The formation of dendritic Li can penetrate the separator and cause internal short circuit, inducing the danger of overheating and thermal runaway. During stripping process, dendritic morphology of Li can aggravate the formation of dead Li and thus, result in low Coulombic efficiency (CE). Moreover, due to the limited accessible activated surface of Li foil for Li stripping/plating, high power operation of the high-energy-density Li—S and Li—$O_2$ batteries is still premature, which highly impedes their power-intensive applications.

Since the advent of Li batteries, considerable research has been conducted to understand Li metal plating/stripping behavior, prevent Li dendrite formation and penetration, as well as improve CE. Solid electrolyte is developed and proven to be efficacious for mitigating dendrite penetration. However, further improvement in ionic conductivity and interfacial ion transfer for ambient temperature operation is still desired. Developing electrolyte additives is also recognized to be effective in stabilizing SEI and affording more uniform Li deposition. Recently, the concept of engineering chemically and mechanically stable artificial interface has been proposed. With engineered layers on current collector, Li can be selectively deposited underneath the artificial interface and allow the formation of stable SEI on the top. Despite the above-mentioned progress, part of the existing problems was targeted. Tremendous electrode dimension change and moderate operation power still remain unsolved. Practically, alternative approaches capable of addressing the multifaceted problems are desired.

Herein, a $Li^+$ conductive nanocomposite electrode (LCNE) is developed as Li metal anodes. In the design, a continuous matrix with $Li^+$ conduction capability is included as the "host" and nanosized metallic Li uniformly embedded in the matrix is included as the Li source (FIG. 22*b*). This design exhibits multiple advantages to solve the above-mentioned problems. First, with the matrix as the "host", highly constant electrode-level dimension can be obtained. This immobilizes the electrode interface, and also prevents the size fluctuation and built-in stress of the cells. Secondly, with $Li^+$ conductive species as the matrix, a high activated surface area Li electrode is obtained, which significantly reduced the effective current density during cycling and in turn, reduced the Li nucleation barrier and afforded much more uniform nucleation. As a result, dendritic growth of Li can be highly suppressed while stable cycling with low energy barrier and low overpotential can be obtained. Another benefit of the approach is that the increased surface area offered better kinetics at increased current density, opening up the opportunities to operate cells at high power output. In this example, prototype Li—S batteries were also demonstrated, which showed highly improved rate capability especially at high rate.

Stable Electrode Dimension and Dendritic Suppression

To approach the above-mentioned design, "overlithiation" of SiO is employed, which is a concept extended from lithiation. Specifically, rather than lithiating the material with Li according to the stoichiometric ratio, for the overlithiation case, certain extra amount of Li is added into the reaction mixture such that excess metallic Li remains in the reaction product. By screening multiple oxides, the overlithiation behavior of metastable SiO phase is determined to be rather unusual. When molten Li and sub-micron-sized SiO powder were mixed at elevated temperature of about 200° C., the mixture exhibited violent reaction. With vigorous stirring, $Li_{22}Si_5$—$Li_2O$ composite with nano-porosity can be obtained in the form of a matrix, where $Li_{22}Si_5$ can serve as a $Li^+$ conductive component. The extra amount of Li can then infuse into the nano-pores. When the reaction is complete, dry silvery powders can be obtained even above the melting temperature of Li, indicating that almost all metallic Li was infused into the nano-pores of the matrix.

The complete synthetic route of the LCNEs is shown in FIG. 23*a*. The procedure was carried out in an argon-filled glove box with sub-ppm $O_2$ level. The first operation is to overlithiate SiO with molten Li at about 200° C. The magnified drawing of the overlithiated powder schematically shows the microstructure of the as-obtained nanocomposite, which is composed of $Li_{22}Si_5$ and $Li_2O$ as the matrix with nanoscale Li embedded inside. Subsequently, mechanical press was applied to the overlithiated powder to afford the pellet electrodes. The thickness of the electrodes can be varied by controlling the amount of powder for a certain pressing area. (FIG. 28).

Figure 23:
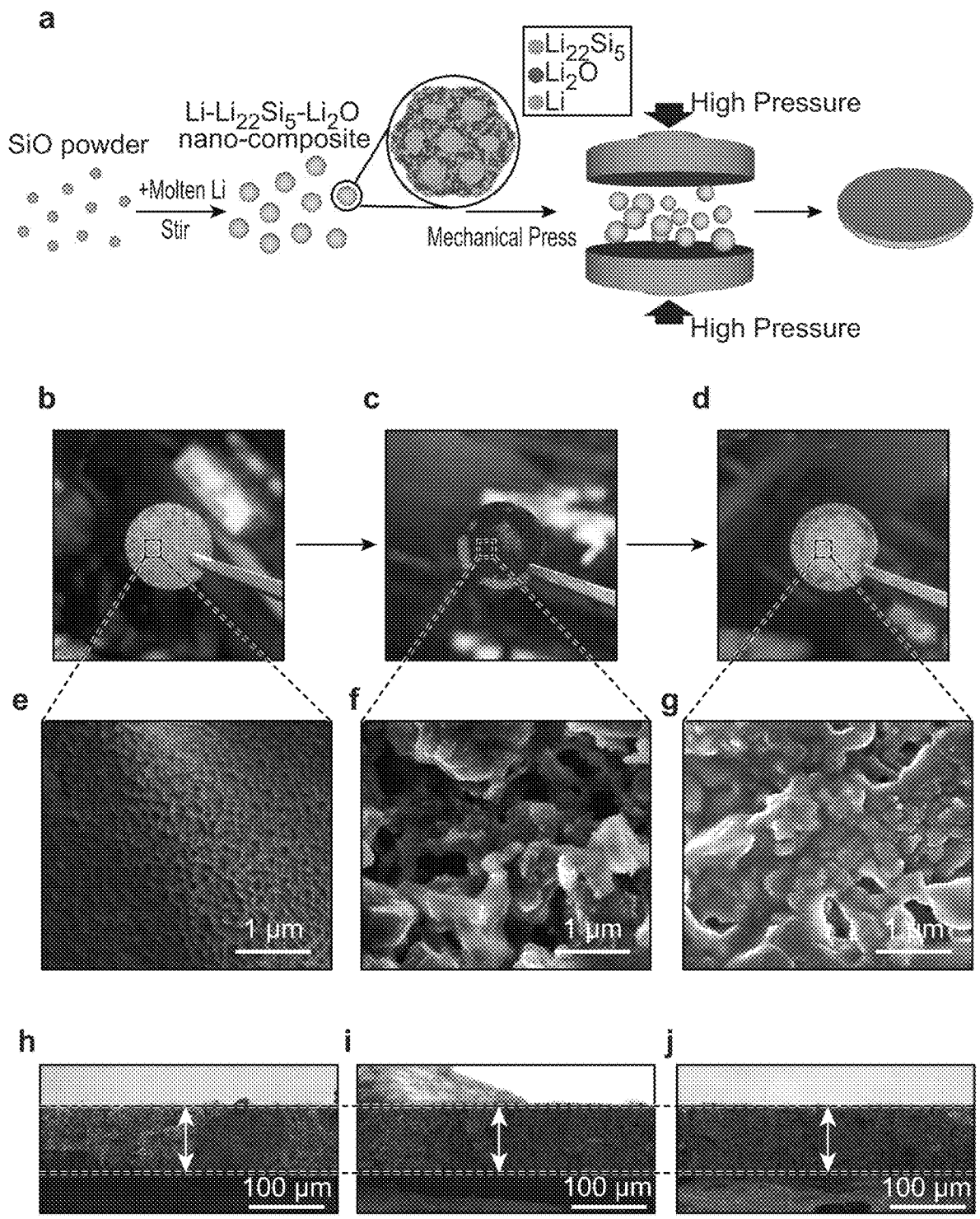
FIG. 23. Synthetic procedures and stripping/plating behavior of as-obtained electrode. (a) Synthetic procedures of Li—$Li_{22}Si_5$—$Li_2O$ nanocomposite electrodes through thermal overlithiation and mechanical pressing process. Digital image (b) and corresponding SEM image (e) of pristine $Li^+$ conductive nanocomposite Li metal electrode (LCNE). Digital image (c) and corresponding SEM image (f) of LCNE after stripping about 8 mAh $cm^{-2}$ of Li with current density of about 2 mA $cm^{-2}$. Digital image (d) and corresponding SEM image (g) of LCNE after stripping and plating about 8 mAh $cm^{-2}$ of Li with same stripping/plating current density of about 2 mA $cm^{-2}$. Cross section SEM images of pristine electrode (h), electrode after stripping about 8 mAh $cm^{-2}$ of Li (i), and electrode after stripping and plating back about 8 mAh $cm^{-2}$ of Li (j). The three electrodes show substantially the same thickness indicating highly constant electrode volume during cycling.

FIG. 23 shows a digital camera image of an as-obtained LCNE, which exhibits silvery color with flat surface. The magnified scanning electron microscope (SEM) image of the LCNE indicates uniformly covered surface by nanosized domains of metallic Li, which accounts for the observed color. To study the internal porous structure of the matrix, about 8 mAh cm$^{-2}$ of Li was stripped from the electrode through galvanostatic charging. After Li stripping, the top surface directly facing the counter electrode exhibited color change from silvery to black (FIG. 23c). The black color may come from $Li_{22}Si_5$ as well as the antireflection effect of the nanoporous structure. From the SEM image (FIG. 23f) of the delithiated electrode, sub-micron and nanosized pores, which were initially occupied by Li, can be observed (representative pores are labeled by arrows in FIG. 23f). Afterwards, when the stripped amount of about 8 mAh cm$^{-2}$ Li was plated back, the silvery color was recovered as can be seen from FIG. 23d. When the corresponding surface morphology was characterized (FIG. 23g), it was found that almost all of the pores were refilled by Li with no observable Li dendrites.

Characterization on the variation of the electrode thickness was also performed to examine the electrode-level dimension stability after Li stripping and plating. The thickness of LCNEs under three conditions, including pristine (FIG. 23h), half-way (about 8 mAh cm$^{-2}$) stripped (FIG. 23i), and after one stripping/plating cycle (FIG. 23j), was measured and compared. To ensure that each condition had the same initial thickness, the electrodes of the three conditions came from the same original piece of pellet; namely, a piece of LCNE was equally cut into four individual segments and three of them were picked for study. As is shown in FIG. 23h-j, the three conditions exhibited almost identical thickness of about 138 μm. This demonstrates that a highly constant electrode dimension during stripping/plating processes can be achieved with the Li$^+$ conductive matrix as the "host" for Li.

Figure 24:
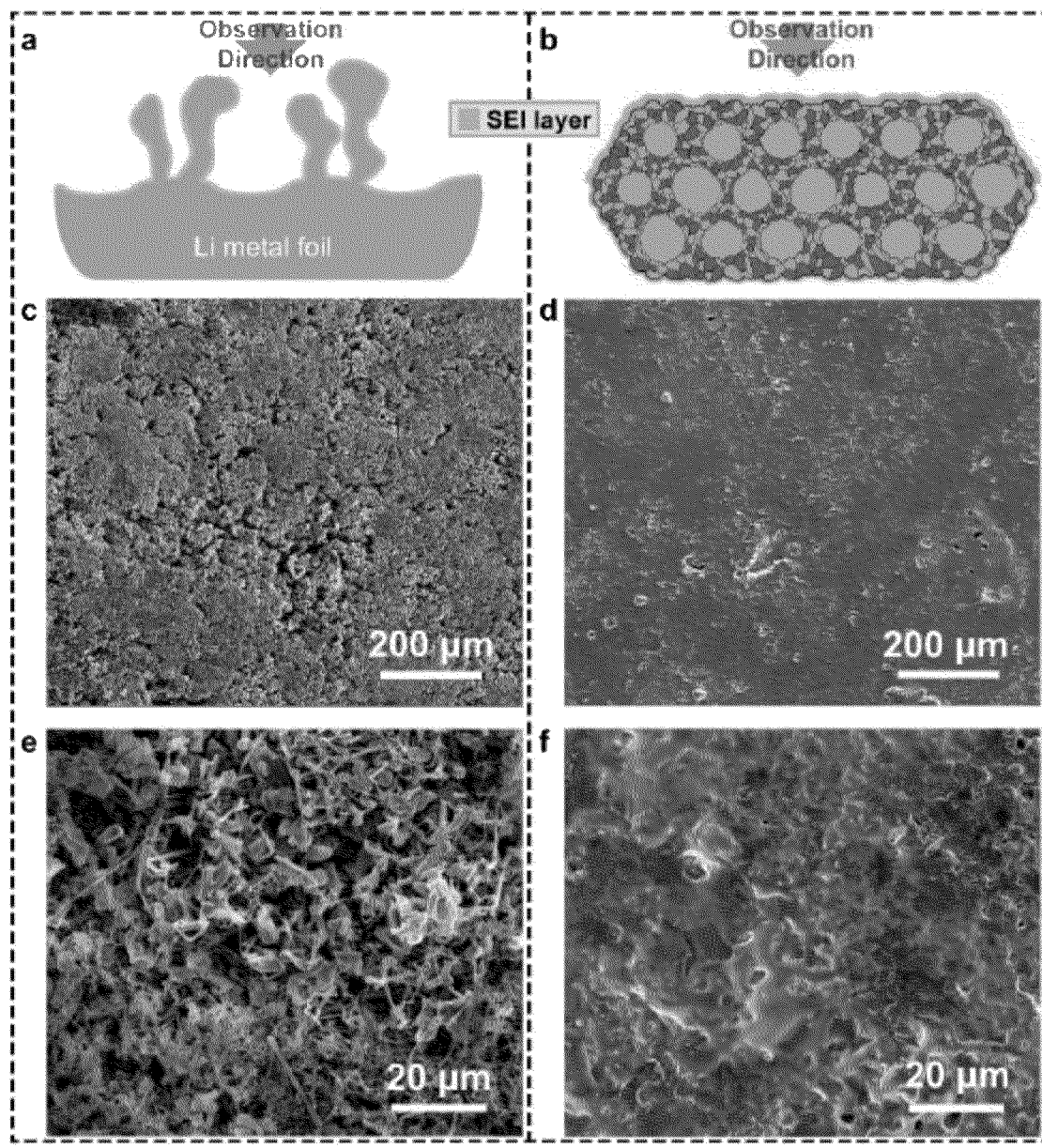
FIG. 24. Characterization on morphology of Li deposited on different Li metal electrodes after 20 cycles. (a) Schematic illustration of SEM observation of Li deposited on Li metal foil and corresponding low magnification (c) and magnified (e) SEM images showing dendritic growth of Li. (b) Schematic illustration of SEM observation of Li deposited on LCNE and corresponding low magnification (d) and magnified (f) SEM images showing no observable dendritic Li growth. The current density is fixed at about 1 mA $cm^{-2}$ for both Li stripping and plating processes. The stripping/plating capacity is about 1 mAh $cm^{-2}$.

To compare the surface morphology difference of Li foil and LCNE after cycling, SEM observation was conducted after 20 galvanostatic cycles with a current density of about 1 mA cm$^{-2}$ and a capacity of about 1 mAh cm$^{-2}$. FIG. 24a, b schematically illustrate the electrode morphology differences of bare Li electrode and LCNE, respectively. The direction of SEM observation is also denoted in FIG. 24a, b. The low-magnification and magnified SEM images of the bare Li surface after cycling are shown in FIGS. 24c and 24e, respectively. From the low magnification image, high surface roughness can be observed, with excessive growth of dendritic Li all over the top. This was further confirmed by the representative magnified SEM image, which shows loosely stacked Li dendrites and nanofilaments. In contrast, the LCNE surface after 20 cycles (FIG. 24d) remained consistently flat over a large area. Under high resolution observation (FIG. 24f), no noticeable dendritic Li was observed. Such stark contrast strongly supports that the LCNE is capable of maintaining stable structure and suppressing dendrite propagation through continuous cycling.

The above experiments support the uniform Li deposition within the matrix, which can be attributed to the Li$^+$ conductive nature and thus highly increased activated surface of the matrix. For bare Li foil, just the very top surface can have access to Li$^+$. As a result, the local electric field and ion flux will be too concentrated to afford uniform Li growth. In contrast, with Li$^+$ conductive matrix, Li$^+$ can be transported into the bulk rather than just the top surface, which activates much more surface area for Li nucleation. With highly increased number of Li nucleus for further deposition, uneven deposition and thus dendritic growth will be highly suppressed.

Low-Barrier, Low-Overpotential and Stable Li Stripping/Plating

Figure 25:
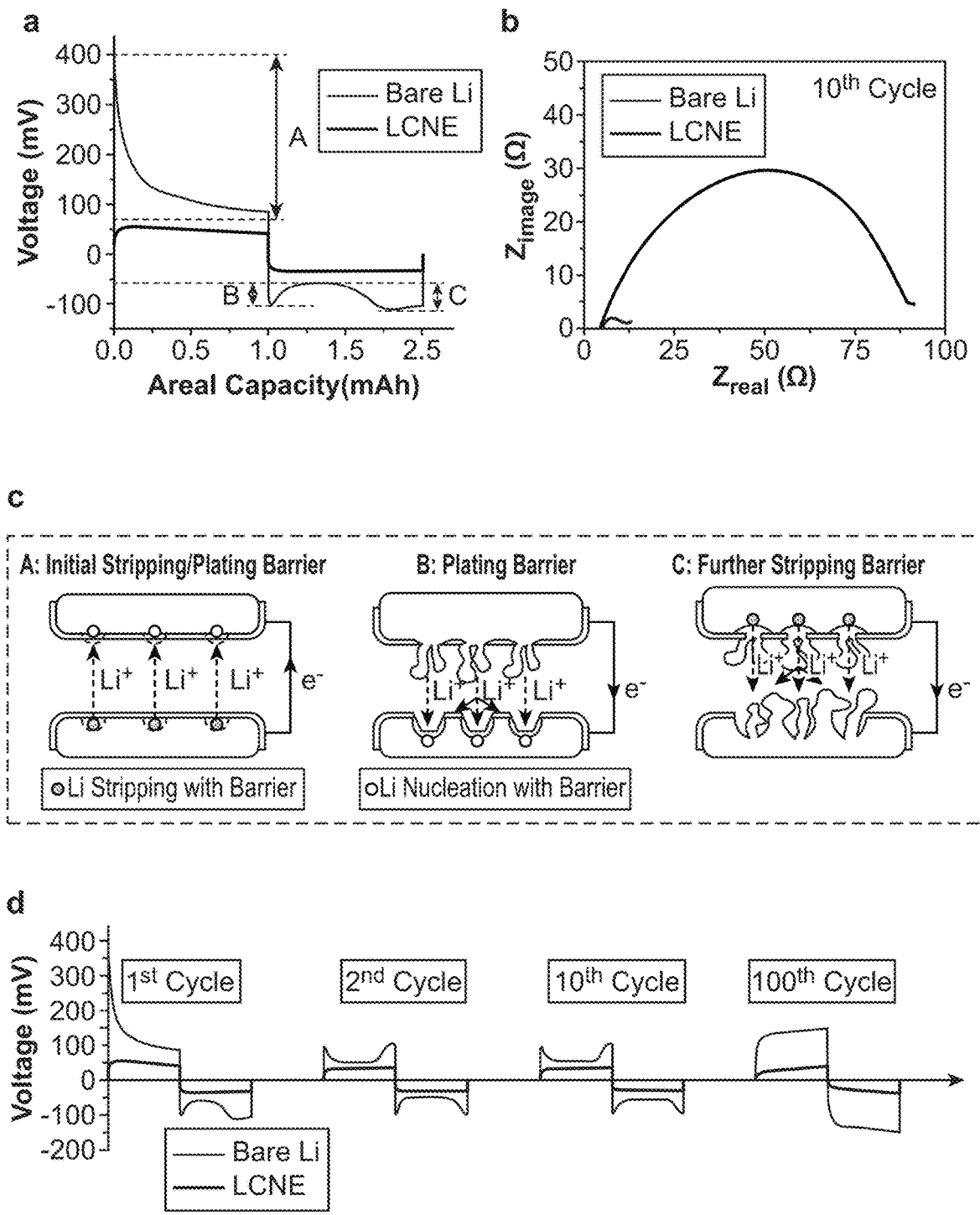
FIG. 25. Electrochemical characteristics of Li stripping/plating and their mechanisms. (a) Typical stripping/plating voltage profile of the Li foil and LCNE of the 1st galvanostatic cycle. (b) Nyquist plots of symmetric cells with Li foil and LCNE after 10 galvanostatic cycles. (c) Schematic shows the initial stripping/plating barrier (corresponding to barrier A in (a)), plating barrier (corresponding to barrier B in (a)) and further stripping barrier (corresponding to barrier C in (a)). (d) Voltage profile of Li foil symmetric cell and LCNE symmetric cell at the 1st, 2nd, 10th, and 100th cycle. The current density and capacity of the cycling are fixed to be about 1 mA $cm^{-2}$ and about 1 mAh $cm^{-2}$, respectively.

To study the electrochemical behavior of the as-obtained LCNEs, symmetric cells with LCNEs as both electrodes were first assembled and tested in carbonate electrolyte. Corresponding cells with symmetric Li foil electrodes were used as comparison. Firstly, the initial galvanostatic cycle of both LCNEs and Li foil electrodes was studied. As shown in FIG. 25a, huge overpotential was observed for Li foil cells during the initial stage of charging (A, about 400 mV). As current passed through continuously, a gradual drop in overpotential can be seen (gradual decline to about 100 mV). At the discharge stage, overpotential bump was initially shown (B), followed by a plateau with relatively low overpotential. Later, discharge overpotential ascended again (C). The high overpotential and the significant overpotential fluctuations here can be attributed to the energy barriers for either stripping or plating Li. FIG. 25c schematically shows the Li stripping/plating in the first cycles corresponding to the high overpotential region A, B, and C shown in FIG. 25a. The origins of the energy barriers at each stage were marked as (stripping barrier) and (nucleation barrier) dots on the electrode surface. For as-assembled cells, the surface of Li foil had a native oxide layer that can block ion transfer. When Li foils were contacted with electrolyte in the cells, an ionic blocking layer of SEI can also spontaneously form. On one hand, the ionic blocking layer on the positive electrode will block the Li stripping underneath. On the other hand, the layer on the negative electrode as well as the relatively flat electrode surface will hamper the nucleation of Li on top. Both effects contribute to the much higher overpotential (region A). At the discharge stage, the high overpotential region B is originated from the nucleation barrier at the positive electrode. For the negative electrode, the freshly deposited Li can be readily stripped, where the new SEI layer is still thin. However, the positive electrode exhibits concave surface configuration after Li stripping, and, although the original SEI layer may have broken, it still covers the electrode together with the newly formed SEI. Thus, nucleation underneath the layer still involves extra energy compensation. Once nucleus have formed, Li can deposit continuously on positive electrode with low hindrance, which accounts for the relatively low overpotential between B and C. Later, once the Li freshly deposited from the last charging is exhausted, the stripping of original Li from negative electrode beneath the thick SEI is involved. This calls for much higher energy barrier than stripping freshly deposited Li, which leads to the overpotential augment. Since the later overpotential increase is due to the stripping of original Li at the negative electrode, this part of capacity illustrates the Li loss during cycling, which can be a strong indicator of the poor CE of the Li foils.

In contrast, the LCNE symmetric cells showed extremely flat plateau at both charging and discharging stage, with no noticeable "bump" during cycling. In addition, much lower overpotential than the Li foil counterparts was obtained. This demonstrates that extremely low energy barrier is involved for both nucleation and stripping process. With Li$^+$ conductive matrix connecting the whole bulk, Li is able to nucleate anywhere Li$^+$ can reach. For nano-sized Li embedded inside, large surface of Li with thin or no SEI layer is available for nucleation, while the large number of nano-sized Li domains themselves can also act as nucleus. For Li stripping, the highly increased activated surface area affords uniform Li dissolution without locally-favored stripping.

Electrochemical impedance spectroscopy (EIS) measurements further support the above conclusion. EIS of LCNE and Li foil cells at both initial stage (FIG. 33) and after 10 cycles (FIG. 25b) was measured. As is shown, the Li foil cells have constantly much higher interfacial resistance compared to the LCNE cells. It is noted that before cycling, Li foil exhibited extremely large interfacial resistance, which can be attributed to the native oxide layers formed on both electrodes. After 10 cycles, interfacial resistance dropped to about one eighth of the original value. This results from the break of native oxide layers as well as the dendritic Li formation which significantly increases the surface area. In contrast, LCNE cells had constantly low resistance. Before cycling, the LCNE cells already exhibit significantly lower interfacial resistance (about 10Ω versus about 650Ω of Li foil) and, after 10 cycles, LCNE cells showed little resistance drop (about 6Ω versus about 85Ω of Li foil). This difference illustrates the much lower Li stripping/plating energy barriers and polarization of LCNE cells.

Noticeably, for the LCNEs, low overpotential and flat voltage plateaus can be well maintained during repeated stripping/plating of at least 100 cycles (FIG. 25d). In contrast, the Li foil control cells showed gradual increase in overpotential. For the 100th cycle, overpotential of the Li foil cells became considerably large. This can be attributed to two reasons, namely, the accumulation of thick SEI, and the continuous consumption of electrolyte by decomposition which highly increased the electrolyte resistance.

Figure 26:
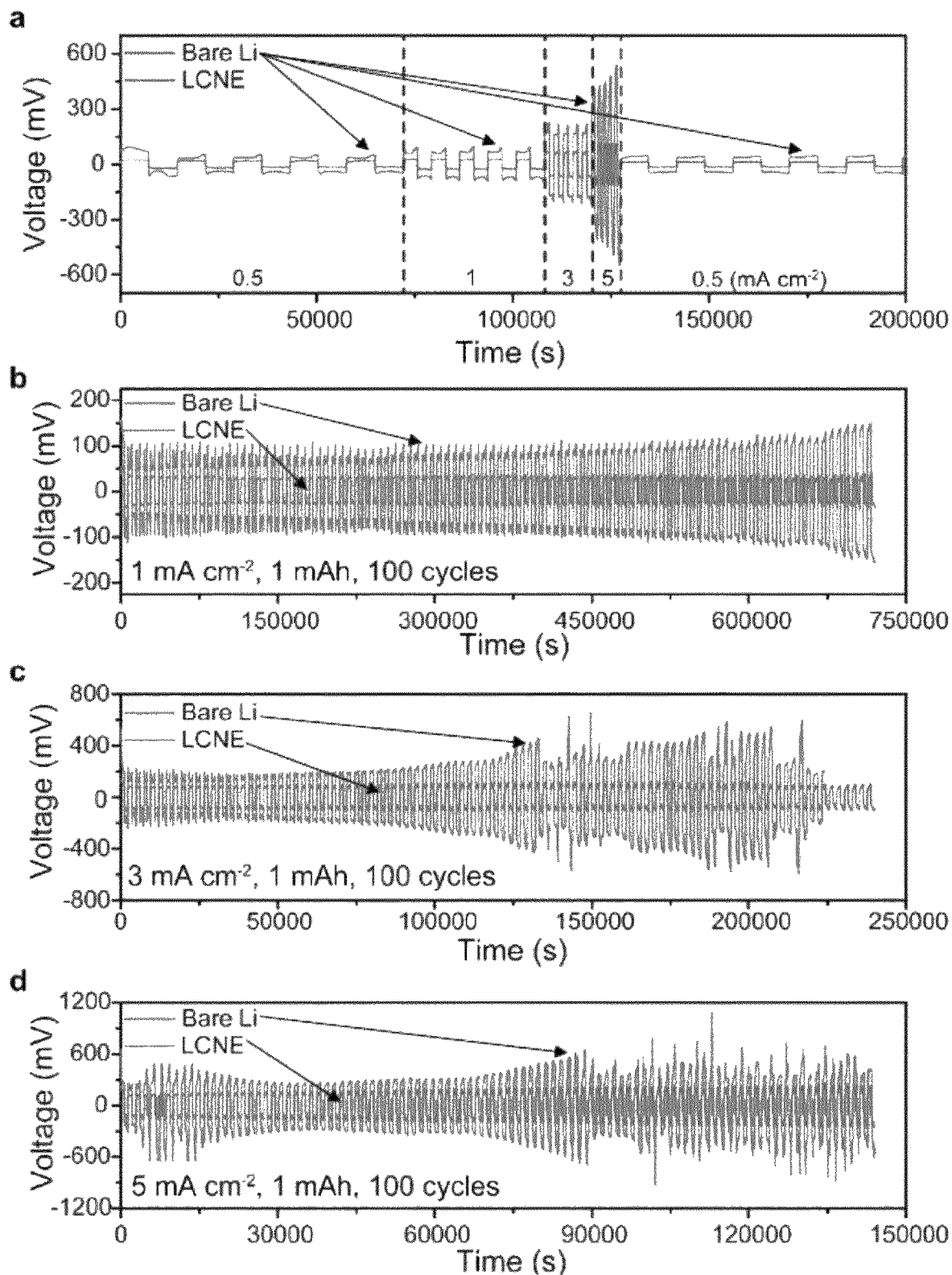
FIG. 26. Electrochemical performance of LCNE symmetric cell. The voltage profiles of Li foil symmetric cells and LCNE symmetric cells at various current densities of about 1 mA $cm^{-2}$ (a), about 3 mA $cm^{-2}$ (b), and about 5 mA $cm^{-2}$ (c). Stripping/plating capacity is fixed at about 1 mAh $cm^{-2}$.

The rate capability test of the LCNEs also displays constantly lower overpotential at different current density. As is shown in FIG. 26a, where the current density is varied from about 0.5 mA cm$^{-2}$ to about 5 mA cm$^{-2}$, low overpotential from about 18 mV to about 100 mV can be obtained (with about 18 mV at about 0.5 mA cm$^{-2}$, about 28 mV at about 1 mA cm$^{-2}$, about 64 mV at about 3 mA cm$^{-2}$ and about 100 mV at about 5 mA cm$^{-2}$) for LCNEs, which is much lower than that of the corresponding Li foil samples. The LCNEs also exhibited highly improved cycling stability at different current density of about 1 mA cm$^{-2}$, about 3 mA cm$^{-2}$, and about 5 mA cm$^{-2}$ (FIG. 26b-d, about 1 mAh cm$^{-2}$ stripping/plating capacity). At about 1 mA cm$^{-2}$ (FIG. 26b), stable cycling with low overpotential of about 32 mV and flat voltage plateaus was observed through 100 galvanostatic cycles, while the control Li foil samples showed continuous increase in overpotential from about 65 mV to about 140 mV. The cycling stability of the LCNEs and the Li foil electrodes diverged even more at higher current densities (FIG. 26c,d). At current densities of about 3 mA cm$^{-2}$ and about 5 mA cm$^{-2}$, LCNE continued to afford good cycling stability with low overpotential, while in contrast, the Li foil counterparts yielded dramatic overpotential increase over cycles. After tens of cycles, it is noted that the overpotential of Li foil electrodes started to decrease and fluctuate, possibly due to the internal short circuit caused by Li dendrite.

The cycling stability study at various current densities was further carried out in ether-based electrolyte. Ether-based electrolyte with small amount of LiNO$_3$ as additives can be a better electrolyte for Li metal anodes since a stable soft SEI layer can form to accommodate the surface fluctuation during stripping/plating. As a result, much more uniform Li deposition can be achieved with Li foil. Nevertheless, the LCNEs can still outperform the Li foils in ether-based system. As shown in FIG. 34, at a current density of about 1 mA cm$^{-2}$, the Li foil electrode showed high overpotential in the early cycles followed by gradual decrease. This decreasing phenomenon can be attributed to the dendritic Li growth, which significantly increases the surface area. For LCNE cells, constantly lower overpotential of about 15 mV can be obtained through the whole 100 cycles. At high current density of about 5 mA cm$^{-2}$, LCNEs also exhibited stable cycling while the Li foil counterpart yielded noticeable voltage fluctuation.

Improved Rate Capability of Li—S Batteries

Metallic Li is the most promising anode material for Li—S battery systems. With the dendrite-free, low energy barrier and stable LCNE as anodes, the electrochemical performance is demonstrated in Li—S batteries. Here, about 12.5 μL cm$^{-2}$ of about 5 M Li$_2$S$_8$ in about 1:1 v/v DOL/DME (about 2 mg cm$^{-2}$ equivalent mass loading of S) is loaded on KOH treated electrospun carbon nanofibers as the cathodes. Rate capability test with current densities varied from about 0.2 C to about 2 C was carried out (based on theoretical capacity of S of about 1673 mAh g$^{-1}$, 1 C=about 3.34 mA cm$^{-2}$). FIG. 27 shows the notable rate capability difference between Li—S cells with LCNEs and Li foils as the anodes. At early stage with low current density, high capacity retention about 1000 mAh g$^{-1}$ can be achieved for both anodes. However, it is shown in FIGS. 27a and 27b that the cell with LCNE as the anode exhibited lower overpotential compared to the Li foil counterpart. More pronounced difference appeared when the current density was further increased. At about 2 C, which is about 6.69 mA cm$^{-2}$, the Li foil-S cell lost its second plateau (Li$_2$S$_6$→Li$_2$S) with cut-off voltage at about 1.7 V, which gave rise to significant capacity drop. In contrast, the LCNE-S cell yielded much improved kinetics, with a second plateau of about 1.9 V even at the high rate of about 2 C. FIG. 27c shows the capacity retention at different C-rates during cycling. For LCNE-S cell, about 1050 mAh g$^{-1}$ of specific capacity can be obtained at about 0.2 C, while at ten times higher current density (about 2 C), the capacity still remained over about 600 mAh g$^{-1}$. Much lower specific capacity retention was observed for the Li foil-S cell especially at high rate, for the capacity dropped significantly from about 950 mAh g$^{-1}$ at about 0.2 C to less than about 100 mAh g$^{-1}$ at about 2 C.

SUMMARY

In conclusion, this example sets forth the development of a Li$^+$ conductive matrix as the "host" for Li metal anodes, which was fulfilled by the overlithiation of SiO to yield uniformly mixed Li—Li$_{22}$Si$_5$—Li$_2$O nanocomposite LCNE. The LCNE provides dendrite-free Li deposition behavior with highly constant electrode-level dimension. Due to the highly increased activated surface achieved by Li$^+$ conductive network, much lower stripping/plating energy barrier and thus stable cycling with low overpotential, flat plateau can be attained. By systematically analyzing the mechanism of energy barriers at different charging/discharging stage from Li foil electrodes, the origin of the outstanding electrochemical performance in LCNEs can be understood. In addition, further demonstration is made of the excellent rate performance at different current densities of about 0.5 mA cm$^{-2}$, about 1 mA cm$^{-2}$, about 3 mA cm$^{-2}$, and about 5 mA cm$^{-2}$, where consistent low overpotential of about 18 mV, about 28 mV, about 64 mV and about 100 mV can be obtained, respectively. Stable cycling stability can also be obtained for at least 100 cycles at various current densities. Even in ether-based electrolyte system, enhanced electrochemical performance can still be attained. By introducing the high performance LCNEs into Li—S batteries, improved rate capability especially at high current density can be observed. This example sets forth a methodology for Li metal anode design and opens opportunities for the next-generation high-energy-density, high-power Li metal batteries under safe and stable operation.

Methods

Overlithiation of SiO. Before performing overlithiation of SiO, SiO powders (Aldrich, 325 mesh) was first ball-milled for about 5 hrs with high energy mechanical milling machine to yield sub-micron sizes. The as-obtained SiO powders were then dried in vacuum oven with temperature fixed at about 60° C. for about 48 hrs. The fully dried powders were transferred into an argon-filled glove box with sub-ppm $O_2$ level for later overlithiation process. To overlithiate the SiO, about 0.5 g of SiO powders were firstly put into a stainless steel crucible. The crucible was then heated on a hot plate at about 200° C. Afterwards, Li foil (about 99.9%, Alfa Aesar) was weighted and put into the crucible. The mass of Li foil can be varied based on the desired amount of extra-Li. The additional amount of Li is controlled <about 1.0 g to yield uniformly-mixed dried powders. After Li was melted, the mixture was vigorously stirred for homogeneous reaction. Once reaction complete, the as-obtained dried powders were cooled in the argon atmosphere to room temperature.

LCNE fabrication. After the overlithiated composite powders were attained, mechanical press was applied to fabricate the LCNEs. To press the as-obtained powders into the electrodes, certain amount of powders were weighted and poured into the pellet die (Aldrich) following by about 10 tons of pressure. The thickness of the LCNEs can be controlled by the amount of powders pressed. All processes were finished in the glove box.

Characterizations. SEM images were obtained with a FEI XL30 Sirion scanning electron microscope. For the SEM characterizations on batteries after cycling, the electrodes were first extracted from the coin cells in the glovebox and followed by gentle rinse in DOL to remove Li salt residue. XRD patterns were recorded on a PANalytical X'Pert instrument. To protect the high reactive Li related compound from the air, the XRD samples were loaded on a glass slide and covered with Kapton tape in glove box prior to the XRD measurements.

Electrochemical measurements on symmetric cells. To study the Li stripping/plating processes within a symmetric cell configuration, 2032-type coin cells (MTI) were assembled. The electrodes used were either the above-mentioned LCNEs or Li foils. The electrolytes employed were either about 1 M lithium hexafluorophosphate ($LiPF_6$) in about 1:1 ethylene carbonate (EC)/diethyl carbonate (DEC) (BASF Selectilyte LP40) with about 10% fluoroethylene carbonate (FEC, Novolyte Technologies Inc.) and about 1% vinylene carbonate (VC, Novolyte Technologies Inc.) as additive for carbonate-based system study, or about 1 M Lithium bis(trifluoromethanesulphonyl)imide (LiTFSI, Aldrich) in about 1:1 v/v 1,3-dioxolane (DOL, Sigma-Aldrich)/1,2-dimethoxyethane (DME, Sigma-Aldrich) with about 1 wt % lithium nitrate (Aldrich, 99.99%) for ether-based system. Celgard 2325 (25 μm PP/PE/PP) was used as the separator. The control bare Li cells were assembled using freshly scraped Li foil. Galvanostatic cycling was conducted either on an Arbin 96-channel battery tester, or a LAND 8-channel battery tester. The electrochemical impedance spectroscopy measurements were carried out on a Biologic VMP3 system.

Lithium polysulfide ($Li_2S_8$) solution preparation. For the preparation of about 5 M $Li_2S_8$ solution, about 0.56 g of sulfur and about 0.115 g of $Li_2S$ were weighted and added into about 4 mL of about 1:1 v/v DOL/DME solution mixed solution with the addition of lithium nitrate additive (about 5 wt. %). The obtained suspension was stirred and heated at about 80° C. overnight to yield red-brown $Li_2S_8$ solution.

Li—S batteries tests. To study the electrochemical performance of LCNEs in Li—S batteries, 2032-type coin cells (MTI) were assembled. The cathodes used about 1 $cm^2$ KOH treated electrospun carbon nanofibers to adsorb the $Li_2S_8$ catholyte. The detailed procedures for carbon nanofiber fabrication is included in the supplementary information. About 12.5 μL of above-synthesized 5 M $Li_2S_8$ solution (about 2 mg equivalent mass loading of sulfur) was uniformly drop-cast onto the carbon fiber as the catholyte. The electrolyte was freshly prepared by dissolving about 1 M LiTFSI in about 1:1 v/v DOL/DME containing $LiNO_3$ (about 1 wt. %). Electrolyte in each cell was fixed to be about 20 μL. Celgard 2325 (25 μm PP/PE/PP) was used as the separator. The rate capability test of the cells was carried out using an Arbin 96-channel battery tester.

Supplementary Information

Fabrication of electrospun carbon nanofibers. To fabricate the carbon nanofibers, about 1.0 g of polyacrylonitrile (PAN, Aldrich, $M_v$ of about 150,000) was first dissolved in about 10 mL dimethylformamide (DMF) and vigorously stirred at about 80° C. to yield an uniformly dissolved viscous solution. The freshly prepared solution was then filled into a syringe for electrospinning. The electrospinning was performed with about 15 kV of static electric voltage and about 10 cm of air gap distance. The flow rate of solution was set at about 0.25 mL $h^{-1}$. A carbon paper (8 cm×8 cm) was used as the collection substrate. After electrospinning for about 3 hrs, the collected nanofiber on the carbon paper was peeled off to yield a freestanding mat. The mat was pre-carbonized by heating up to about 300° C. at a rate of about 1° C. $min^{-1}$ in a box furnace and held for about 4 hrs. Afterwards, the freestanding pre-carbonized PAN nanofiber films were further carbonized under an argon atmosphere at about 850° C. (heating rate of about 3° C. $min^-$) for about 4 hrs to generate the carbon nanofiber films (CNFs).

KOH treatment on CNFs. About 20 wt % of potassium hydroxide (KOH, Aldrich) was first dissolved in about 1:1 v/v deionized water (DI water)/isopropyl alcohol (IPA) solution. The carbon nanofiber obtained from the above-mentioned method was then dipped into the solution for about 5 seconds. The residue solution on the CNFs was absorbed by tissue paper. This process is repeated for 5 times. Afterwards, the CNFs were dried in a vacuum oven at the temperature of about 60° C. After fully dried, the CNFs were annealed in argon atmosphere at about 700° C. for about 2 hrs. The as-obtained CNFs were then punched into about 1.0 $cm^2$ disk with average weight of 2.3±0.1 mg per piece.

Example 3

Lithium Coated Polymeric Matrix as Reduced Volume Change and Dendrite-Free Lithium Metal Anode Overview Lithium metal is a desired anode material for the next-generation high-energy-density batteries. Nevertheless, dendrite growth, severe side reactions and virtually infinite relative volume change during cycling have impeded practical applications. Here, this example demonstrates a metallic Li anode design by directly infusing molten Li into a polymeric matrix. The electrospun polyimide fiber employed was stable against the high temperature, highly reactive molten Li, and via a conformal layer of ZnO coating to render the fiber surface lithiophilic, molten Li can be readily drawn into the matrix, affording a nanoporous Li electrode. Of note, the polymeric backbone afforded an uniform Li stripping/plating behavior from the underlying conducting Li, which effectively confined Li within the electrode matrix during cycling, realizing reduced volume change at the whole electrode level and effective dendrite suppression. Moreover, the porous electrode reduced the effective current density per unit area and therefore, flat voltage profiles and extremely stable cycling of more than 100 cycles can be achieved even at a high current density of about 5 mA/cm$^2$ in both carbonate and ether-based electrolyte. The advantages of the polymeric matrix and porous electrode provide important insights into the design principles of stable Li metal anodes.

Introduction

The ever-increasing demand for high-energy-density storage systems for transportation (electric vehicles), portable electronics and other applications has stimulated intensive research on rechargeable batteries that go beyond the conventional lithium (Li) ion chemistry. Among the possible options, Li metal is the most desired anode material due to its highest theoretical capacity (about 3860 mAh/g) as well as the lowest electrochemical potential (about −3.040 V vs standard hydrogen electrode). Despite the appealing properties, Li metal electrode has been plagued for decades with the problem of ramified growth during repeated stripping/plating and the associated electrolyte decomposition, which lead to serious safety concerns and poor battery cycling efficiency.

Li is highly reactive such that, in a liquid electrolyte, it reacts spontaneously with solvent molecules and salt anions to form an insoluble layer of solid electrolyte interphase (SEI). When SEI becomes stabilized to block electron transfer, this passivating film can slow down or ideally prevent electrolyte from further decomposition. Nevertheless, as a "hostless" electrode, the Li metal anode has a virtually infinite relative volume change during stripping/plating, resulting in the mechanical instability of the SEI layer and the formation of cracks. The cracks expose fresh Li underneath and locally enhance the Li ion flux, leading to non-homogeneous Li growth (dendrite, filament, and so forth) that can induce internal short circuit and thermal runaway with potential safety hazard. Moreover, the high surface area, dendritic Li growth brings about a continuous loss of both working Li and electrolyte (recurrent SEI formation), which gives rise to low Coulombic efficiency (CE) and rapid capacity decay.

Research on the Li metal stripping/plating process has deepened the understanding but has failed to solve the above-mentioned problems in an effective manner. On one hand, the use of solid electrolytes to suppress dendrite propagation remains premature at current stage, for they often fall short of meeting the high power specification at ambient temperature due to limited ionic conductivity, together with issues such as large interfacial impedance. On the other hand, other approaches to dendrite mitigation in liquid electrolyte focus on the stabilization of SEI via adjusting the electrolyte composition and additives. Though effective, most additives will be continuously consumed during battery cycling so that the suppression effect is not fully sustainable. Alternatively, the application of a mechanically stable artificial SEI coating such as polymer or solid-state blocking layers has been proposed. For example, a nanoscale interfacial engineering approach based on interconnected hollow carbon nanospheres, ultrathin two-dimensional boron nitride or oxidized polyacrylonitrile fibers can be used to control the dendrite growth and improve the cycling CE. Nevertheless, these approaches adopted the galvanostatic Li plating/stripping approach on a current collector, which still are unable to address the issue of virtually infinite volume change since the electrodes expand during Li plating and shrink during stripping. In addition, contrary to Li-ion batteries where Li ions are stored in prelithiated cathodes, many of the intensively studied high-energy-density battery chemistries (e.g., Li-air and Li—S) involve cathodes in the non-lithiated form. Therefore, it is apparent that a metallic Li anode design with little volume change at the whole electrode scale and long-term cycling stability in a liquid electrolyte is of particular importance.

Herein, this example demonstrates a rational design of a metallic Li anode that successfully achieved a reduced volume change at the whole electrode level and stable, dendrite-free Li cycling. Several important design principles were employed. Firstly, in order to realize reduced volume change, a chemically as well as electrochemically stable matrix is included to sustain a highly constant electrode volume during cycling. In addition, complete confinement of Li within the matrix is desired to preserve a constant electrode dimension, and, therefore, the direct nucleation of Li on the top surface of the matrix should be reduced or prevented. Moreover, a porous electrode is desirable since a reduced local current density is beneficial to alleviate dendrite propagation. Following the above-mentioned rationale, a Li-coated polyimide (PI) matrix design for metallic Li anode is proposed. The electrospun polymeric fibers afforded a chemically and electrochemically inert matrix, which is favorable to confine the stripping/plating of Li solely or primarily within the matrix. Notably, PI is rather unusual as a high performance polymer that exhibits excellent chemical stability, heat resistance and mechanical strength above the melting point of Li (about 180° C.). However, the wetting of molten Li on PI polymer is poor. By applying a layer of ZnO coating via atomic layer deposition (ALD) on the PI fibers, molten Li can react with ZnO and subsequently infuse into the PI matrix, resulting in a freestanding, current collector-free Li electrode. More importantly, the conducting function is separated from the matrix, where infused metallic Li itself served as the sole or primary electron transport media. As a result, the electrically insulating surface after Li stripping effectively prevented the direct plating of Li on the top surface of the matrix in the subsequent cycle, bringing about a well-confined, dendrite-free Li stripping/plating behavior that successfully addressed the problem of infinite volume change. Moreover, the obtained electrode is highly porous so that the reduced effective current density resulted in flat voltage profiles and stable cycling of at least 100 cycles in both carbonate and ether-based electrolytes even at a high current density of about 5 mA/cm$^2$, which stands in stark contrast to the fluctuated and unstable cycling profile of bare Li foil electrodes.

Results

Fabrication of the Li-coated PI electrode. FIG. 37 illustrates the fabrication process of the Li-coated PI matrix electrode. An electrospinning method is employed to obtain the PI fiber matrix. Thermogravimetric analysis (TGA, FIG. 42) confirmed that the electrospun PI fiber is stable up to about 450° C., which is well above the melting point of Li (about 180° C.). Such high heat-resistance ensures that the matrix can withstand the temperature of molten Li in order to fabricate the metallic Li anode. Nevertheless, molten Li cannot adequately wet the bare PI matrix (FIG. 43). Due to the high surface tension of molten Li on PI fiber, large driving force is involved for Li to infuse into the matrix. Rather than physical absorption, surface chemical reaction which can afford much higher driving force is desired. Through screening on materials that can undergo conversion reaction with Li, it is determined that a layer of conformal ZnO coating applied to the matrix via atomic layer deposition (ALD) can render the matrix wettable by molten lithium, or "lithiophilic". Subsequently, when the core-shell PI—ZnO matrix was placed in contact with molten Li, ZnO reacted with molten Li and extra Li can be drawn into the matrix, affording a Li-coated PI electrode.

Characterization of the Li-coated PI electrode. The morphology of the electrospun PI fibers was characterized using a scanning electron microscope (SEM). As can be seen from FIG. 38a, the fibers were continuous and uniform in general with a diameter of about 400 nm. After ALD coating, the surface of the fibers roughened due to the accumulation of a conformal layer of ZnO nanoparticles (FIG. 38b). Evident PI—ZnO core-shell structure can be observed from the cross-sectional SEM image (FIG. 38c), where the PI core appeared darker in color and the thickness of the ZnO shell was measured to be about 30 nm (FIG. 44). Scanning transmission electron microscope (STEM) energy dispersive X-ray (EDX) elemental mapping (FIG. 38d) as well as line scan (FIG. 45) resolved the distribution of C (from the PI backbone) and Zn (from the ZnO coating), further confirming the core-shell structure of the fiber matrix after ALD. FIG. 38e shows the SEM top view of the PI matrix after Li coating. It appears that Li was drawn into the matrix preferentially along the fibers, and thus, the matrix was not densely coated with Li. The porous nature of the resulting matrix can be further revealed from the cross sectional SEM image (FIG. 46), where noticeable pores can be observed. X-ray diffraction (XRD) was employed to understand the compositional evolution of the matrix (FIG. 38f). As can be seen from the XRD spectra, the ZnO layer reacted with molten Li to form LiZn alloy and $Li_2O$ during the Li coating process. Since the electron percolation pathway of the alloy particles within the non-conducting $Li_2O$ matrix is generally long, the matrix remained low in electrical conductivity compared to metallic Li after Li coating. Such a porous and electrically insulating matrix renders favorable electrochemical features to the resulting Li electrode, which will be elaborated in detail in later sections.

It is important to ensure the stability of the polymeric backbone in contact with the highly reductive molten Li. Therefore, Fourier transform infrared spectroscopy (FTIR) was employed (FIG. 38g, inset shows the general chemical structure of PI), where the existence of PI can be identified from three characteristic peaks corresponding to asymmetric C═O stretching, symmetric C═O stretching and C—N stretching. After ALD and the subsequent contact with molten Li, the transmittance intensity was reduced due to the coating layers, while the three characteristic peaks remained, confirming the intact polymeric matrix. In addition, neither anodic nor cathodic decomposition peaks can be observed from the cyclic voltammetry (CV) of the pristine PI (FIG. 47), indicating the chemical stability of the polymeric matrix towards electrochemical cycling.

The capacity of the Li electrode was determined to be above about 2000 mAh/g based on the weight of the whole composite electrode via Li stripping (FIG. 48). Thus, the existence of the matrix did not significantly compromise the high specific capacity of the Li anode. Noticeably, by adjusting the thickness of the electrospun matrix, which can be done by changing the electrospinning time, the thickness of the final Li electrode can be tuned accordingly to match the capacity of the battery cathode (FIG. 49).

Well-confined Li stripping/plating within the matrix. Investigation was made of the stripping/plating process of the Li-coated PI matrix using a two-electrode symmetric cell configuration assembled in 2032 coin cells with carbonate-based electrolyte (about 1 M lithium hexafluorophosphate ($LiPF_6$) in about 1:1 ethylene carbonate, EC/diethyl carbonate, DEC, BASF). Interestingly, the electrode exhibited a well-confined stripping/plating behavior (FIG. 39). Top fibers of the matrix were exposed after stripping away about 5 $mAh/cm^2$ Li at a current density of about 1 $mA/cm^2$ (FIG. 39a), which indicates that the top Li layers were dissolved more favorably during stripping. Subsequently, when about 3 $mAh/cm^2$ Li was plated, Li was observed to be deposited into the matrix and partially filled the space between the fibers (FIG. 39b). Finally, when all the stripped Li was plated back (FIG. 39c), the top surface of the matrix was covered again by Li (similar to FIG. 38e) with no discernible dendrites. The well-confined plating behavior can be rationalized by the removal of the conductive Li component in the prior stripping process, and thus the exposure of the electrically insulating PI surface. Since Li plating occurs primarily where electrons meet Li ions, the exposed insulating surface was rendered unfavorable for Li nucleation. Instead, the metallic Li confined within the matrix served as the electron conductor such that the deposition of Li occurred primarily on the underlying reserved Li. In addition, the much larger effective surface area lowered the overall deposition barrier and thus preventing the formation of "hot spots". As a result, uneven Li deposition can be suppressed. On the contrary, if the electrons could be efficiently transported to the electrolyte-facing top surface or the electrodes exhibited limited surface area, undesirable Li stripping/plating behavior may occur after recurrent cycles (FIG. 39, top-right scheme). Direct Li nucleation on the top surface might be easier due to the high availability of both electrons and Li ions, which provides favorable sites for dendrite growth while leaving the interior voids empty.

Dendrite-free cycling with minimum volume change. The morphology of the surface of the Li-coated PI matrix was studied after 10 cycles of galvanostatic stripping/plating in EC/DEC (FIG. 40a-c). Due to the above-mentioned well-confined Li cycling behavior, the surface of the Li-coated PI electrode remained consistently flat even at a high current density of about 5 $mA/cm^2$ (note that the uniform fibrous features in FIG. 40a-c are the fiber matrix and shall not be mistaken as Li dendrites). On the contrary, for the bare Li electrodes, rough surface and excessive mossy Li growth can be observed after 10 cycles even at a relatively low current density of about 1 $mA/cm^2$. Such drastically different result further demonstrates the merit of the PI matrix on dendrite suppression.

Moreover, due to the existence of the host matrix, the issue of infinite volume change associated with the "hostless" Li stripping/plating can now be solved. Even with the complete stripping of Li, the change in electrode thickness was minimal. For example as shown in FIG. 40f-g, the electrode was on average about 253 μm before stripping and remained as about 247 μm after complete stripping, which was merely about 2.4% of change (a relatively thick electrode was chosen for the more precise determination of thickness variation). However, for bare Li foil, about 1 $mAh/cm^2$ capacity represents about 4.85 μm thickness of Li (see Supporting Information for detailed calculation). Therefore, at least tens of microns of electrode thickness fluctuation can be expected for one single layer Li electrode in a commercial cell. Considering the conventionally applied stacking or rolling battery configuration with multiple layers, the accumulated dimension fluctuation can be tremendous. It is noted that for later cycles, due to the formation of dendritic Li and thus a porous electrode, the dimension fluctuation can be even larger. Thus, it is apparent that the existence of a stable matrix and the well-confined Li cycling behavior are desirable to alleviate the electrode level volume change, addressing the potential safety concerns.

Electrochemical cycling stability. The galvanostatic cycling performance of the Li-coated PI matrix was studied in both carbonate (EC/DEC) and ether (about 1 M Lithium bis(trifluoromethanesulfonyl)imide, LiTFSI in about 1:1 1,3-dioxolane, DOL/1,2-dimethoxyethane, DME with about 1 wt % lithium nitrate) based electrolyte and compared with bare Li electrode (FIG. 41, FIGS. 50-52). At a current density of about 1 $mA/cm^2$ in EC/DEC (FIG. 41a), the symmetrical cell of bare Li exhibited a large Li stripping/plating overpotential (>about 100 mV vs $Li^+$/Li), which increased considerably within the first 100 cycles (>about 170 mV in the 100th cycle). In contrast, the Li-coated PI matrix showed a much lower overpotential (about 35 mV in the initial cycle) but also achieved very stable cycling for at least 100 cycles (about 40 mV overpotential in the 100th cycle). The difference in cycling stability (FIG. 41b-c) and overpotential (FIG. 41d) became increasingly pronounced at higher current densities. The stripping/plating overpotential for Li-coated PI matrix was about 70 mV and about 110 mV at a current density of about 3 $mA/cm^2$ and about 5 $mA/cm^2$ respectively and the values remained substantially constant within 100 cycles. However, the bare Li electrode succumbed to substantial voltage fluctuation at just 88 cycles at a current density of about 3 $mA/cm^2$ and 75 cycles at a current density of about 5 $mA/cm^2$ which might be attributed to possible dendrite-induced soft short circuit. Similarly, in DOL/DME electrolyte, the Li-coated PI matrix again outperformed the bare Li electrode (FIG. 50). Noticeably, although DOL can improve the cycling life of Li metal anodes due to the formation a relatively flexible oligomer SEI, the bare Li electrode still exhibited a necking behavior (overpotential first decreases then increases) during cycling, which is a characteristic sign for dendrite formation in early stage and SEI accumulation later. Nevertheless, the Li-coated PI matrix maintained flat, substantially constant cycling profiles and reduced overpotential at all current densities. Such exceptional long-term cycling performance is a good indicator of the superior CE and more uniform Li deposition/dissolution of the Li-coated PI electrode.

Discussion

Two factors contributed to the excellent electrochemical performance of the Li-coated PI matrix, namely, the porous nature of the electrode and the non-conducting nature of the exposed matrix surface after Li stripping. As mentioned previously, molten Li was drawn into the matrix preferentially along the fibers during the Li coating operation, resulting in a porous Li electrode. The high porosity can be further confirmed by the fast electrolyte uptake during cell assembly (FIG. 51). Such high porosity increased the surface area of the electrode, which can in turn significantly reduce the effective current density during cycling. As a result, the Li stripping/plating overpotential was much smaller for the Li-coated PI matrix, especially at high current densities (FIG. 41d). Correspondingly, the electrochemical impedance spectroscopy revealed a much reduced interfacial charge transfer resistance for the Li-coated PI matrix compare to bare Li (about 10 times lower in EC/DEC, FIG. 41e and FIG. 52). Further, the reduced effective current density rendered the Li-coated PI matrix a flat stripping/plating voltage profile (FIG. 41f-g and FIG. 53). For the bare Li electrode, large "overpotential bumps" at the beginning and the end of each stripping or plating process can be observed, especially for the early cycles (FIG. 54). This phenomenon can be explained by the high specific kinetic hindrance for non-uniform Li dissolution/deposition at high current density. The fluctuation attenuated in later cycles due to the formation of mossy Li, which increased the surface area of the electrode, reducing the effective current density. However, when compared to the fluctuated profile of the bare Li electrode, the voltage profile of Li-coated PI was flat at all current densities throughout the cycling, demonstrating the advantages of the porous electrode. In addition, the effective current density during Li stripping/plating has an impact on the dendrite formation and growth. Lower effective current density results in reduced electrolyte decomposition and the related SEI formation during cycling so as to suppress the dendrite growth. Therefore, the porous electrode structure, in addition to the non-conducting polymeric matrix, which led to the well-confined Li dissolution/deposition behavior, effectively ensured the dendrite-free cycling of the Li-coated PI electrode, giving rise to stable long-term performance.

In conclusion, this example demonstrates a free-standing, porous metallic Li anode by infusing molten Li into a core-shell PI—ZnO matrix. The excellent heat resistance and chemical stability of the PI fibers afforded the structural integrity of the matrix during Li coating and the subsequent battery cycling, while the conformal ALD ZnO coating provided the driving force for the molten Li infusion. Noticeably, the exposed non-conducting fibers after Li stripping reduced the direct plating of Li on the top surface of the electrode, which effectively confined Li within the matrix. In this manner, dendrite-free and reduced volume change Li stripping/plating can be successfully achieved, addressing the biggest concerns for Li metal anode. Remarkably, different from the dense bare Li electrode, the large porosity of the Li-coated PI electrode considerably decreased the effective current density during cycling. As a result, flat voltage profiles and long-term cycling stability can be realized even at a high current density of about 5 $mA/cm^2$. The benefits of non-conducting polymeric matrix and electrode porosity shed new light on the design principles of metallic Li anodes and open new opportunities to the realization of the next-generation high-energy-density battery systems based on Li metal chemistries.

Methods

Electrospinning of the PI matrix. About 15 wt % PI powder (DuPont CP-0650) was dissolved in N-methyl-2-pyrrolidone (NMP) and stirred at about 750 rpm in an about 60° C. oil bath overnight to afford a homogeneous solution. Subsequently, the solution was loaded into a glass syringe with a stainless steel needle tip, which is connected to a voltage supply (ES30P-5W, Gamma High Voltage Research). The applied potential on the needle was about 15 kV, the distance between the needle tip and the graphite paper collector was about 15 cm and the pumping rate was about 10 μL/min. In addition, a negative voltage of about 1 kV was applied at the collector to improve the homogeneity of the electrospun film. The thickness of the electrospun PI matrix can be tuned by adjusting the electrospinning time.

Atomic layer deposition. The conformal ZnO layer was coated on the PI fibers via atomic layer deposition using the Cambridge Nanotech Savannah S100 at about 80° C. with diethyl zinc (DEZn) and de-ionized (DI) water as precursors. The pulse times for DEZn and DI water were about 15 ms with about 60 s waiting between each pulse. Approximately 300 cycles were included to obtain a ZnO coating with desirable Li wetting property.

Li coating of the core-shell PI—ZnO matrix. The Li coating process was carried out in an Argon-filled glovebox with sub-ppm $O_2$ level. In a typical process, freshly scraped Li foil (about 99.9%, Alfa Aesar) was put into a stainless still crucible and heated to melt on a hotplate (VWR). Subsequently, the edge of the core-shell PI—ZnO matrix (punched into about 1 $cm^2$ disks) was put into contact with the molten Li. Li can steadily rise up and wet the whole matrix, affording the final Li electrode.

Electrochemical measurements. The processes of Li stripping/plating were studied using a symmetric cell configuration by assembling the electrodes into 2032-type coin cells. The electrolytes employed were either about 1 M lithium hexafluorophosphate ($LiPF_6$) in about 1:1 ethylene carbonate (EC)/diethyl carbonate (DEC) (BASF Selectilyte LP40) or about 1 M Lithium bis(trifluoromethanesulfonyl) imide (LiTFSI) in about 1:1 1,3-dioxolane (DOL)/1,2-dimethoxyethane (DME) with about 1 wt. % lithium nitrate additive. The separator used was Celgard 2325 (25 μm PP/PE/PP). The control bare Li cells were assembled using freshly scraped Li foil. Galvanostatic cycling was conducted on a standard battery tester (Wuhan LAND electronics Co., Ltd.). A substantially constant current was applied to the electrodes during repeated stripping/plating while the potential was recorded over time. The impedance measurements were carried out using a Biologic VMP3 multichannel system.

Characterization. SEM images were taken using a FEI XL30 Sirion scanning electron microscope at an acceleration voltage of about 5 kV. In order to observe the surface morphology of lithium after cycling, the electrodes were disassembled from the coil cell in the glovebox followed by gentle rinse in DOL. STEM images, the corresponding EDX elemental mapping and line scan were obtained on a FEI Tecnai G2 F20 X-TWIN. XRD patterns were recorded on a PANalytical X'Pert instrument. The Li electrode was loaded on a glass slide and covered with Kapton tape during XRD measurements to avoid direct contact with air. FTIR spectra were recorded on a Nicolet iS50 FT/IR Spectrometer (Thermo Scientific). TGA was performed on a TA Instrument Q500 TGA in air atmosphere with a heating rate of about 5° C./min.

Supplementary Information

Calculation of the Change in Electrode Dimension During Stripping/Plating for Bare Li.

Theoretical specific capacity of Li=about 3860 mAh/g

Density of Li=about 0.534 $g/cm^3$

Volumetric capacity of Li=Theoretical specific capacity of Li×Density of Li=about 2061.24 $mAh/cm^3$ Thickness of Li corresponding to 1 $mAh/cm^2$ capacity=1 $mAh/cm^2$/Volumetric capacity corresponding to about 4.85 μm Example 4

Lithium/Carbon Composite Anode: Melt Infusion of Lithium into a Three-Dimensional Conducting Scaffold with "Lithiophilic" Coating Overview Lithium metal based battery is considered to be a particularly desirable energy storage system due to its high theoretical capacity and low anode potential. However, dendritic growth and virtually infinite relative volume change during long-term cycling often lead to severe safety hazards and catastrophic failure. Here, a lithium-scaffold composite electrode is developed by lithium melt-infusion into a three-dimensional (3D) porous carbon matrix with "lithiophilic" coating. Lithium is uniformly entrapped on the matrix surface and in the 3D structure. The resulting composite electrode possesses a high conductive surface area and excellent structural stability upon galvanostatic cycling. Stable cycling of this composite electrode is demonstrated with small Li plating/stripping overpotential (<about 90 mV) at a high current density of about 3 $mA/cm^2$ over 80 cycles.

Introduction

Nowadays the increasing demand for portable electronic devices as well as electric vehicles raises an urgent need for high energy density batteries. Lithium (Li) metal anode is regarded as the "Holy Grail" of battery technologies, due to its light weight (about 0.53 $g/cm^3$), lowest anode potential (about −3.04 V vs. the standard hydrogen electrode), and high specific capacity (about 3860 mAh/g vs. about 372 mAh/g for graphite anode). It possesses an even higher theoretical capacity than the recently intensely researched anodes such as Ge, Sn and Si. In addition, the demand for copper current collectors (about 9 $g/cm^3$) in conventional batteries with graphite anodes can be eliminated by employment of Li metal anodes, hence reducing the total cell weight dramatically. Therefore, Li metal could be a favorable candidate to be utilized in highly promising, next-generation energy storage systems such as Li-Sulfur (Li—S) battery and Li-Air battery.

The safety hazard associated with Li metal batteries, originating from the uncontrolled dendrite formation, has become a hurdle against the practical realization of Li metal based batteries. The sharp Li filaments can pierce through the separator with increasing cycle time, thus provoking internal short-circuiting. Attempts to settle this bottleneck focus on solid electrolyte interphase (SEI) stabilization/modification by introducing various additives. These electrolyte additives interact with Li quickly and create a protective layer on the Li metal surface, which helps reinforce the SEI. Furthermore, the employment of interconnected hollow carbon spheres and hexagonal boron nitride (h-BN) as mechanically and chemically stable artificial SEI can effectively block Li dendrite growth.

In addition to the notorious Li dendrite formation, another factor that contributes to the battery short-circuiting is the volume change of Li metal during electrochemical cycling. During battery cycling, Li metal is deposited/stripped without a host material. Thus the whole electrode suffers from a drastic volume change (infinity in a relative scale) compared with the finite volume expansion of other anodes for lithium ion batteries such as Si (about 400%) and graphite (about 10%). As a result, the mechanical instability induced by the virtually infinite volumetric change would enhance the risk of separator penetration according to unstable surface and failure of SEI. However, little attention has been placed on the volume fluctuation problem of the "hostless" Li. This example proposes that a host scaffold to trap Li metal inside can effectively reduce the volume change of the whole electrode and therefore maintain the electrode surface.

Herein, this example sets forth a Li—scaffold composite anode and its effectiveness on addressing the safety issue of traditional "hostless" Li metal electrode. The scaffold serves as a rigid host with Li uniformly confined inside to accommodate the infinite volume change of Li metal during cycling. In order to create the composite electrode as shown in FIG. 55A, it is desired to find a suitable porous material to host the Li metal. A desirable scaffold for Li encapsulation should have the following attributes: (1) mechanical and chemical stability towards electrochemical cycling; (2) low gravimetric density to achieve high energy density of the composite anode; (3) good electrical and ionic conductivity to provide unblocked electron/ion pathway, affording fast electron/ion transport; and (4) relatively large surface area for Li deposition, lowering the effective electrode current density and the possibility of dendrite formation. By considering these aspects, carbon based porous materials are chosen. Specifically, electrospun carbon fiber network was utilized as an example material to illustrate the capability of this composite anode to sustain the volume fluctuation and shape change during each electrochemical cycle.

The encapsulation of Li metal inside the porous carbon scaffold presents as a major challenge. Compared with other battery electrode materials which can be fabricated via various synthetic processes, manufacturing of Li metal based microstructures and nanostructures are difficult due to the high reactivity of Li. The lack of spatial control of deposition and unsmooth Li surface due to dendritic Li formation can impede Li encapsulation by entrapping Li through electrochemical deposition. Therefore, development of versatile and scalable approaches for encapsulating Li inside porous carbon or other scaffold to create Li based composite electrodes is highly desired.

Li metal possesses a low melting point of about 180° C., and it would liquefy into molten Li under anaerobic atmosphere when heated up to its melting point. A strategy is developed as follows: melt-infusion of molten Li into a "lithiophilic" matrix, which has low contact angle with liquid Li. A porous material with a thin layer of a lithiophilic coating has excellent wettability with liquefied Li and thus could function as the host scaffold for Li entrapment. In this example, the afore-mentioned electrospun carbon fiber network modified with lithiophilic coating—silicon (Si), was employed as the scaffold for Li encapsulation. Li readily and quickly flows into the fiber layer region and occupy the empty spaces between fibers. The resulting composite structure, denoted as Li/C, remains both mechanically and chemically stable under galvanostatic cycling; moreover, it provides a stable electrode/electrolyte interface. The effective anode current density could also be reduced due to an enlarged surface area for Li nucleation process, which in turn causes superior electrochemical performances under the same test conditions. To summarize, in contrary to the "hostless" Li metal, the as-proposed Li/C composite anode is able to accommodate the volume variation and therefore mitigate the potential safety hazard; moreover, the reduced current density, rooted to larger surface area, also triggers a greatly improved electrochemical performance, with stable cycling of about 2300 mAh/g for more than 80 cycles at a high current density of about 3 mA/cm$^2$.

Results and Discussion

Design and Fabrication of Li/C Composite Anode.

A Li—carbon nanofiber scaffold composite electrode is developed which possesses a stable volume during cycling. The carbon nanofiber scaffold, with an average diameter of about 196 nm (FIG. 60), was prepared by carbonization of the oxidized polyacrylonitrile (PAN) fiber. The schematic representation of this Li—carbon nanofiber scaffold design is shown in FIG. 55A, where a noteworthy operation in the fabrication process is Li entrapment. In this design, Li was heated above its melting temperature under argon atmosphere, and the resulting molten Li was absorbed into the scaffold. A thin layer of Si was coated onto the scaffold surface by chemical vapor deposition (CVD) to assist this melt-infusion process. To investigate the effectiveness of Si coating on Li wettability of a wide variety of porous materials, molten Li droplet was placed on several different porous materials, including copper foam and carbon fiber network. As shown in FIG. 55B, the molten Li droplet tends to ball up and avoid contact with surfaces without any modification, indicating an unfavorable wettability. This "lithiophobic" effect possibly originates from the lack of bonding interaction between surface (carbon or Cu) and molten Li. For surface modified objects, the Si coating reacts with molten Li to create a binary alloy phase—lithium silicide with some bonding interactions to pure Li. This reaction drives and guides molten Li to wet the entire surface and fill in the porous structure. Therefore the Si layer by CVD functions as a "lithiophilic" coating promoting good wetting property of liquefied Li. FIG. 55C is a sequence of the time-lapse images of the Li melt-infusion process. For unmodified carbon framework, molten Li could not wet its surface. In comparison, Si-coated carbon framework shows good wettability as molten Li quickly flows into the structure under capillary force.

Characterizations of Li/C Composite Anode.

Scanning electron microscope (SEM) and transmission electron microscope (TEM) characterizations were performed to study the morphology of the carbon fiber as well as the spatial distribution of the Si coating. FIG. 56A shows the bare carbon fiber with a smooth surface, indicating the absence of coatings. The diameter of the carbon fiber is about 200 nm (FIG. 60). In contrast, Si-coated carbon fiber displays a rough edge with Si nanoparticles homogeneously deposited on the fiber surface (FIG. 56B). These Si nanoparticles, with an average size of several nanometers, stack together to form a continuous, dense shell on the carbon fiber core. FIG. 56C is the typical TEM image of the Si layer under higher magnification. The Si shell by CVD could be observed with a different contrast (lighter region) and has a thickness of about 30 nm. The linear scan spectra again confirms the formation of a uniform Si coating on the carbon fiber surface (FIG. 56D). To further verify the distribution of Si inside the entire fiber layer instead of each single fiber, energy-dispersive X-ray spectroscopy (EDS) mappings of the fiber layer from top and cross section were performed. FIGS. 56F, 56G, 56I, and 56J exhibit carbon and silicon signals, revealing the presence of the Si nanoparticles throughout the whole fiber layer region. Moreover, as illustrated in FIGS. 56F and 56I, Si is uniformly coated over the entire fiber layer. Therefore, this carbon fiber framework with Si homogeneously distributed could serve as a desirable matrix for Li melt infusion and ensure a conformal Li entrapment.

After Li infiltration, the resulting Li/C composite displays a smooth surface with metallic luster compared with the pristine carbon fiber network, indicating that Li is uniformly confined inside the matrix (FIGS. 57A and 57B). SEM characterization was conducted on the carbon fiber before (FIGS. 57C and 57D) and after (FIGS. 57E and 57F) Li infusion. As illustrated in FIG. 57C, the carbon fiber network exhibits a 3D porous structure with interconnected fibrous morphology. Furthermore, it provides a high surface area of about 15.6 m$^2$/g (by Brunauer-Emmett-Teller method based on nitrogen adsorption) as well as empty inner spaces among fibers for efficient Li storage. The fiber layer has an uniform thickness of about 100-120 μm (FIG. 57D). The inset image in FIG. 57D indicates an interconnected network which provides a continuous conductive pathway for facile ion/electron transport. The carbon fiber film was subjected to a current-voltage (I-V) measurement and the calculated through-plane resistance based on the I-V curve is about 67 ohm for a disc of about 1 cm² and about 100-120 µm thick (FIG. 61). The average sheet resistance was also determined to be about 4200 ohm/sq using a four point meter (FIG. 62). The good electrical conductivity of this PAN-based carbon fiber network ensures a facile electron transport of the 3D backbone. FIGS. 57E and 57F present the morphology of the Li/C composite material from top and cross section, respectively. It is observed that the carbon fiber network is uniformly coated by metallic Li and the interspace pores between fibers were filled with Li. The entrapped Li is restrained within the fiber layer as no Li is observed protruding beyond the fiber mat boundary. From the cross section view, it is also concluded that the absorbed Li forms a porous structure with internal voids. X-ray diffraction (XRD) pattern of the Li/C reveals two phases existing in the composite (FIG. 57G). The identified peaks are indexed as $Li_{21}Si_5$ (PDF #01-079-5589) and Li (PDF #00-015-0401), confirming the entrapment of Li inside the scaffold. The absence of graphitic carbon signals confirms the amorphous phase of the electrospun carbon fiber. Amorphous carbon is inert to metallic lithium and provides excellent chemical/mechanical stability towards electrochemical cycling. Signal of lithium silicide ($Li_{21}Si_5$) is also observed due to the reaction of Si coating with the molten Li.

Electrochemical Performances of Li/C Composite Anode.

To evaluate the structural stability of the Li/C electrode during galvanostatic cycling, symmetrical coin cells (2032-type) with two identical Li/C electrodes were assembled. To standardize the test, control cells were fabricated using bare Li anode with equal thickness (about 120 µm). The cells were subjected to a typical Li-stripping-plating process with current density of about 1 mA/cm². A fixed amount of Li was stripped from anode and then deposited back. The anode volume change could be visually pronounced by stripping a total of about 10 mAh/cm² Li, which is about half of the anode capacity (about 50% extraction). The Li/C anode shows a more stable voltage plateau compared with bare Li anodes, implying a superior interfacial stability during cycling (FIG. 58A). In addition, the Li/C anode has much lower voltage hysteresis. The corresponding electrode thickness change during various stages of cycling is shown in FIG. 58B. The thickness of bare Li electrode is halved to about 60 µm after about 50% extraction of the Li, indicating a large volume change. Whereas thickness of Li/C composite remain largely unaltered (from about 116 µm to about 110 µm and back to about 116 µm) upon cycling, which again confirms the effectiveness of the Li/C composite anode in maintaining a highly constant thickness. Electrode thickness was analyzed based on a summary of 15 different locations for each sample (FIG. 63).

The SEM images of electrode cross sections during various stages of cycling are presented as FIG. 58C-H. The shape and thickness of the control Li metal electrode is expected to change upon every cycle owing to the lack of a host scaffold (FIG. 58C-E). The Li/C composite electrode experiences a small volume change, with an intact and stable surface (FIG. 58F-H). The inset images in FIG. 58G and FIG. 58H indicate that the fibrous morphology is preserved after Li cycling. The carbon fiber network serves as a rigid backbone for Li to reversibly deposit into/extract from, thus ensuring an unchanged shape of the whole electrode as well as a stable interface between the electrode and electrolyte.

Morphologies of the bare Li electrode and Li/C electrode after repeated Li-plating/stripping cycles were also analyzed by SEM. Cross-sectional image of the cycled Li electrode shows an uneven surface (FIG. 58I) while the cross section of the cycled Li/C electrode exhibits an intact electrode shape with stable interface between electrode and electrolyte (FIG. 58J). It should be noted that this rough surface of Li electrode after cycling originates mainly from the repeated inhomogeneous and "hostless" Li deposition/stripping upon cycling, inducing a noticeable mechanical pressure on the separator. Hence the risk of battery failure is greatly enhanced. Top view of the cycled Li electrode shows Li dendrites protruding upwards (FIGS. 64A and 64B), again confirming the overgrowth of Li filaments. For Li/C electrode, the absence of noticeable large Li dendrite is ascribed to the effectiveness of the high-surface-area 3D matrix on reducing the actual current density (FIG. 64C). Therefore the formation of dendritic Li could be suppressed to some extent. However, visible mossy Li is still present (FIG. 64D).

To investigate the electrochemical performances of the Li/C anode, symmetrical cells were assembled with Li/C and bare Li (control), respectively. About 1 M lithium hexafluorophosphate ($LiPF_6$) in co-solvent of ethylene carbonate (EC) and diethyl carbonate (DEC) was used as electrolyte. Cells with bare Li electrodes and Li/C electrodes were compared in terms of plating/stripping voltage profiles (FIG. 59A-D), electrochemical impedance (FIG. 59E), rate performance (FIG. 59F), and cycling behavior (FIG. 59G).

FIG. 59A-D depicts voltage profiles of a typical Li-plating/stripping process at various test conditions (about 0.5 mA/cm² and about 3 mA/cm² for about 0.5 mAh/cm² and about 1 mAh/cm²). These voltages curves for bare Li electrode consistently show significant dips and bumps whereas those for Li/C electrode exhibit flat and stable plateau. It is thus concluded that Li incorporation/extraction for Li/C is initiated and maintained much more readily compared to bare Li electrode. Since Li is plated/stripped on/from Li itself, nucleation barrier originating from lattice mismatch is reduced. Therefore, the unstable voltage curves for bare Li anodes can be ascribed to the variation of electrode surface and shape over time. AC impedance test was performed to examine the interfacial resistance in a symmetrical cell configuration. The measurement was conducted on both pristine electrodes and those after 1st cycle of Li plating/stripping in order to eliminate the influence of surface impurities. The interfacial impedance for pristine Li and Li/C, as indicated by the semicircle at high frequency, stay at about 450 ohm and about 60 ohm, respectively (FIG. 59E). For Li and Li/C electrode after first cycle, the interfacial impedance reach about 90 ohm and about 40 ohm, respectively (FIG. 59E). The larger impedance for the control Li indicates that the non-uniform and "hostless" Li plating/stripping has resulted in poor Li ion transport. The reduced Li ion transport resistance for Li/C electrode is in accordance with the smaller cycling overpotential and more stable voltage curve in FIG. 59A-D.

FIG. 59F presents the rate behavior of the Li/C composite. Voltage hysteresis is plotted versus cycle numbers under various current densities ranging from about 0.5 C to about 10 C. Voltage hysteresis is specified as the sum of overpotential for Li deposition and Li dissolution. As illustrated in FIG. 59F, Li/C electrode delivers a steadily increasing voltage hysteresis of about 40 mV, about 70 mV, about 190 mV, about 300 mV, and about 380 mV at about 0.5 C, about 1 C, about 3 C, about 5 C and about 10 C, respectively. Meanwhile, bare Li electrode delivers a much larger voltage polarization of about 150 mV, about 180 mV, about 330 mV, about 550 mV and about 870 mV under same test conditions. This good rate capability of Li/C reveals facile ion/electron transport, owning to the existence of unblocked ion/electron conductive pathway inside the Li/C composite. FIG. 59G shows the long term cycling profile of the symmetrical coin cells. For Li/C electrode, it can cycle stably for more than 80 cycles under a high current rate of about 3 mA/cm². The voltage plateau is stable at each charge-discharge process. Even after 80 cycles, the cell shows no evidence of dendrite-induced failure. Whereas for bare Li electrode, the voltage hysteresis gradually increases with increasing cycle time until an abrupt drop (FIG. 59G). This sudden voltage change could be caused by excessive formation and continuously building up of SEI, followed by the breaking down of separator. It is evident that cells with "hostless" bare Li electrode exhibit a predominantly and irregularly fluctuated voltage profile which is consistent with the cell failure by a dendrite-induced short-circuit.

CONCLUSION

In summary, a melt-infusion approach is used to effectively encapsulate Li inside a porous host scaffold. The infiltrated Li uniformly confined within the host matrix creates a Li composite material. It can deliver a high gravimetric capacity of about 2300 mAh/g as stable anodes for Li metal batteries. This design affords remarkable battery performance with a low interfacial impedance, stable Li plating/stripping voltage profile and long cycle life, due to its high conductive surface area, stable electrolyte/electrode interface and negligible volume fluctuation. Compared with "hostless" Li metal electrode, this Li/C composite electrode has multiple advantages and therefore can open a new avenue for solving the intrinsic problems of Li metal based batteries.

Methods

Si-coated carbon nanofiber fabrication. Polyacrylonitrile (PAN), polyvinylpyrrolidone (PVP) and dimethylformamide (DMF) used were commercially available from Sigma-Aldrich Chemical Corporation. About 0.5 g PAN ($M_w$=about 150,000) and about 0.5 g PVP ($M_w$=about 1,300,000) were added into about 10 ml DMF. The as-prepared solution was stirred vigorously at about 80° C. for about 6 hours (about 380 rpm). Afterwards the solution was electrospun into nanofibers with the following electrospinning parameters: about 18 cm of nozzle-to-collector distance, about 15 kV of electrospinning voltage, about 0.3 ml/h of pump rate, and about 9 cm×9 cm of the graphite paper collector size. After about 40 hours of electrospinning, the as-prepared fiber mat was stabilized in air at about 300° C. for about 2 hours in a box furnace (Lindberg/Blue M, Thermo Electron Corporation). The oxidized fiber was then transferred to tube furnace (Thermo Electron Corporation) to be carbonized at about 700° C. under argon atmosphere for about 3 hours with a heating rate of about 5° C./min. Si was coated onto carbon fiber network via chemical vapor deposition (CVD) with the following parameters: about 100 sccm of silane flow rate, about 30 torr of pressure, and about 490° C. for about 30 min.

Li infiltration. Surface of the Li metal foil was polished to remove the impurities. For Li melt-infusion process, Li was heated over about 300° C. on a nickel sheet under argon atmosphere. The oxygen level is kept below about 0.1 ppm to ensure little oxide on the molten Li surface. Different porous materials were dipped into the molten Li and held until Li flow into the structure substantially completely.

Characterization. SEM study and elemental mapping was conducted using an FEI XL30 Sirion scanning electron microscope with a field emission gun (FEG) source. TEM characterization and linear scan was performed with an FEI Tecnai G² F20 X-TWIN transmission electron microscope.

XRD was carried out using X-ray diffractometer (X'Pert Pro, PANalaytcal) with Cu Kα radiation. Cycled coin cells were dissembled inside an argon-filled glove box and washed with EC before further measurements. Specific surface area of the carbon nanofiber was determined by Brunauer-Emmett-Teller (BET) method based on nitrogen gas adsorption, using a Micromeritics ASAP 2020 analyzer. The samples (about 100 mg in total) were degassed at about 150° C. for about 24 hours before analysis.

Electrochemical measurements. Li metal sheet and Li/C composite were cut into disks of about 1 cm² by a punch machine (MTI). Symmetrical MTI type-2032 coin cells were assembled with two identical electrodes inside an argon-filled glove box (MB-200B, Mbraun). About 1 M $LiPF_6$ in EC/DEC (about 1:1 vol. %) was used as electrolyte. Battery testing was carried out with a 96-channel battery tester (Arbin Instruments). Electrochemical impedance was probed at room temperature over the frequency from about 0.1 Hz to about 200 kHz on an electrochemical workstation (BioLogic Science Instruments, VMP3). To perform the current-voltage measurement, carbon fiber film (about 1 cm², about 100-120 μm thick) was sandwiched between two copper foils connecting to the electrochemical station (Bio-Logic Science Instruments, VMP3). Scan rate was about 50 mV/s, within the range of about −2 to about 2 V. Sheet resistance of the carbon fiber film was measured by four point probe technique, using a four point meter (Rchek, Model #RC2175). The samples were cut into proper size (rectangle, about 1 cm×3 cm, thickness of about 100-120 μm) and the average sheet resistance is based on 20 samples.

Calculation of gravimetric specific capacity of the Li/C electrode. Gravimetric specific capacity of Li metal anode is about 3860 mAh/g. The weight percentage of Li in the composite is about 60% (Table 1), and the corresponding gravimetric specific capacity is about (3860 mAh/g×60%) =about 2316 mAh/g.

Supplementary Information

TABLE 1

Weight of the bare carbon fiber, Si-coated carbon fiber and Li infiltrated carbon fiber.

| Materials | Average Weight (mg) |
| --- | --- |
| Bare carbon fiber | 3 |
| Si coated carbon fiber | 3.8 |
| Si coated carbon fiber with Li inside | 9.3 |

The carbon fiber mat with thickness of about 100 μm was cut into small disks before the subsequent measurements. The weight of the material is measured based on a disk of about 1 cm² for 10 samples. Weight percentage of Li in the Li/C composite is about 60%.

As used herein, the singular terms "a," "an," and "the" may include plural referents unless the context clearly dictates otherwise. Thus, for example, reference to an object may include multiple objects unless the context clearly dictates otherwise.

As used herein, the terms "substantially," "substantial," and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

While the disclosure has been described with reference to the specific embodiments thereof, it should be understood by those skilled in the art that various changes may be made and equivalents may be substituted without departing from the true spirit and scope of the disclosure as defined by the appended claims. In addition, many modifications may be made to adapt a particular situation, material, composition of matter, method, operation or operations, to the objective, spirit and scope of the disclosure. All such modifications are intended to be within the scope of the claims appended hereto. In particular, while certain methods may have been described with reference to particular operations performed in a particular order, it will be understood that these operations may be combined, sub-divided, or re-ordered to form an equivalent method without departing from the teachings of the disclosure. Accordingly, unless specifically indicated herein, the order and grouping of the operations is not a limitation of the disclosure.

What is claimed is:

1. A lithium battery comprising:
    a cathode;
    a composite lithium metal anode; and
    an electrolyte in contact with the cathode and the composite lithium metal anode, wherein:
    the composite lithium metal anode includes a porous matrix and lithium metal disposed within the porous matrix,
    the porous matrix has a conformal lithiophilic coating on surfaces of the porous matrix defining nanoscale open spaces within the porous matrix, and
    the nanoscale open spaces and the lithiophilic coating around the nanoscale open spaces enable thermal infusion of the lithium metal into the nanoscale open spaces to form lithium metal domains having a dimension in a range of 1 nm to 500 nm.

2. The lithium battery of claim 1, wherein the porous matrix includes a fibrous material.

3. The lithium battery of claim 2, wherein the fibrous material includes carbon fibers or polymeric fibers.

4. The lithium battery of claim 1, wherein the porous matrix includes carbon or a carbon-based material.

5. The lithium battery of claim 1, wherein the porous matrix accounts for no more than about 50% of a total weight of the composite lithium metal anode.

6. The lithium battery of claim 1, wherein the porous matrix has an affinity for lithium metal, such that the porous matrix is characterized as having a contact angle with liquefied lithium metal that is less than 90°.

7. The lithium battery of claim 1, wherein the porous matrix has a porosity in a range of 0.1 to 0.95.

8. The lithium battery of claim 1, wherein the conformal coating includes $Li_xM$, M is a Group 14 element, and x is 5:1 or less.

9. The lithium battery of claim 8, wherein x is in a range of 5:1 to 4:1.

10. The lithium battery of claim 8, wherein x is in a range of 4:1 to 3:1.

11. The lithium battery of claim 1, wherein the conformal coating includes $Li_yM'$, M' is a metal different from Li, and y is 3:1 or less.

12. The lithium battery of claim 11, wherein M' is a transition metal.

13. The lithium battery of claim 11, wherein the conformal coating further includes an oxide of Li.

14. The lithium battery of claim 1, wherein the cathode comprises at least one selected from a group consisting of a transition metal oxide, sulfur, and porous carbon.

* * * * *

UNITED STATES PATENT AND TRADEMARK OFFICE
CERTIFICATE OF CORRECTION

| | |
|---|---|
| PATENT NO. | : 11,145,851 B2 |
| APPLICATION NO. | : 15/348884 |
| DATED | : October 12, 2021 |
| INVENTOR(S) | : Cui et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 368 days.

Signed and Sealed this
Thirteenth Day of December, 2022

Katherine Kelly Vidal
*Director of the United States Patent and Trademark Office*